(12) United States Patent
Renforth

(10) Patent No.: US 7,246,574 B2
(45) Date of Patent: Jul. 24, 2007

(54) SUBSTANCE-DISPENSING PET TOY

(75) Inventor: Jack W. Renforth, Aurora, CO (US)

(73) Assignee: Aspen Pet Products, Inc., Denver, CO (US)

( * ) Notice: Subject to any disclaimer, the term of this patent is extended or adjusted under 35 U.S.C. 154(b) by 132 days.

(21) Appl. No.: 10/940,325

(22) Filed: Sep. 13, 2004

(65) Prior Publication Data
US 2006/0054106 A1 Mar. 16, 2006

(51) Int. Cl.
*A01K 29/00* (2006.01)
*A63H 7/00* (2006.01)

(52) U.S. Cl. .................. 119/711; 119/702; 119/707; 119/708; 446/269; 446/279; 446/289

(58) Field of Classification Search ........ 119/707–711, 119/702; D30/160; 446/269, 409, 279, 287, 446/280, 289, 288, 292, 284, 275, 272, 274, 446/270, 282, 285, 293, 427, 448
See application file for complete search history.

(56) References Cited

U.S. PATENT DOCUMENTS

| | | | | |
|---|---|---|---|---|
| 960,075 A * | 5/1910 | Callahan | ............... | 446/289 |
| 1,006,182 A * | 10/1911 | Cousin | ............... | 119/711 |
| 1,022,112 A * | 4/1912 | Smith | ............... | 119/711 |
| 1,187,660 A * | 6/1916 | Savage | ............... | 446/289 |
| 1,212,332 A * | 1/1917 | Ensign et al. | ............... | 446/289 |
| 2,086,631 A * | 7/1937 | Munro | ............... | 119/711 |
| 2,528,920 A * | 11/1950 | Stover | ............... | 446/289 |
| 2,782,556 A * | 2/1957 | Otis | ............... | 446/292 |
| 2,971,289 A * | 2/1961 | Reed et al. | ............... | 446/289 |
| 4,277,909 A * | 7/1981 | Rainwater | ............... | 446/289 |
| 4,662,856 A * | 5/1987 | Getgey et al. | ............... | 446/280 |
| D314,593 S * | 2/1991 | Crist et al. | ............... | D21/656 |
| 5,148,769 A * | 9/1992 | Zelinger | ............... | 119/708 |
| D373,662 S * | 9/1996 | Box | ............... | D30/160 |
| 5,893,791 A * | 4/1999 | Wilkinson | ............... | 446/456 |
| 6,073,581 A * | 6/2000 | Wang | ............... | 119/51.01 |
| 6,318,300 B1 * | 11/2001 | Renforth et al. | ............... | 119/708 |
| 2004/0237905 A1 * | 12/2004 | Tsengas | ............... | 119/711 |
| 2005/0009442 A1 * | 1/2005 | Chen | ............... | 446/269 |
| 2005/0022751 A1 * | 2/2005 | Nelson | ............... | 119/709 |
| 2005/0241595 A1 * | 11/2005 | Moulton | ............... | 119/711 |
| 2006/0048718 A1 * | 3/2006 | Mann | ............... | 119/710 |

FOREIGN PATENT DOCUMENTS

DE    4007676 AL    * 9/1991

* cited by examiner

Primary Examiner—Andrea M. Valenti
(74) Attorney, Agent, or Firm—Dorsey & Whitney LLP

(57) ABSTRACT

A pet toy capable of dispensing catnip or similar substance. The toy comprises a compartment for holding the substance. The toy also comprises a movement-promoting element operative to move the compartment so the substance, or an aroma of the substance, may pass through a sifting hole of the compartment. One embodiment of the toy comprises a rotating element, such as a ball, rotating about a horizontal axis within a larger body as a result of propelling the toy across a horizontal surface. The rotating element includes the compartment holding the substance so that some of the substance escapes the compartment as a result of the rotation of the rotating element. Various alternative embodiments of the invention are also described.

18 Claims, 59 Drawing Sheets

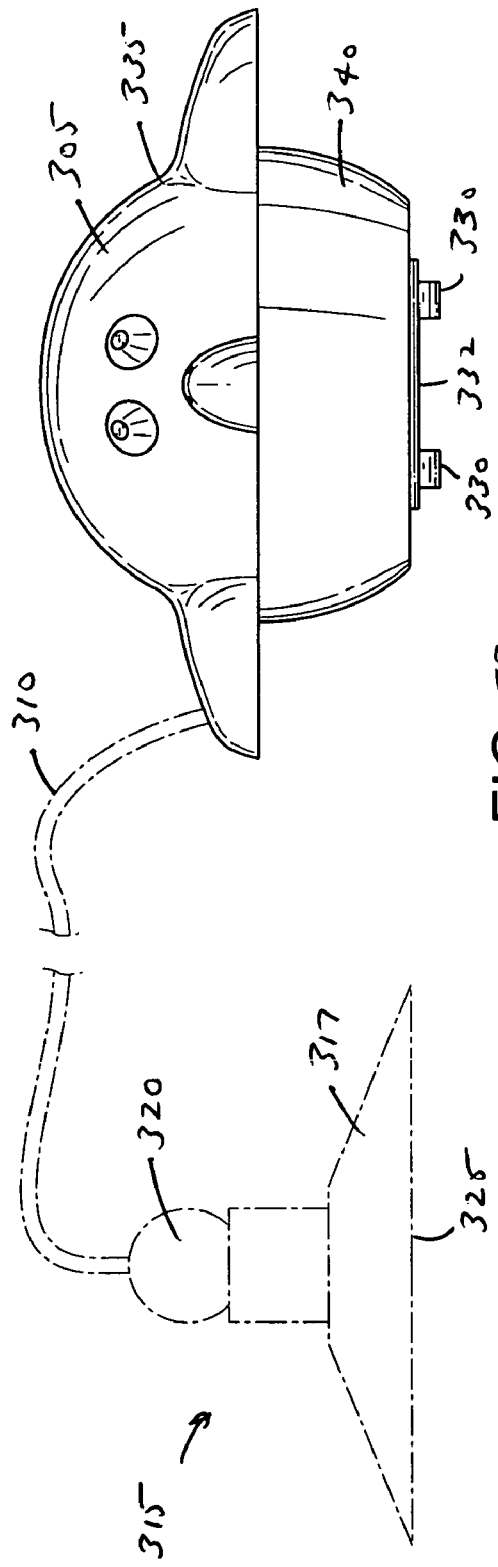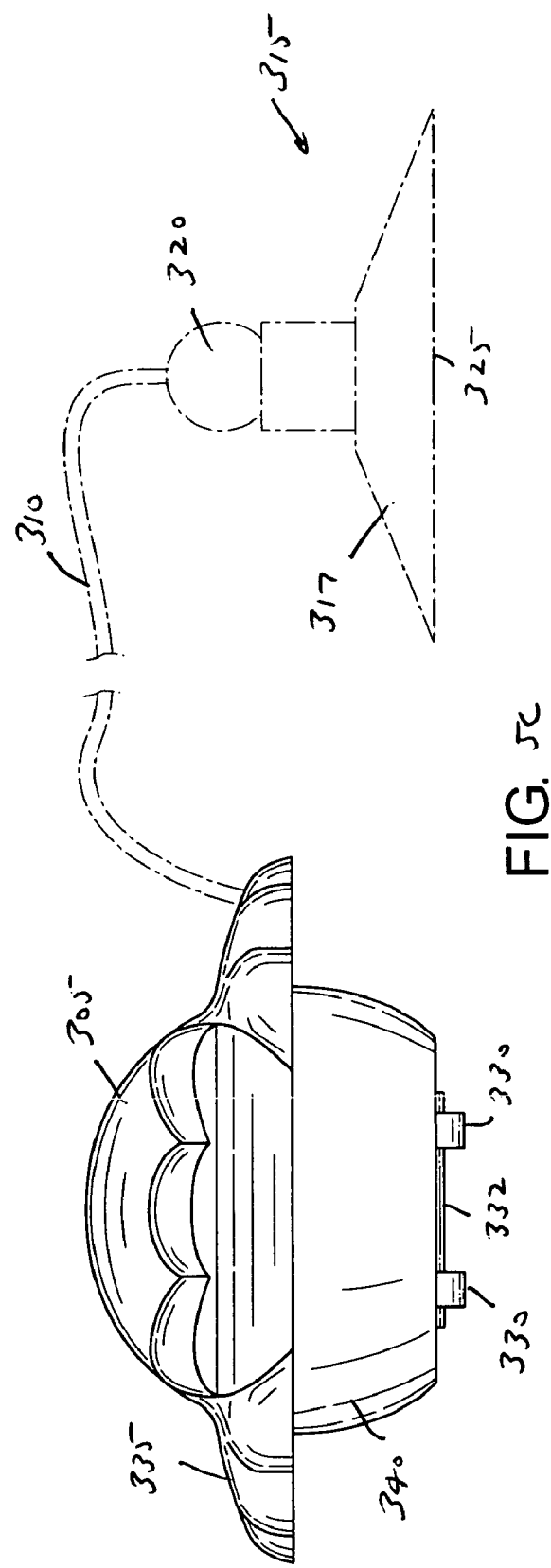
FIG. 5B
FIG. 5C

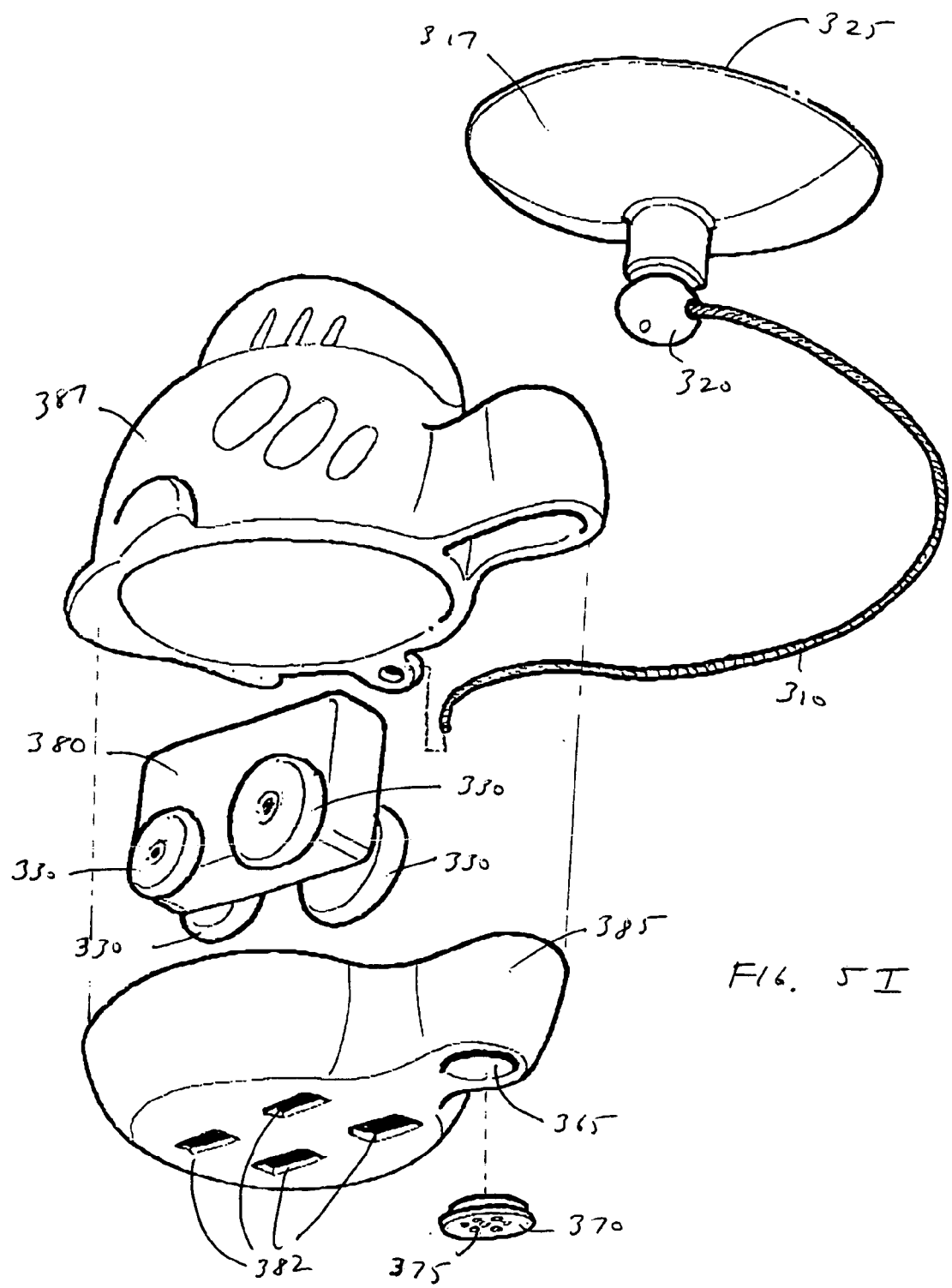

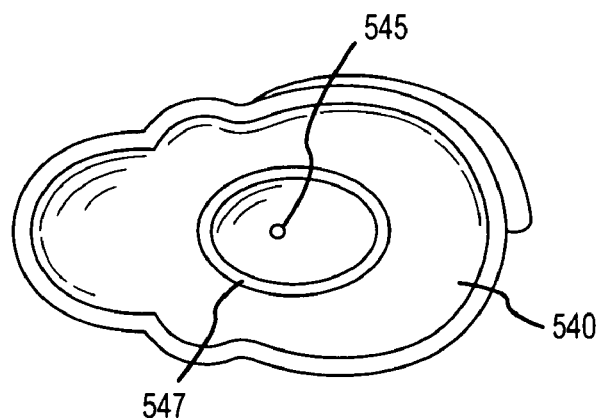
FIG.10
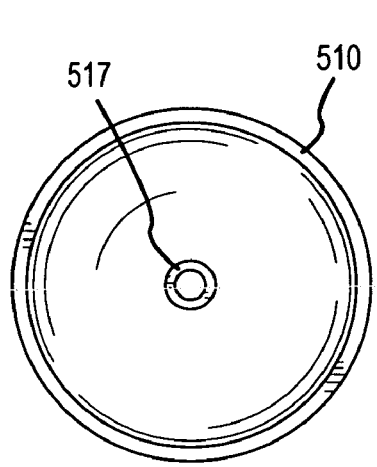 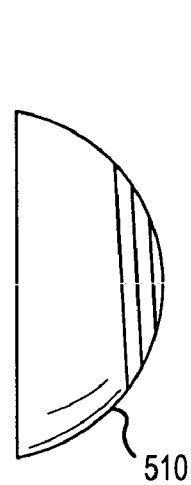 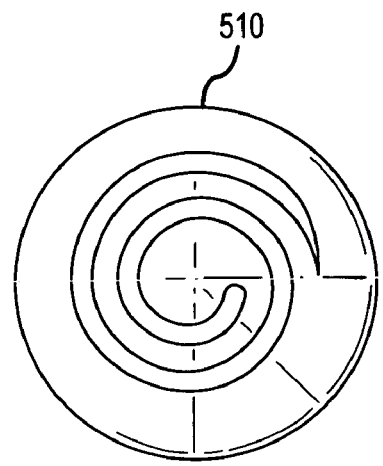
FIG.8A   FIG.8B   FIG.8C

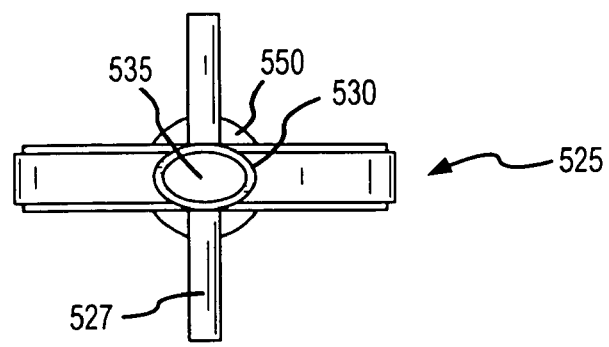
FIG.9C
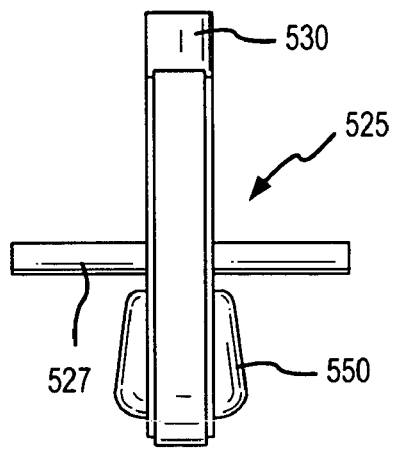
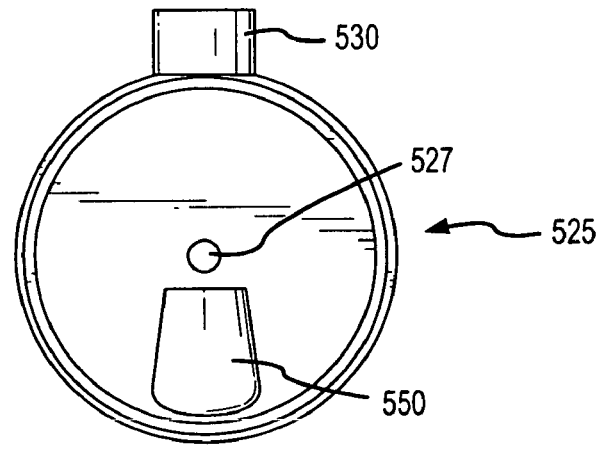
FIG.9A  FIG.9B

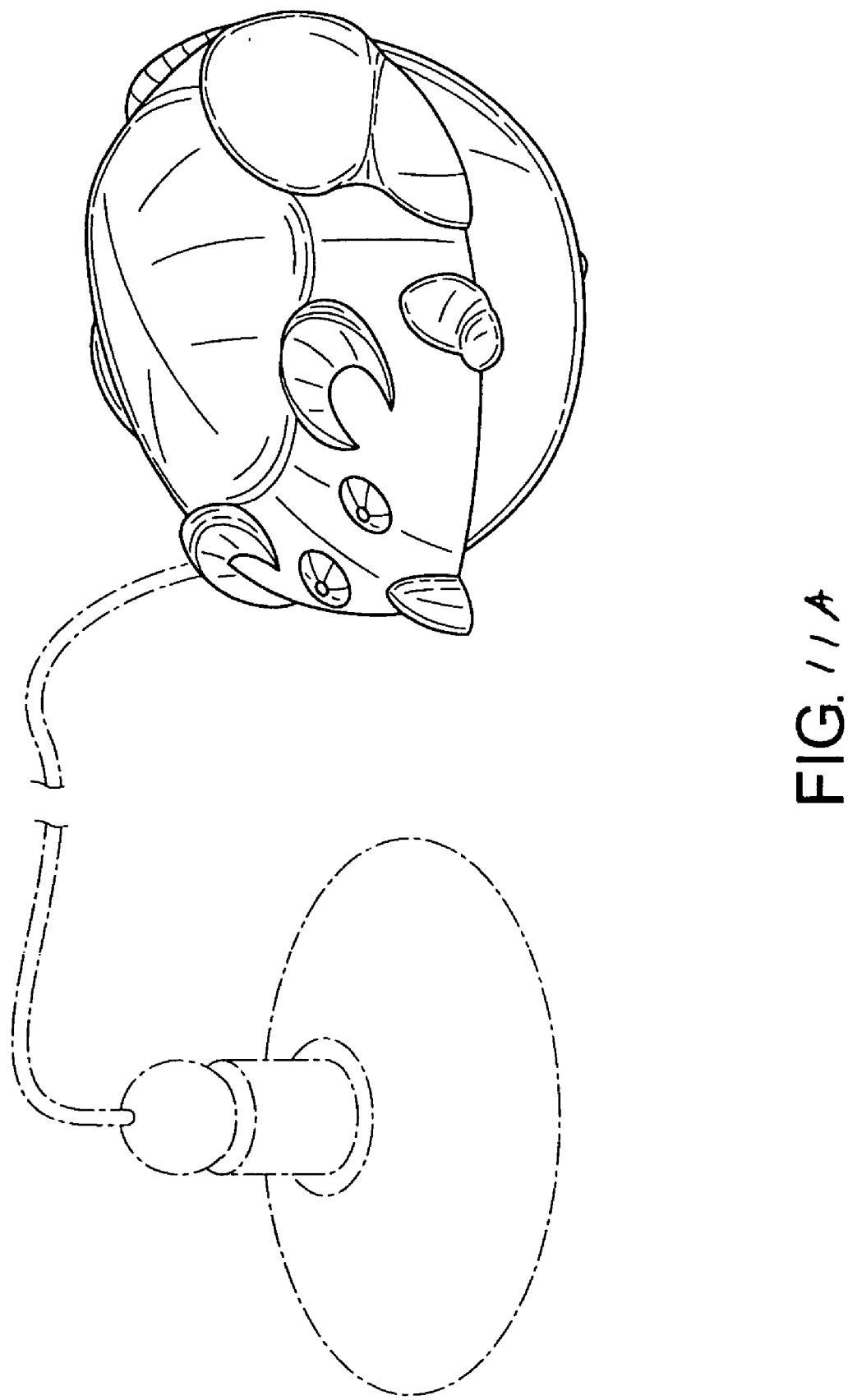

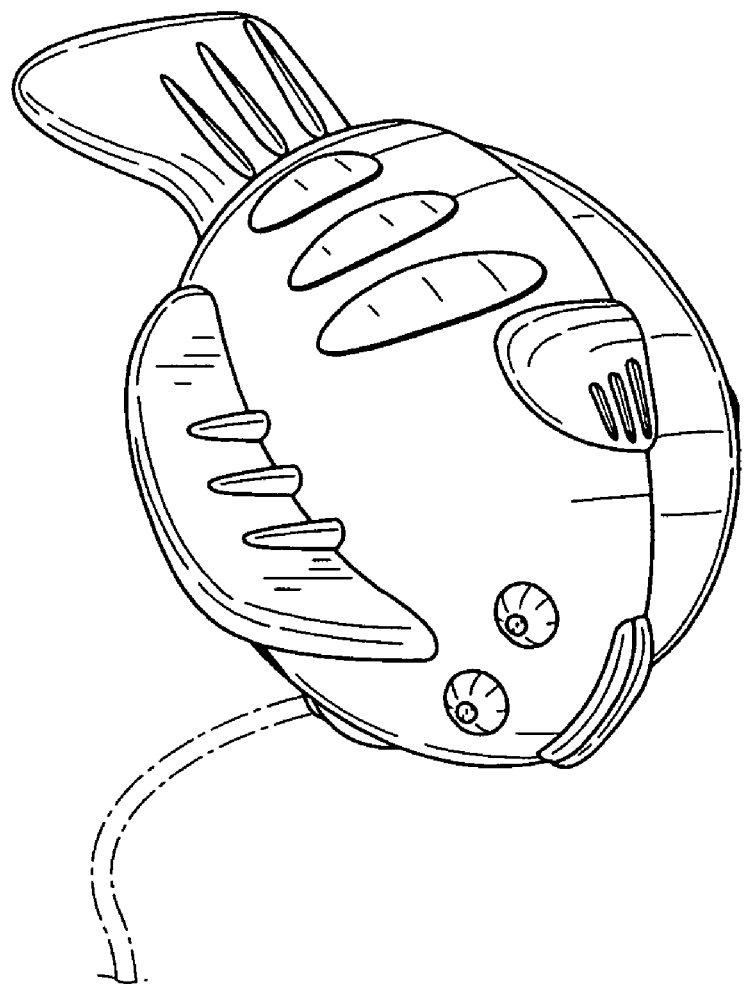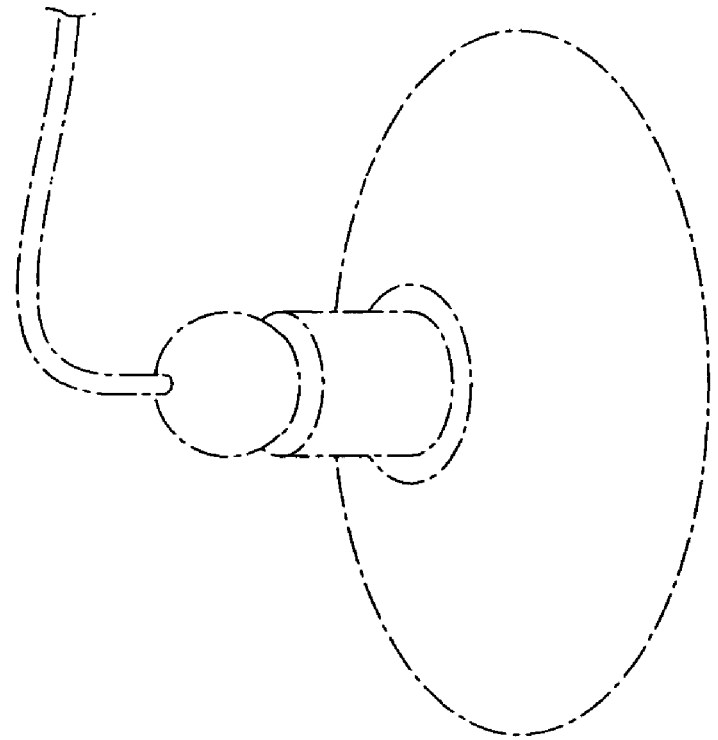
FIG. 124

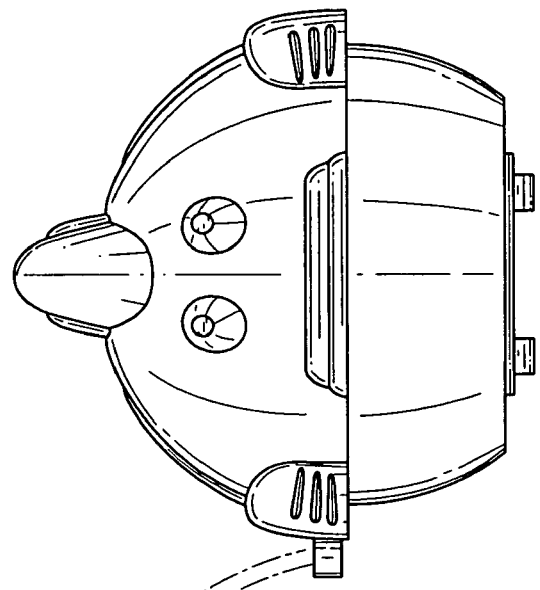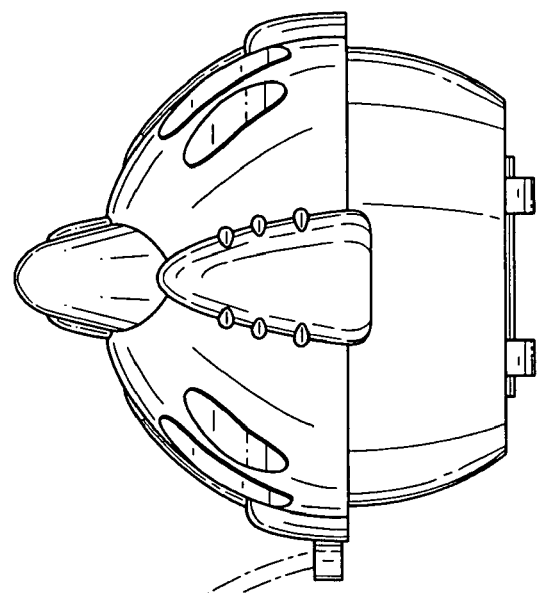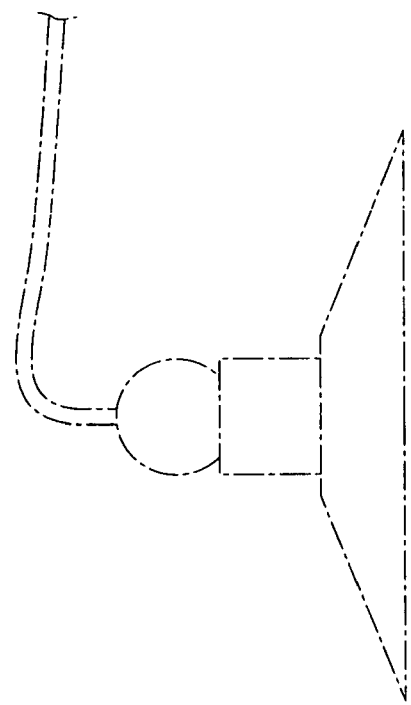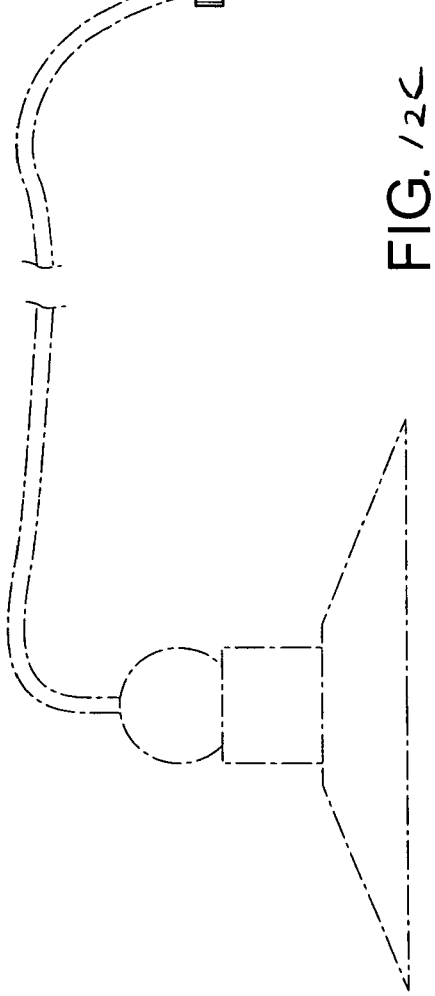
FIG. 12B
FIG. 12C

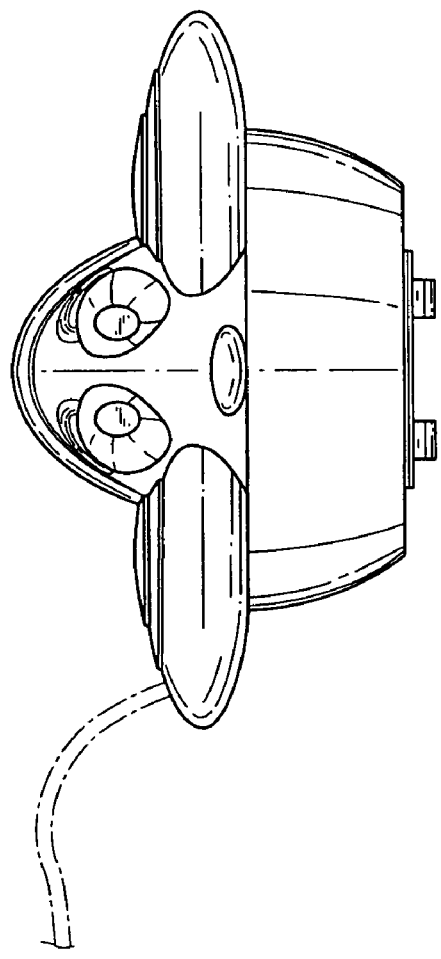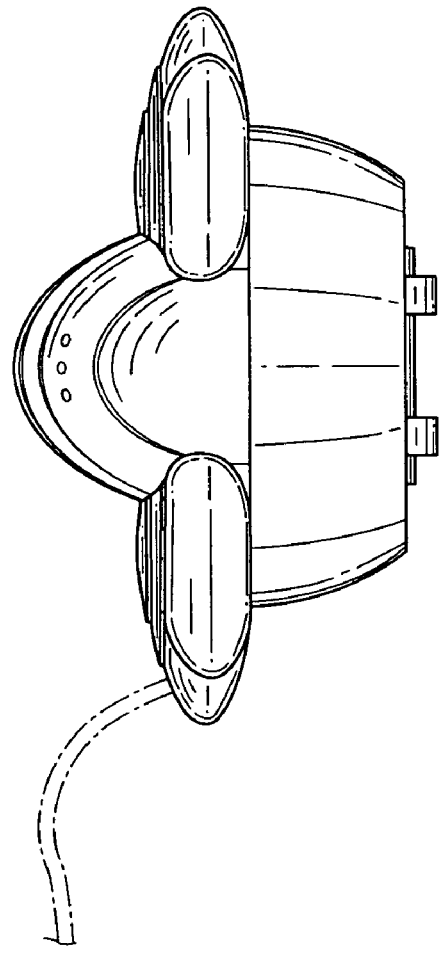
FIG. 13B
FIG. 13C

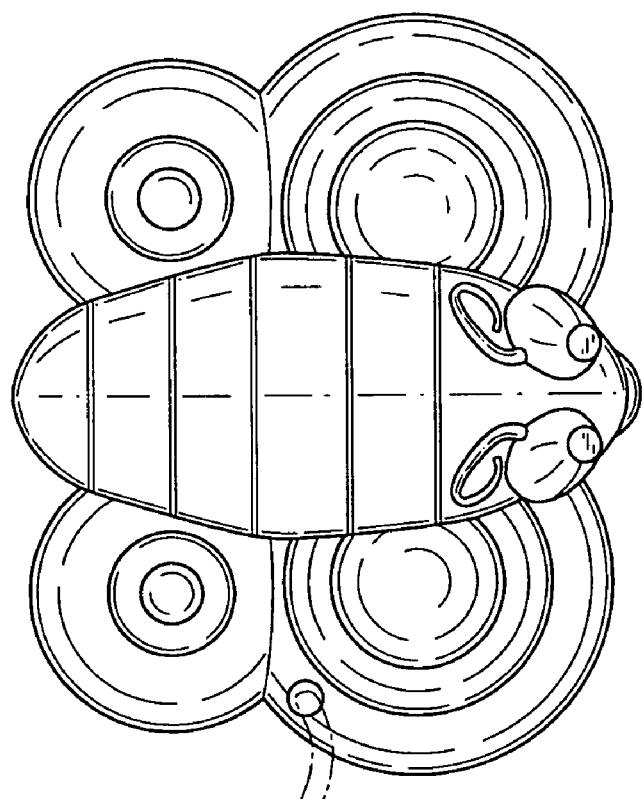
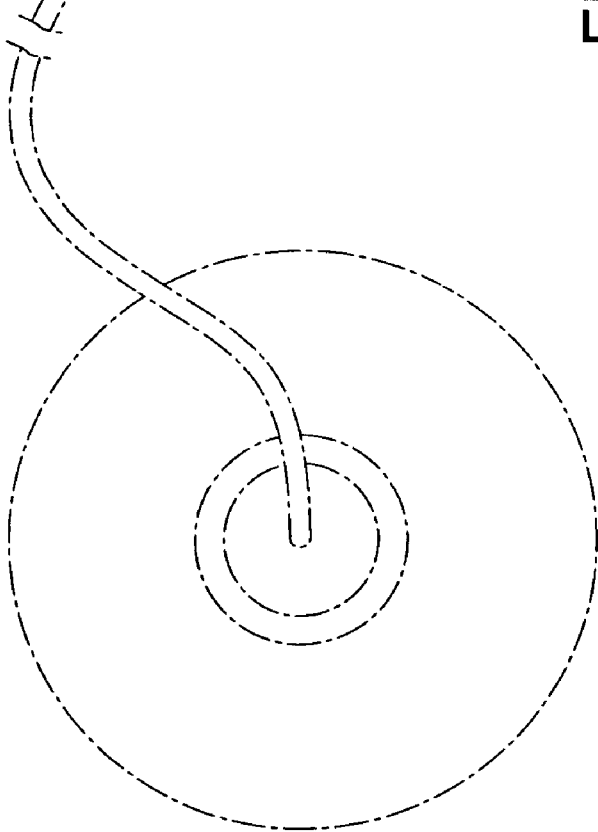
FIG. 13F

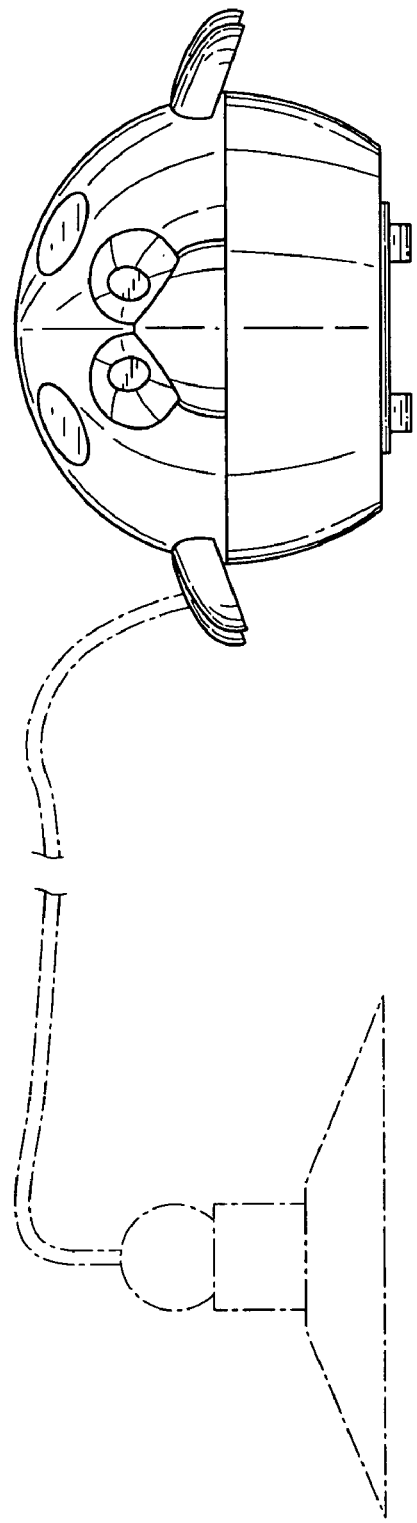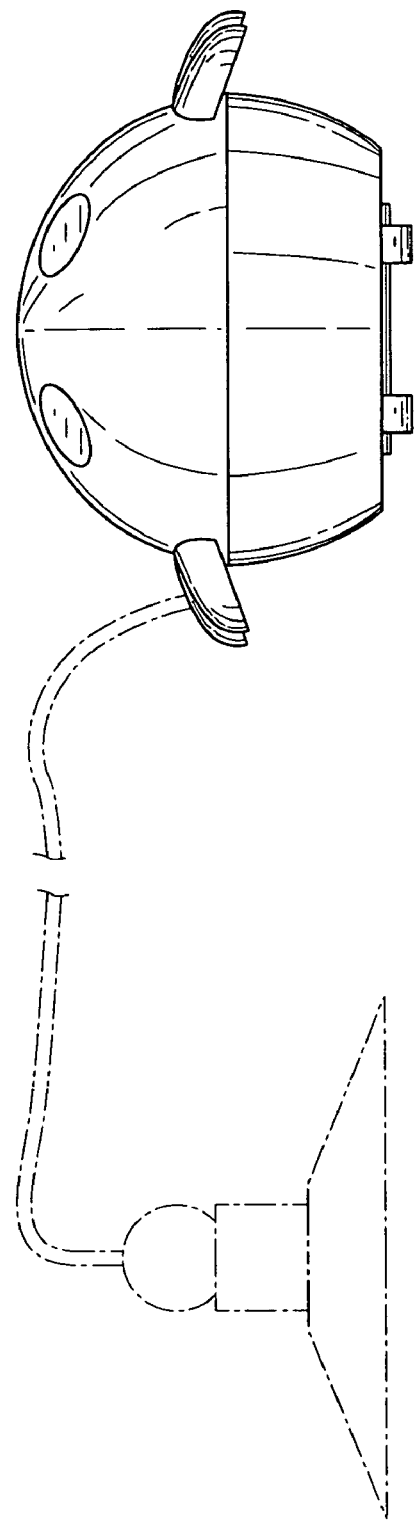
FIG. 14B
FIG. 14C

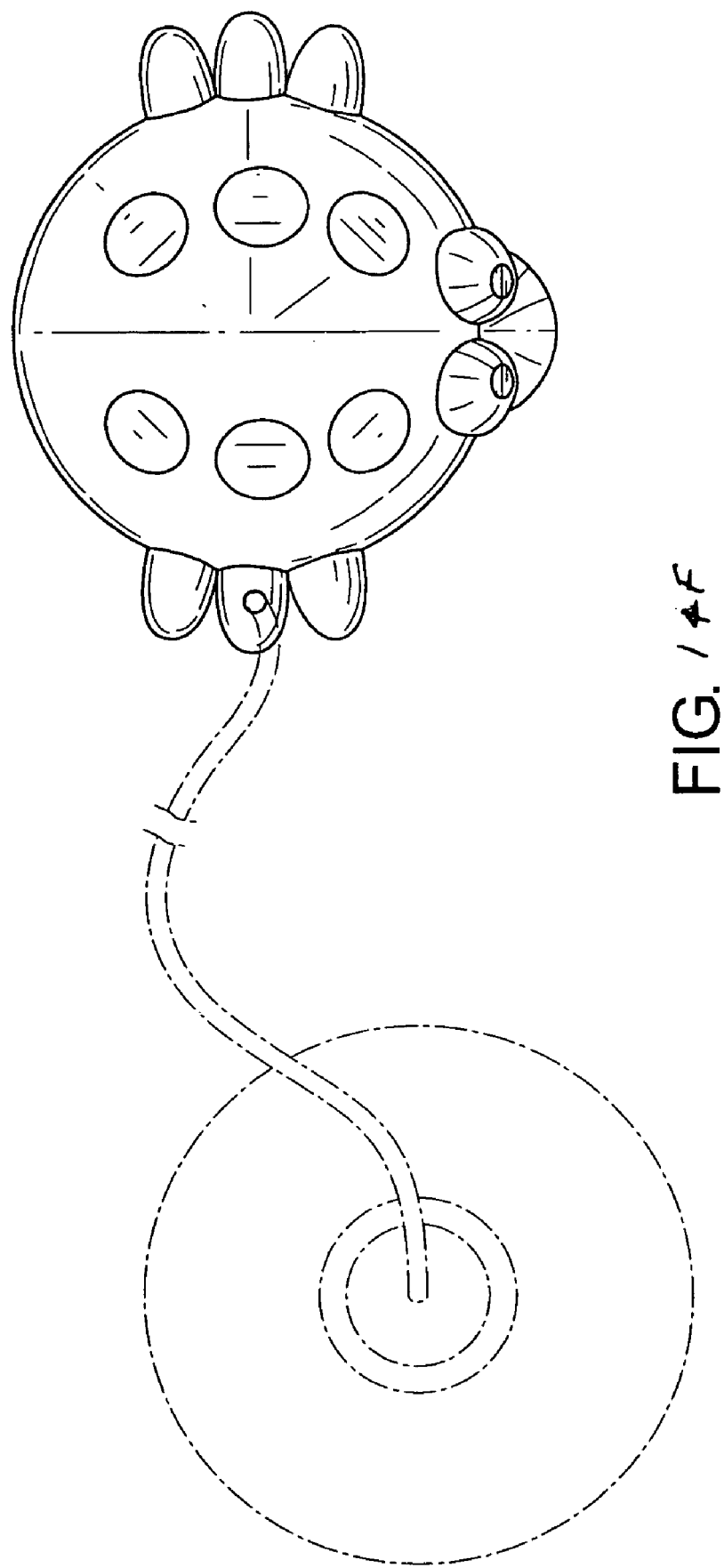

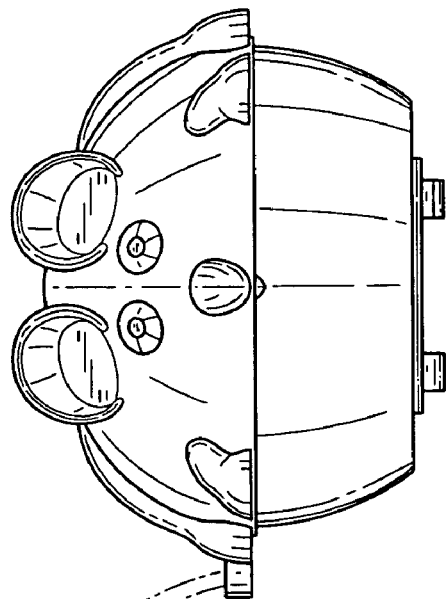
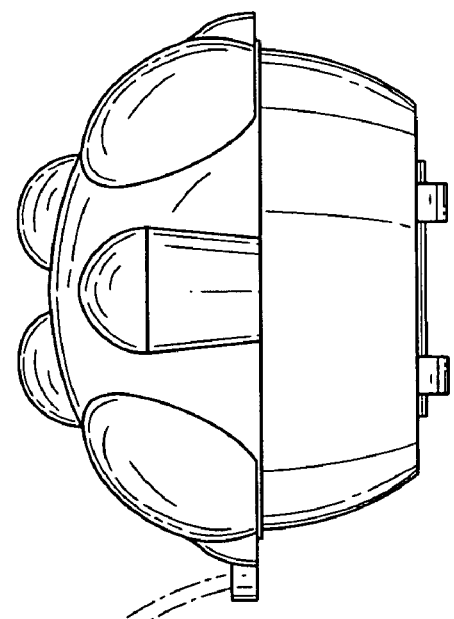
FIG. 15B
FIG. 15C

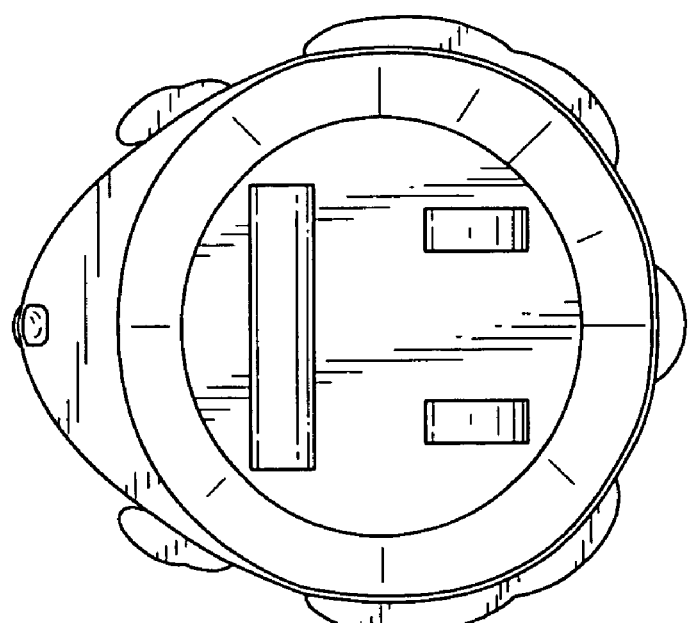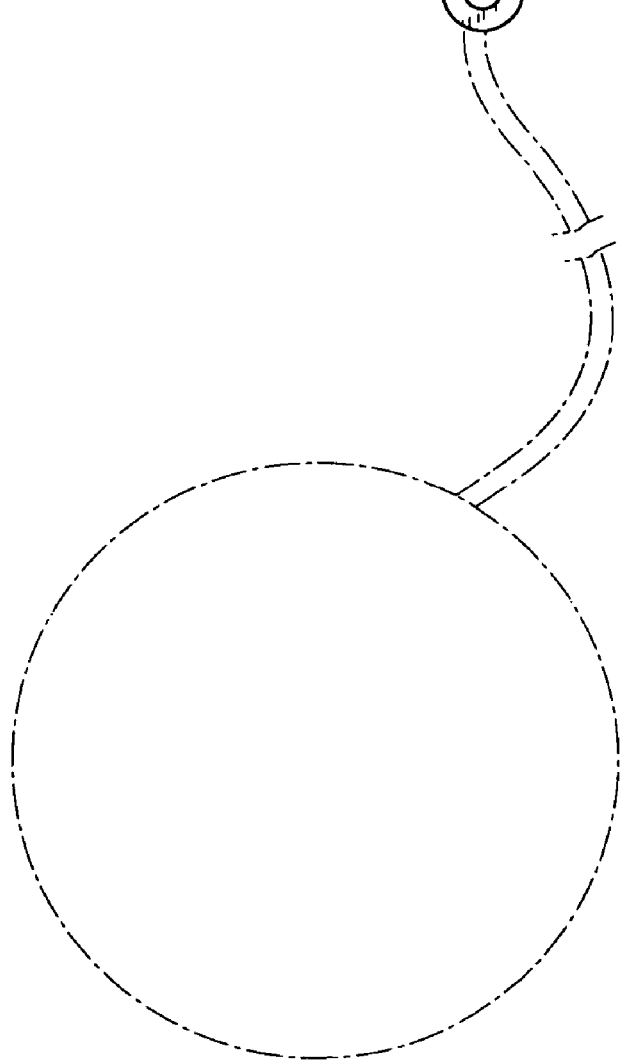
FIG. 156

SUBSTANCE-DISPENSING PET TOY

CROSS-REFERENCE TO RELATED APPLICATIONS

This application is related to the following United States design patent applications: Ser. No. 29/213,165, entitled "Revolving Anchored Pet Toy," filed on Sep. 13, 2004, naming Jack W. Renforth as inventor; Ser. No. 29/213,158, entitled "Revolving Anchored Pet Toy," filed on Sep. 13, 2004, naming Jack W. Renforth as inventor; Ser. No. 29/213,144, entitled "Revolving Anchored Pet Toy," filed on Sep. 13, 2004, naming Jack W. Renforth as inventor; Ser. No. 29/213,147, entitled "Revolving Anchored Pet Toy," filed on Sep. 13, 2004, naming Jack W. Renforth as inventor; Ser. No. 29/213,112, entitled "Revolving Anchored Pet Toy," filed on Sep. 13, 2004, naming Jack W. Renforth as inventor; Ser. No. 29/213,166, entitled "Revolving Anchored Pet Toy," filed on Sep. 13, 2004, naming Jack W. Renforth as inventor; Ser. No.29/213,145 entitled "Spherical Pet Toy," filed on Sep. 13, 2004, naming Jack W. Renforth as inventor; Ser. No.29/213,146, entitled "Rolling Pet Toy," filed on Sep. 13, 2004, naming Jack W. Renforth as inventor; Ser. No. 29/213,115, entitled "Rolling Pet Toy," filed on Sep. 13, 2004, naming Jack W. Renforth as inventor; Ser. No. 29/213,125, entitled "Rolling Pet Toy," filed on Sep. 13, 2004, naming Jack W. Renforth as inventor; Ser. No. 29/213,124, entitled "Pet Toy," filed on Sep. 13, 2004, naming Jack W. Renforth as inventor. These applications are hereby incorporated by reference in their entirety.

BACKGROUND OF THE INVENTION

1. Technical Field

The invention relates generally to pet toys, and more specifically to a pet toy that dispenses a substance, such as catnip, attractive to the pet.

2. Background Art

Cats are often considered by the misinformed to be aloof, detached creatures that would rather recline on a soft, plush rug than expend energy running about for no apparent purpose. However, those who better understand the true nature of domestic felines realize these very same animals become wild, energetic creatures exhibiting near-manic behavior when provided the proper impetus. Inducing such movement frequently in a cat is generally believed to provide health benefits and increased longevity to the pet, as well as produce emotional enhancement for the owner in the form of laughter.

Most cat owners employ at least one of two different ways of physically energizing their favorite feline companion. For one, many cats enjoy playing with a pet toy of some sort, especially one that exhibits movement. The types of toys that typically elicit a physical reaction from a cat range from simple objects, such as balls of yarn, to more complex devices, such as mechanical toys constructed to move suddenly when a cat makes contact with the toy.

The second way cat owners typically evoke physical exercise from their pet is to provide catnip. Catnip is a strongly aromatic perennial herb long recognized for its capacity to drive cats to a heightened state of activity. Even small amounts are known to drive a cat to distraction.

Given the foregoing, an apparatus combining the aforementioned advantages of a movable toy and catnip or similar substance would be advantageous.

SUMMARY OF THE INVENTION

Generally, embodiments of the present invention take the form of a pet toy comprising a compartment adapted to hold a substance attractive to a pet, such as catnip, and means for promoting movement of the compartment such that the substance, or an aroma of the substance, within the compartment may pass through a sifting hole of the compartment. In some implementations, the compartment may have an opening which is covered by a lid, which in turn may include the sifting hole.

In one particular embodiment, the toy comprises a rotating element, such as a ball or wheel, containing the compartment. The rotating element is contained within, and extends partially through a hole in the bottom of, a surrounding body. As the toy is pushed across a horizontal surface, some catnip or other substance escapes the compartment through the sifting hole. In some implementations, the toy may also include a torsion spring arrangement capable of being wound when the toy is moved across a surface. When the toy is released, the spring causes rotation of the rotating element, thus propelling the toy across the horizontal surface. Further, some embodiments of the toy may also include a tether coupling the body to an anchor to allow the body to turn or move about the anchor.

In another embodiment, a body is attached by way of a drawstring to a movable element containing the compartment. In one particular implementation, the drawstring is coupled to a torsion spring so that when the movable element is pulled away from the body resting on a horizontal surface, the spring operates to draw the movable element closer to the body by way of the drawstring, for example in a vibratory fashion, thus causing the catnip or other substance in the movable element to escape the compartment.

In yet another embodiment, a body comprising two hemispherical portions are coupled together and located on either side of a disc housing the compartment. A weight is coupled to the disc so that the compartment tends to remain upright during motion of the body. As a result, when a cat contacts the disc, the compartment may rotate temporarily, causing the catnip to exit the compartment. The weight then causes the compartment to return to its original upright position.

Additional embodiments and advantages of the invention will be realized by those skilled in the art upon reading the detailed description of the invention.

BRIEF DESCRIPTION OF THE FIGURES

FIG. 4A depicts a perspective view of a third embodiment of the invention exhibiting a ball in a first position.

FIG. 5B depicts a front view of the embodiment of FIG. 5A.

FIG. 5C depicts a rear view of the embodiment of FIG. 5A.

FIG. 5F depicts a top view of the embodiment of FIG. 5A.

FIG. 5G depicts a bottom view of the embodiment of FIG. 5A.

FIG. 5I depicts an exploded view of an embodiment based on the embodiment of FIG. 5A, employing a torsion spring.

FIG. 8A depicts a side view of an interior of a hemispherical portion of the embodiment of FIG. 7A.

FIG. 8B depicts a front view of the hemispherical portion of FIG. 8A.

FIG. 8C depicts a side view of an exterior of the hemispherical portion of FIG. 8A.

FIG. 9A depicts a front view of a disc used in the embodiment of FIG. 7A.

FIG. 9B depicts a side view of the disc of FIG. 9A.

FIG. 9C depicts a top view of the disc of FIG. 9A.

FIG. 10 depicts a bottom view of a compartment cap or lid for use in the embodiment of FIG. 7A.

FIG. 11A depicts a perspective view of a seventh embodiment of the invention.

FIG. 11G depicts a bottom view of the embodiment of FIG. 11A.

FIG. 12A depicts a perspective view of an eighth embodiment of the invention.

FIG. 12B depicts a front view of the embodiment of FIG. 12A.

FIG. 12C depicts a rear view of the embodiment of FIG. 12A.

FIG. 12D depicts a left side view of the embodiment of FIG. 12A.

FIG. 12E depicts a right side view of the embodiment of FIG. 12A.

FIG. 12G depicts a bottom view of the embodiment of FIG. 12A.

FIG. 13A depicts a perspective view of an ninth embodiment of the invention.

FIG. 13B depicts a front view of the embodiment of FIG. 13A.

FIG. 13C depicts a rear view of the embodiment of FIG. 13A.

FIG. 13F depicts a top view of the embodiment of FIG. 13A.

FIG. 13G depicts a bottom view of the embodiment of FIG. 13A.

FIG. 14B depicts a front view of the embodiment of FIG. 14A.

FIG. 14C depicts a rear view of the embodiment of FIG. 14A.

FIG. 14F depicts a top view of the embodiment of FIG. 14A.

FIG. 14G depicts a bottom view of the embodiment of FIG. 14A.

FIG. 15B depicts a front view of the embodiment of FIG. 15A.

FIG. 15C depicts a rear view of the embodiment of FIG. 15A.

FIG. 15G depicts a bottom view of the embodiment of FIG. 15A.

DETAILED DESCRIPTION OF THE INVENTION

1. Rolling Pet Toy

Generally, the embodiments described below involve cat toys that dispense catnip. However, principles of the present invention may also be applied to toys that dispense different substances, as well as to toys intended for other pets, such as dogs.

Figure 1A:
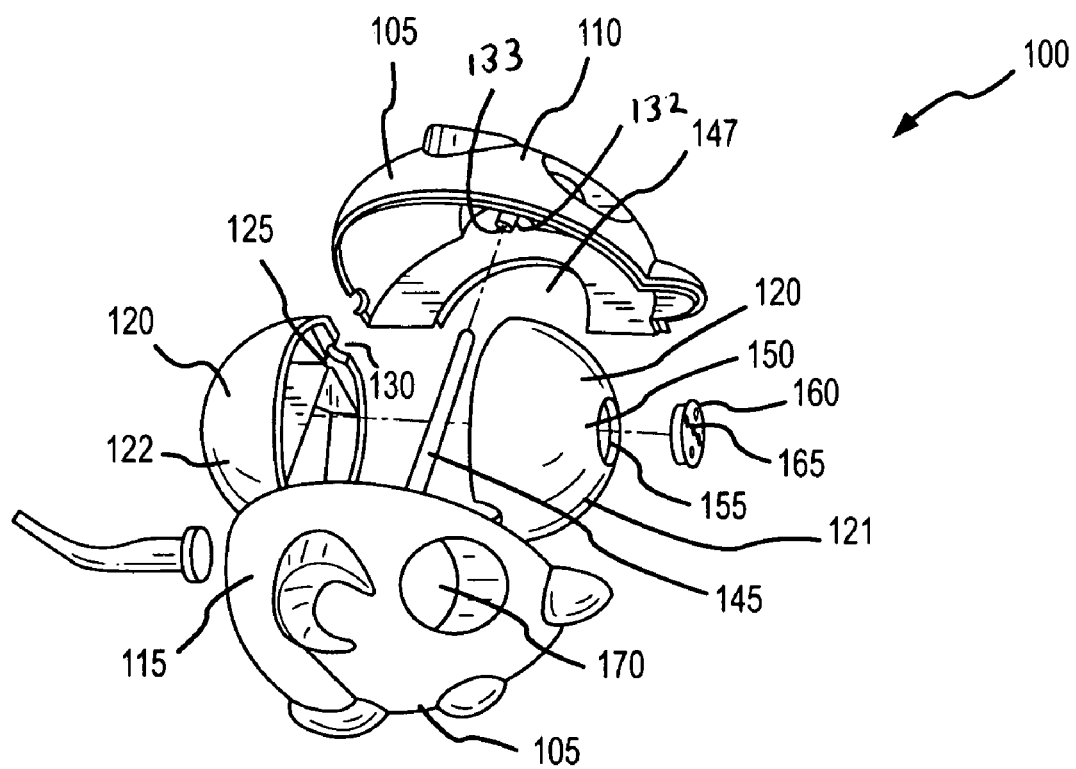
FIG. 1A depicts an exploded view of a pet toy according to a first embodiment of the invention.
Figure 2A:
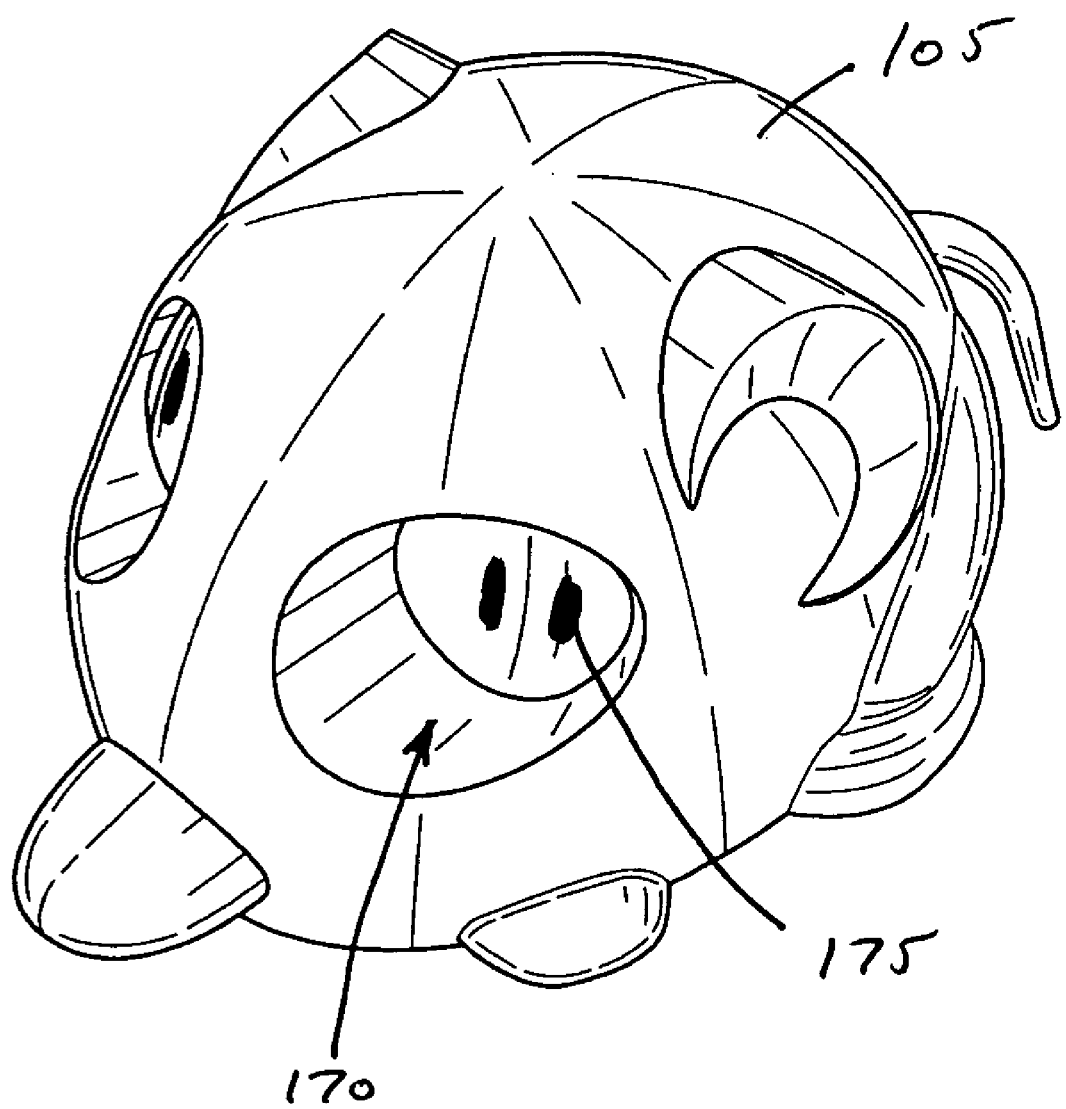
FIG. 2A depicts a perspective view of the embodiment of FIG. 1A exhibiting a ball in a first position.
Figure 2B:
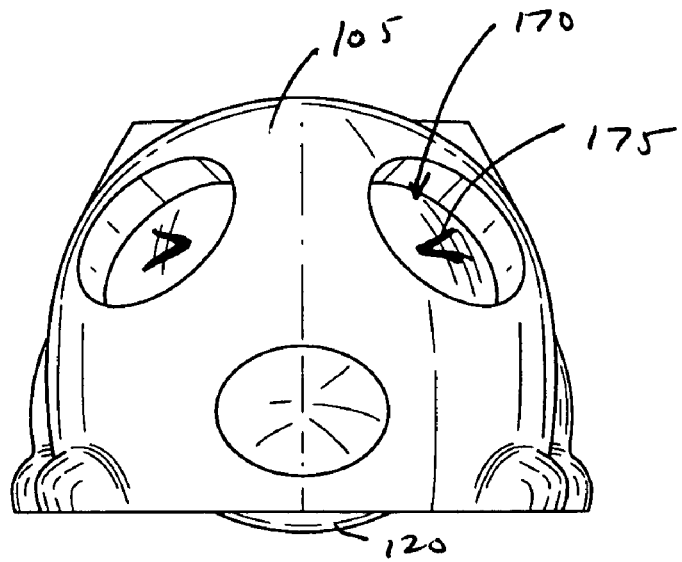
FIG. 2B depicts a front view of the embodiment of FIG. 1A exhibiting the ball in a second position.
Figure 2C:
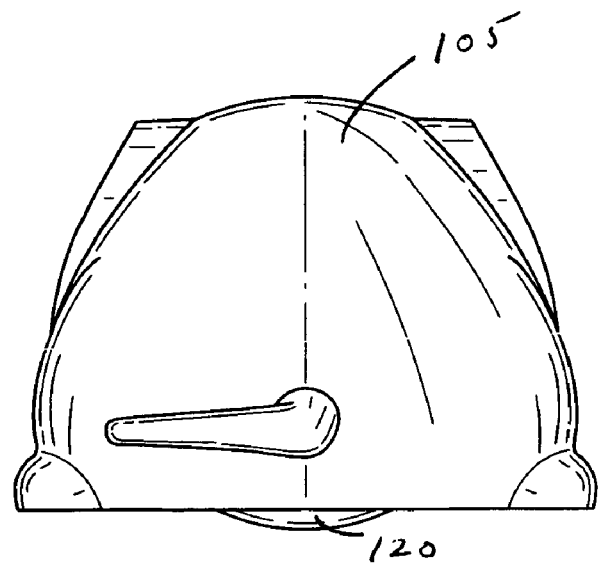
FIG. 2C depicts a rear view of the embodiment of FIG. 1A.
Figure 2D:
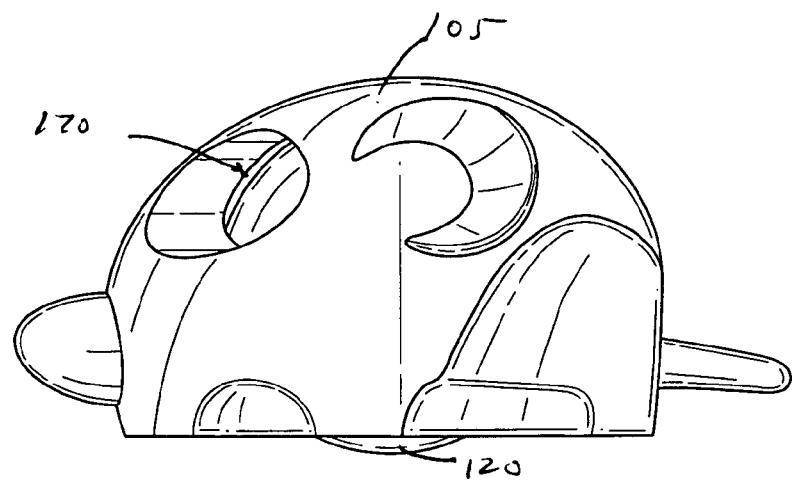
FIG. 2D depicts a left side view of the embodiment of FIG. 1A.
Figure 2E:
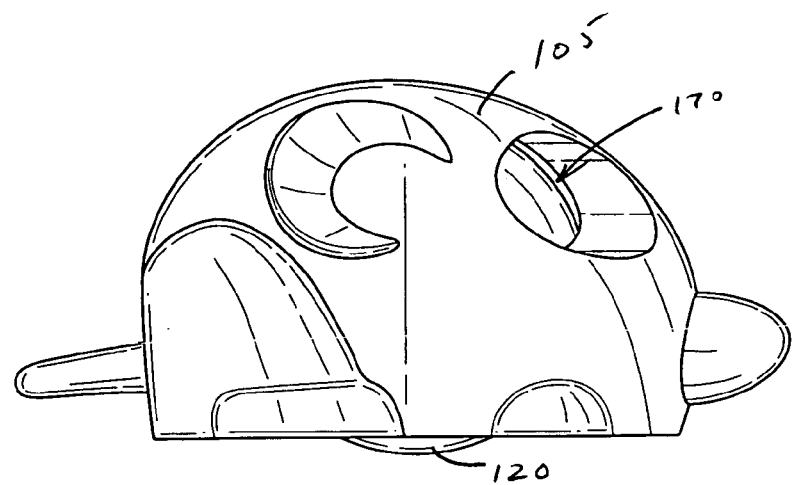
FIG. 2E depicts a right side view of the embodiment of FIG. 1A.
Figure 2F:
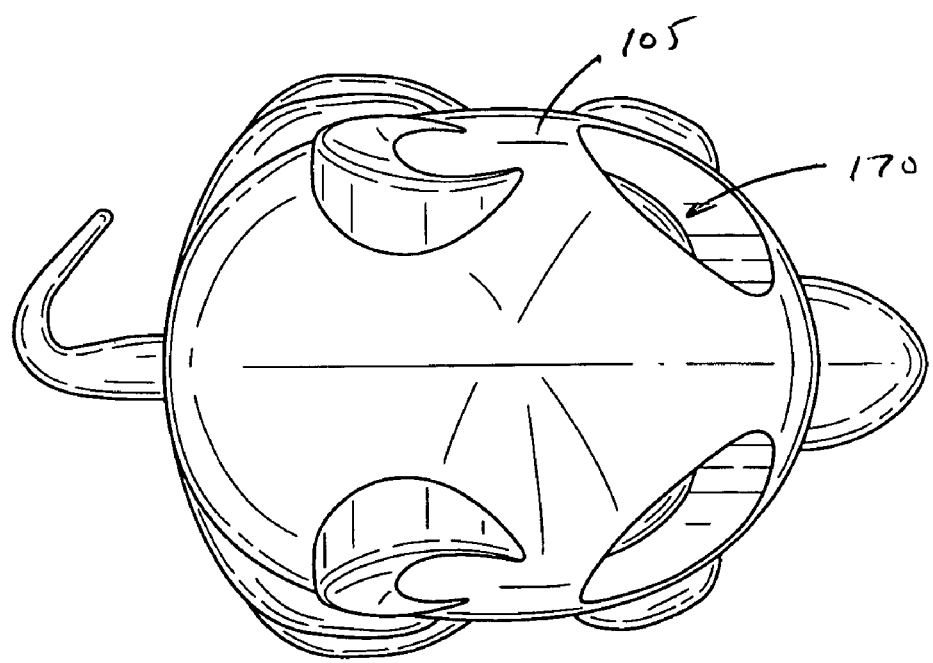
FIG. 2F depicts a top view of the embodiment of FIG. 1A.
Figure 2G:
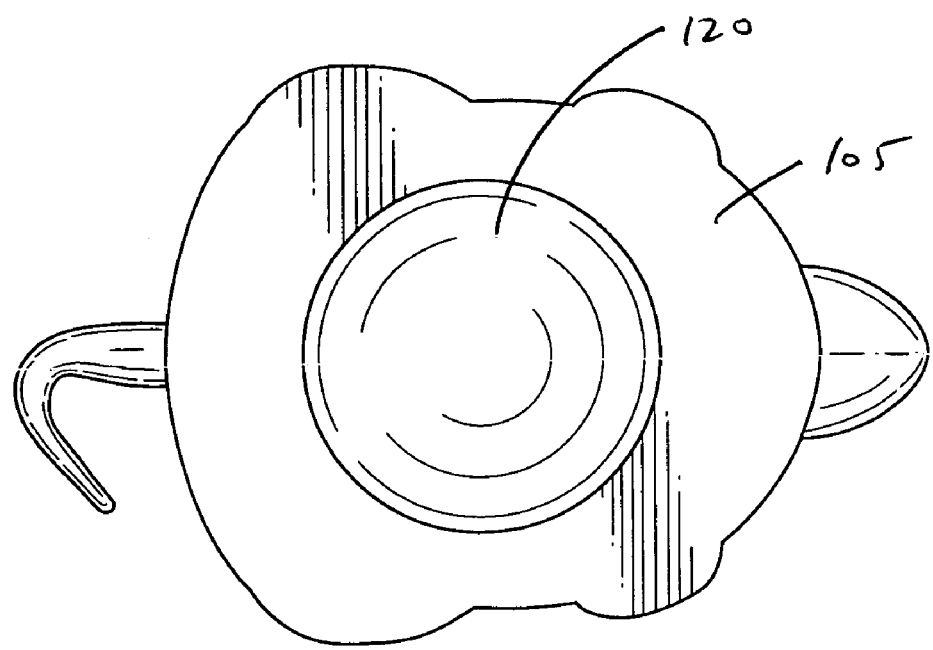
FIG. 2G depicts a bottom view of the embodiment of FIG. 1A.
Figure 3A:
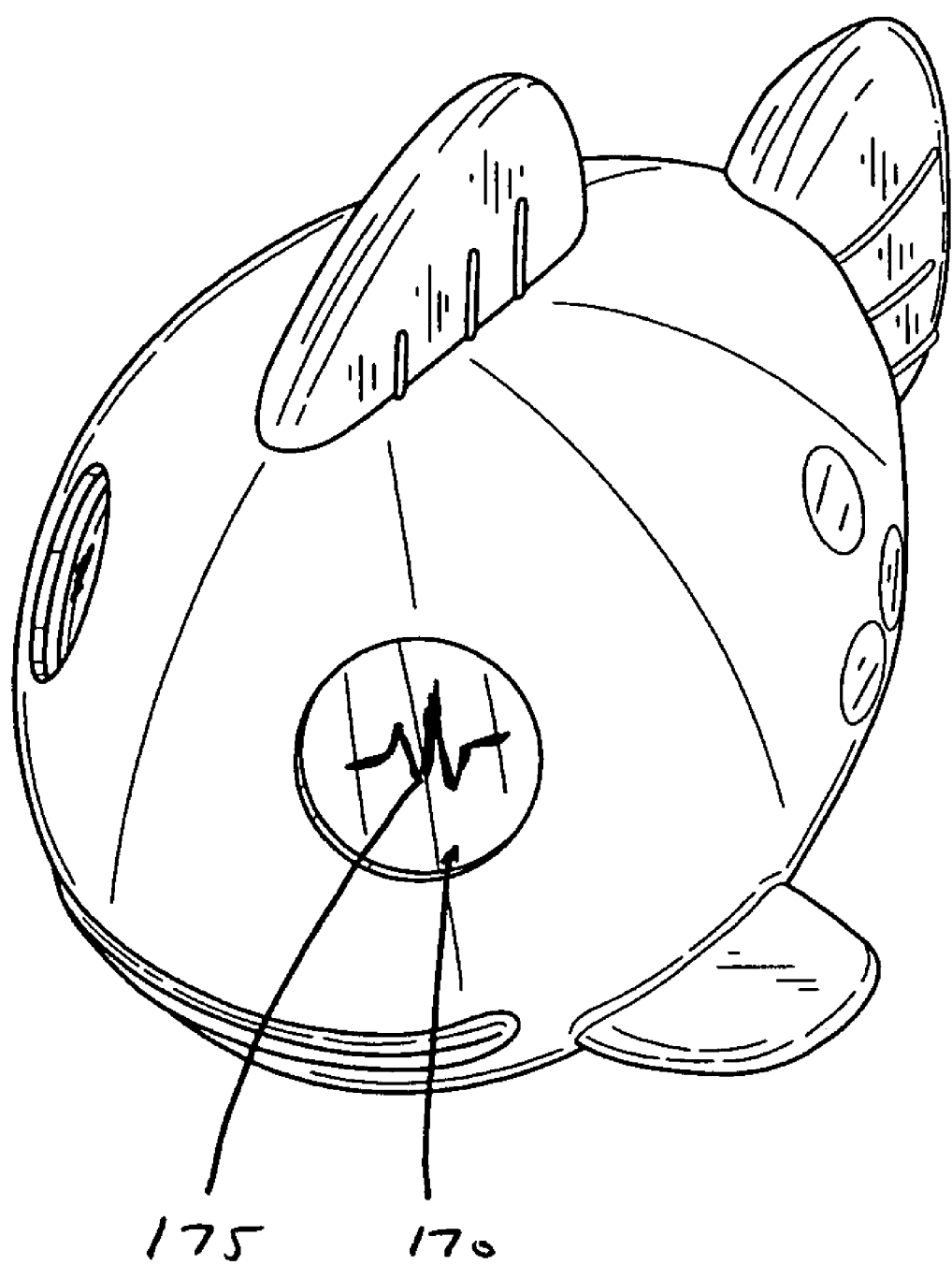
FIG. 3A depicts a perspective view of a second embodiment of the invention exhibiting a ball in a first position.
Figure 3B:
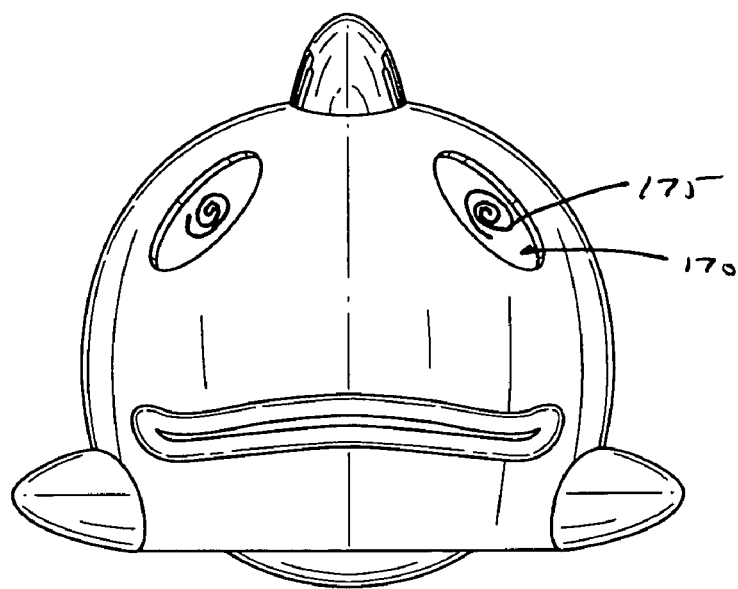
FIG. 3B depicts a front view of the embodiment of FIG. 3A exhibiting the ball in a second position.
Figure 3C:
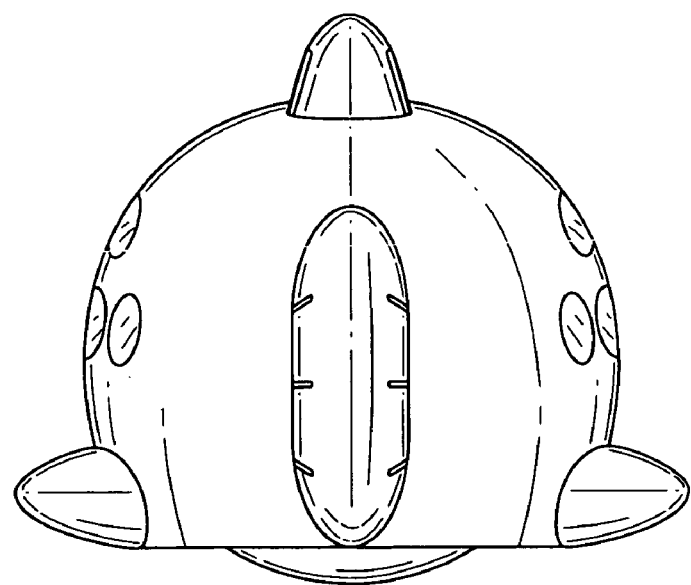
FIG. 3C depicts a rear view of the embodiment of FIG. 3A.
Figure 3D:
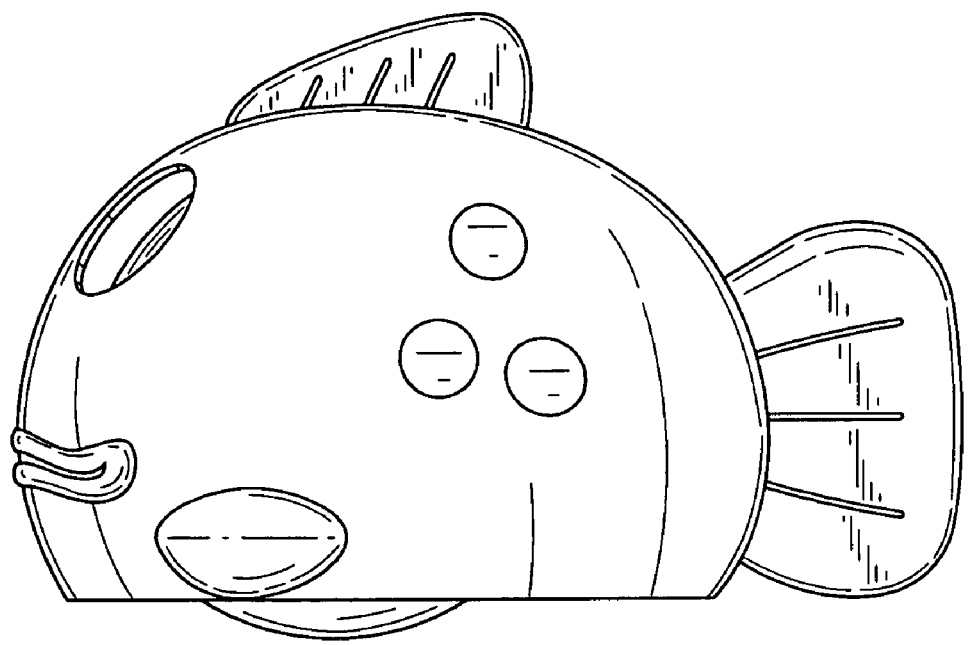
FIG. 3D depicts a left side view of the embodiment of FIG. 3A.
Figure 3E:
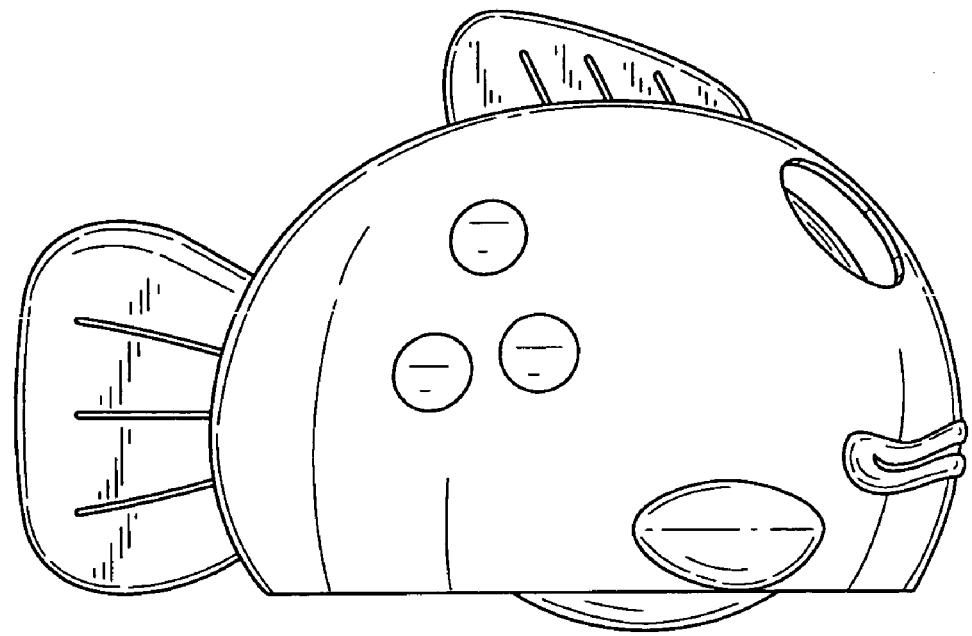
FIG. 3E depicts a right side view of the embodiment of FIG. 3A.
Figure 3F:
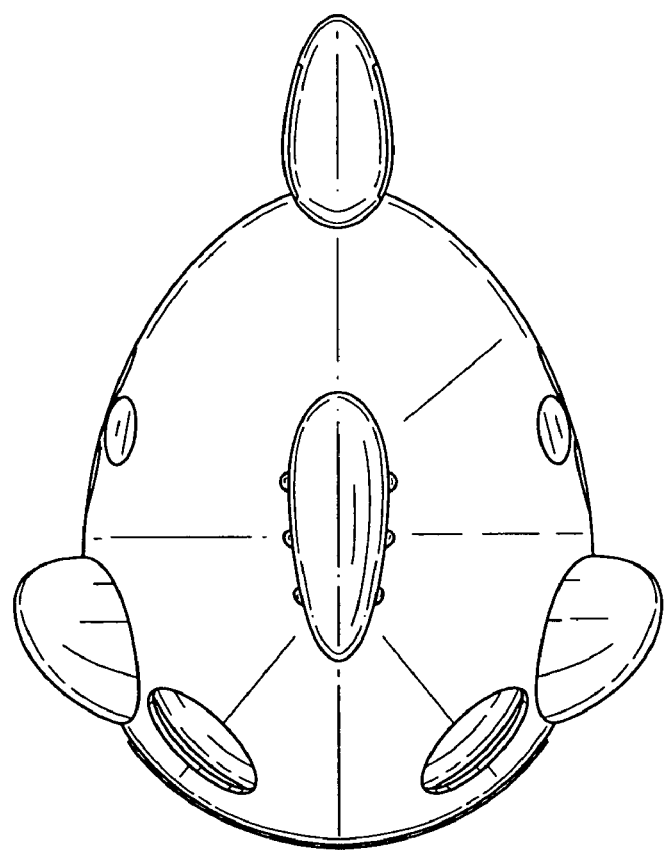
FIG. 3F depicts a top view of the embodiment of FIG. 3A.
Figure 3G:
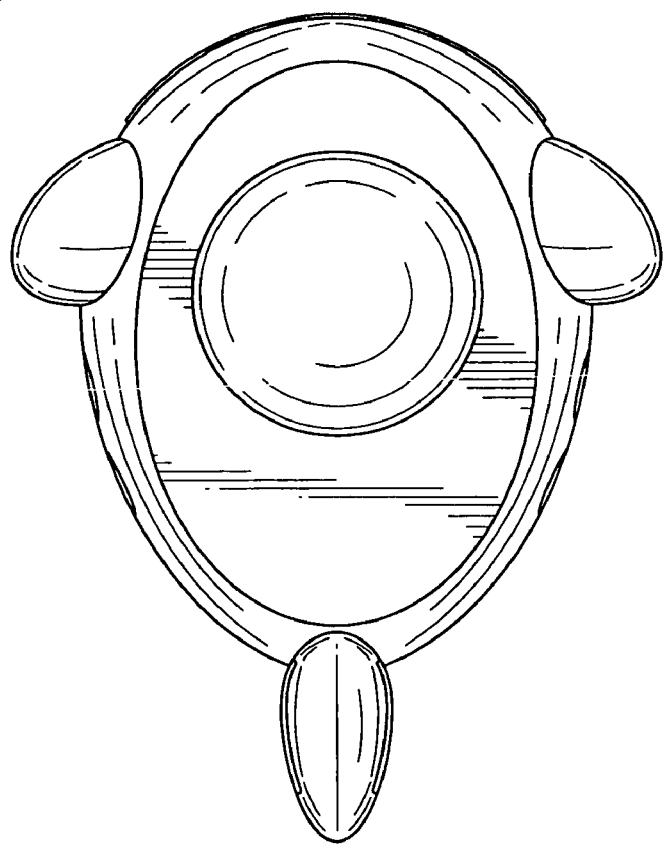
FIG. 3G depicts a bottom view of the embodiment of FIG. 3A.
Figure 44:
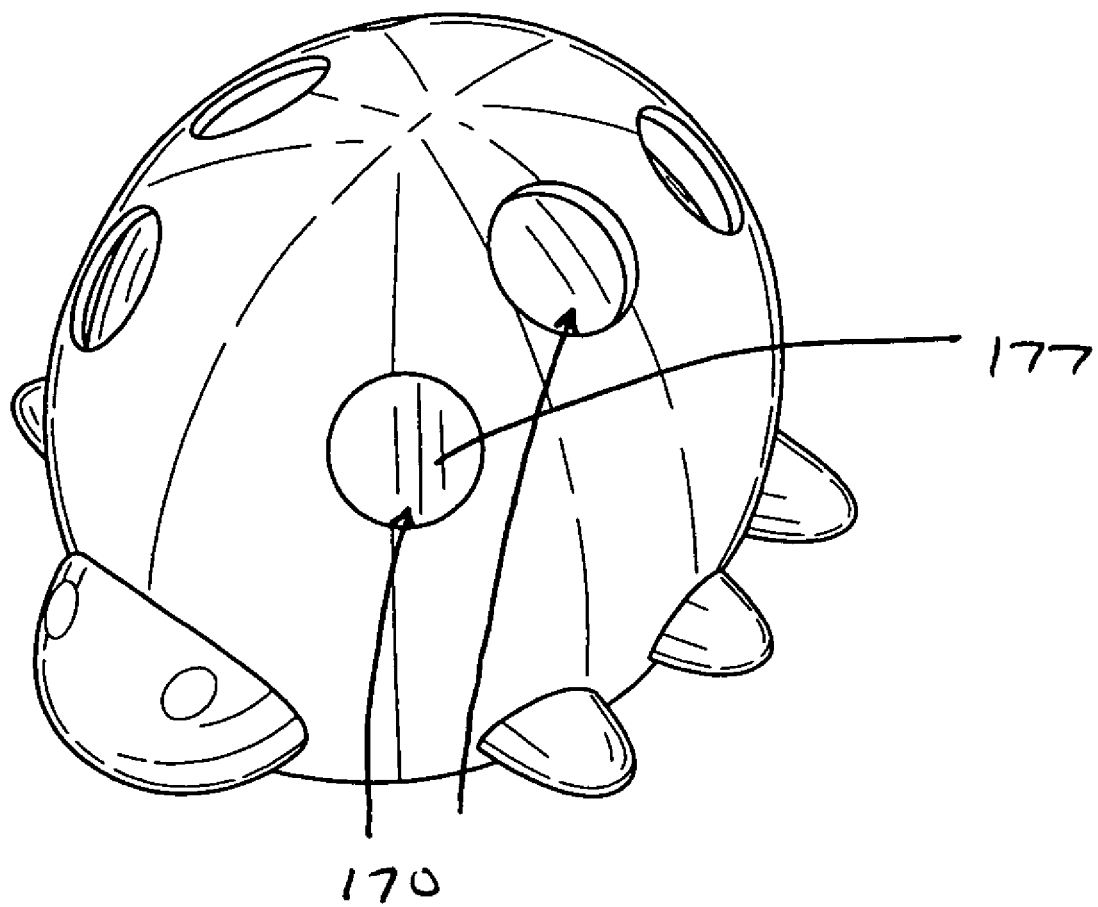
Figure 4B:
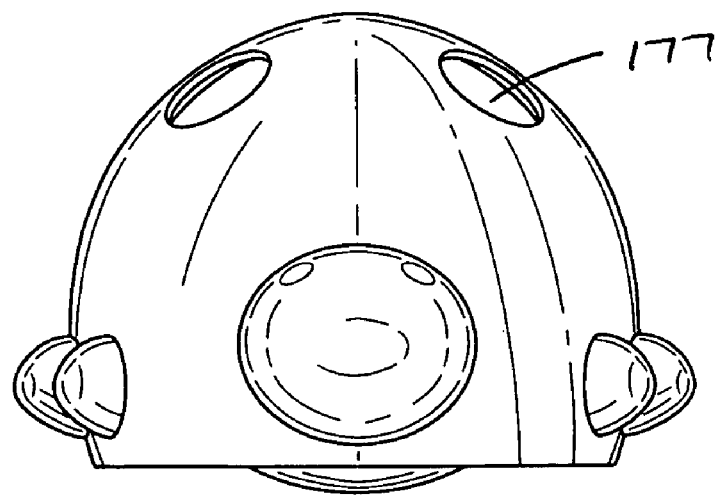
FIG. 4B depicts a front view of the embodiment of FIG. 4A exhibiting the ball in a second position.
Figure 4C:
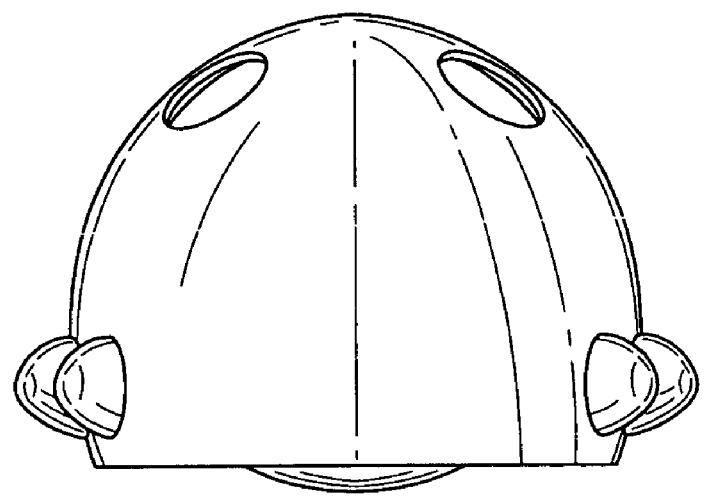
FIG. 4C depicts a rear view of the embodiment of FIG. 4A.
Figure 4D:
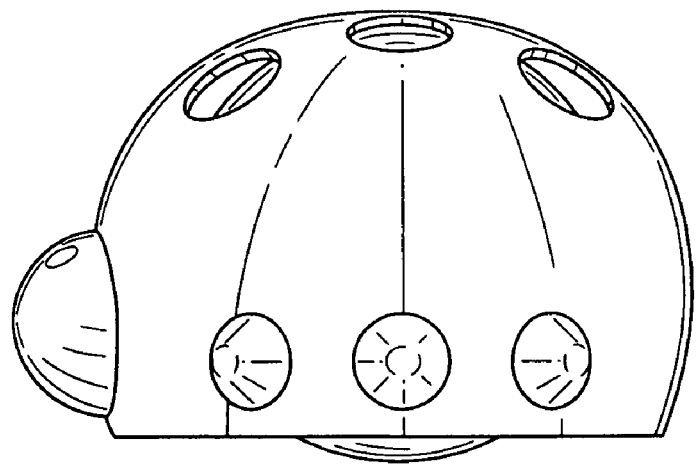
FIG. 4D depicts a left side view of the embodiment of FIG. 4A.
Figure 4E:
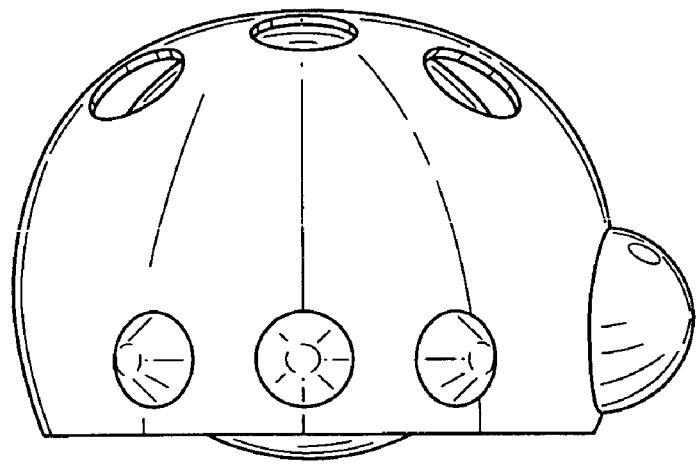
FIG. 4E depicts a right side view of the embodiment of FIG. 4A.
Figure 4F:
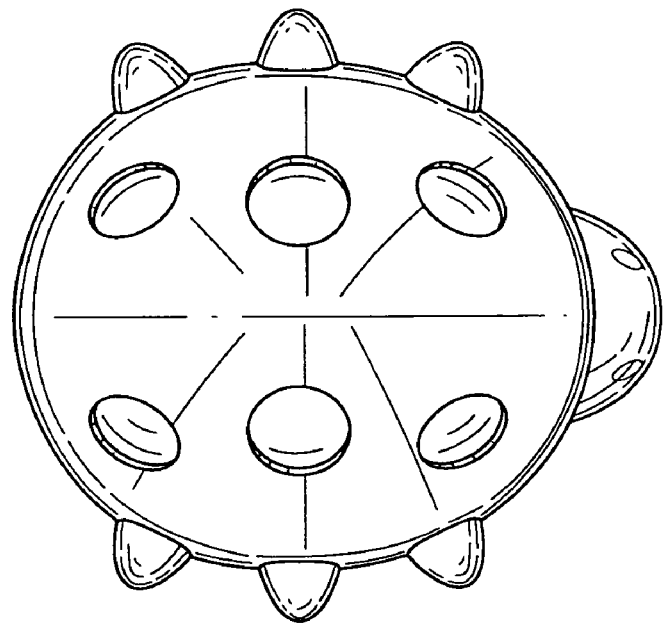
FIG. 4F depicts a top view of the embodiment of FIG. 4A.
Figure 4G:
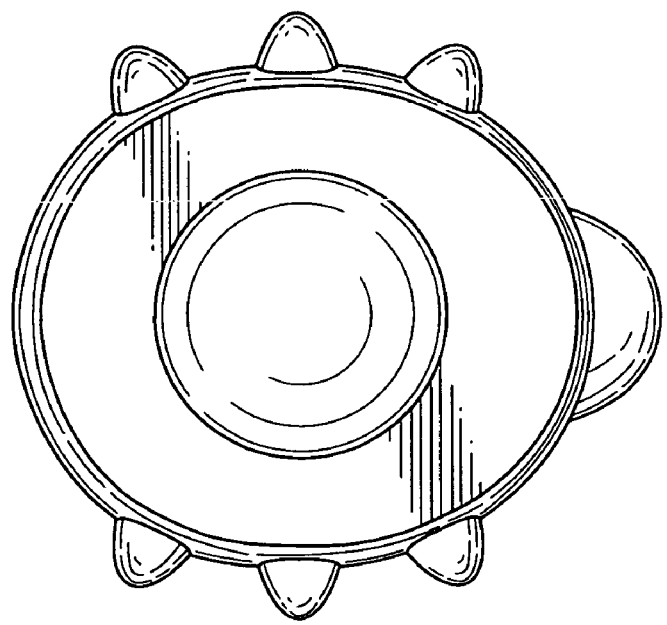
FIG. 4G depicts a bottom view of the embodiment of FIG. 4A.

One embodiment of the present invention, as shown in the exploded view of FIG. 1A, takes the form of a dispensing cat toy 100. Also, the toy 100 is depicted in an assembled state in perspective view (FIG. 2A), front view (FIG. 2B), rear view (FIG. 2C), left side view (FIG. 2D), right side view (FIG. 2E), top view (FIG. 2F), and bottom view (FIG. 2G). The toy 100 includes, among other elements, a body 105. In one particular implementation, the body 105 is plastic, hollow, and approximately three inches long, two inches wide, and two inches high. Alternative embodiments may employ a different material and/or varying dimensions from those described herein while still remaining within the scope of the invention.

In various embodiments of the invention, the body 105 is shaped to resemble any of a number of well-known animals. For example, the body 105 may resemble a mouse, as shown in FIG. 1A and FIGS. 2A-2G. Other possibilities include, but are not limited to, a fish (illustrated in FIGS. 3A-3G), ladybug or other insect (depicted in FIGS. 4A-4G), bird, butterfly, rabbit and so forth. Such shapes may make the toy 100 more attractive to a cat. Alternatively, simpler geometric shapes, such as spheres, cubes and the like, may also be employed for the body 105 to a similar end.

To further enhance the attractiveness of the toy 100, body 105 may comprise a single or multiple colors in an effort to add to or augment the visual details of the toy 100. Such colors may be bright or muted, depending on the desired optical effect. While cats are generally considered to be color-blind (or virtually so), the differences in brightness provided by colors of varying intensity are likely discernible by the cat. Interesting color schemes may also be attractive to a potential purchaser, such as a cat owner, which may be an important aspect of the toy 100 from a sales perspective.

Inside the body 105 resides a rotating element, such as a ball 120, typically spherical and made of plastic. In the particular embodiment of FIG. 1A, the ball 120 consists of first and second ball halves 121, 122, which may be snap-fit, heat-sealed, sonically welded, glued, screwed, or otherwise coupled together by any of a number of methods. In other implementations, the ball 120 may be shaped other than spherical. For example, the ball 120 may be more cylindrical or football-shaped.

Each hemisphere 121, 122 of the ball 120 defines a portion of each of two axle holes 125. When the ball is assembled, the axle holes 125 occupy diametrically-opposed positions on the ball 120. In one implementation, the axle holes 125 are defined by a surface recessed within the outer surface of the ball 120, thereby defining receptor holes 130 at the outer surface of the ball 120. The receptor holes 130 are aligned coaxially with, and larger in diameter than, the axle holes 125. The receptor holes 130 are configured to receive cylindrical protrusions 132 of the body 105, extending inward from the inner surface of the body 105 through the receptor holes 130, but not through the axle holes 125.

An axle 145 of a diameter slightly less than the diameter of the axle holes 125 and slightly longer than the distance between the axle holes 125 of the ball 120 is positioned to extend essentially equally through both axle holes 125. The axle is typically made of a metal, although other materials may be employed. Each end of the axle 145 also extends into a cylindrical recess 133 of each cylindrical protrusion 132 of the body 105 such that the axle is positioned in an essentially horizontal orientation.

Further, the cylindrical protrusions 132 are positioned such that the ball 120 extends partially through a large bottom hole 147 of the body 105. The bottom hole 147 is sized larger than the segment of the ball 120 extending through the hole 147 to permit rotation of the ball 120. This configuration allows a person or a cat to propel the toy along a horizontal surface by pushing the toy 100, causing the ball 120 contacting the horizontal surface to rotate about the axle 145, thus allowing the toy 100 to translate across the horizontal surface.

In alternative embodiments, the axle 145, the axle holes 125 and the cylindrical recesses 133 may be eliminated, thus allowing the ball 120 to simply be supported by, and rotate about, the cylindrical protrusions 132 extending into the receptor holes 130. Oppositely, the receptor holes 130 and the cylindrical protrusions 132 may be removed. In that case, the axle holes 125 would be located at the outer surface of the ball 120. The axle 145 would then extend through the axle holes 125 and into a set of cylindrical recesses formed within the inner surface of the body 105.

Still with respect to FIG. 1A, in one implementation the body 105 is constructed from a left body portion 110 and a right body portion 115, with each portion 110, 115 having one of the cylindrical protrusions 132. The large bottom hole 147 is thus shared equally between the left and right body portions 110, 115. Use of the left and right body portions 110, 115 facilitates insertion of the ball 120 within the body 105 as well as the assembly of the toy 110 in general. In alternative embodiments, the body 105 may be apportioned differently, such as front and back portions or top and bottom portions. The left and right body portions 110, 115 may be glued, snap-fit, or adhered together by any other means known in the art.

Figure 1B:
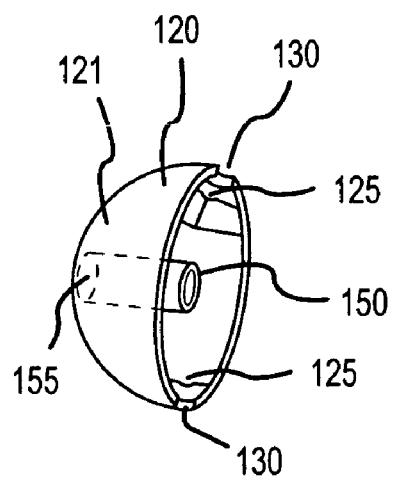
FIG. 1B depicts a perspective view of a ball half of the embodiment of FIG. 1A having a catnip compartment.

Within the ball 120 lies a compartment 150 configured to hold a small amount of catnip or similar substance. As shown to best effect in FIG. 1B, the compartment 150 is a small enclosure integrated with a ball half 121. In alternative embodiments, the interior of the ball 120 may form the compartment 150. The compartment 150 is accessible by way of a compartment opening 155 located at the surface of the ball 120 approximately halfway between the axle holes 125. The opening 155 is covered by a lid 160 comprising one or more distribution or sifting holes 165. The lid 160 is removably affixed to the ball 120 by way of a snap-fit. The lid 160 may thus be removed from the ball 120 to expose the compartment 150. Other methods of attaching the lid 160 to the ball 120, such as a hinge or threading, may also be employed to a similar end. Generally, the lid 160 and the opening 155 are designed and manufactured so that repeated removal and replacement of the lid 160 may be accomplished without the lid 160 eventually becoming loose in the opening 155.

The sifting holes 165 of the lid 160 are dimensioned to allow some amount of catnip to exit the compartment 150 in a controlled fashion when the ball 120 is oriented such that the compartment opening 155 faces at least partially downward. Thus, when the toy 100 is propelled or pushed across a horizontal surface, the ball 120 rotates about the axle 145, and the compartment opening 155 and the lid 160 are thus oriented downward toward the horizontal surface once per revolution of the ball 120. Hence, a small amount of catnip escapes through the sifting holes 165 of the lid 160 once per ball 120 revolution onto the horizontal surface. Since the body 105 covers the majority of the ball 120 at all times, the catnip typically escapes the compartment 150 and the body 105 only when the sifting holes 160 of the lid 165 project through the large bottom hole 147 of the body 105. The escaped catnip is then exposed as the toy moves on the horizontal surface, much to the pleasure of the cat. Additionally, the sifting holes 165 allow the aroma of the catnip to escape the compartment 150, thus providing an olfactory incentive for the cat to play with the toy 100. Once the compartment 150 has been emptied of catnip, the lid 160 may be removed, the catnip replenished, and the lid 160 replaced. In alternate embodiments, the sifting holes 165 are sized such that only the aroma of the catnip, and not the catnip itself, may escape the compartment 150.

Generally, the size of the large bottom hole 147 in comparison to the size of the base of the body 105, coupled with the projection of at least a portion of the ball 120 through the hole 147, essentially maintain the upright orientation of the toy when it translates across a horizontal surface (i.e., the large bottom hole 147 continues to face the horizontal surface).

In an alternative embodiment, the sifting holes 165 may reside in the ball 120 itself rather than the lid 160, thereby allowing catnip in the compartment 150 to escape without passing through the lid 160 covering the compartment opening 155. Accordingly, the compartment opening 155 would then be used primarily for refilling the compartment 150 with catnip.

Figure 1C:
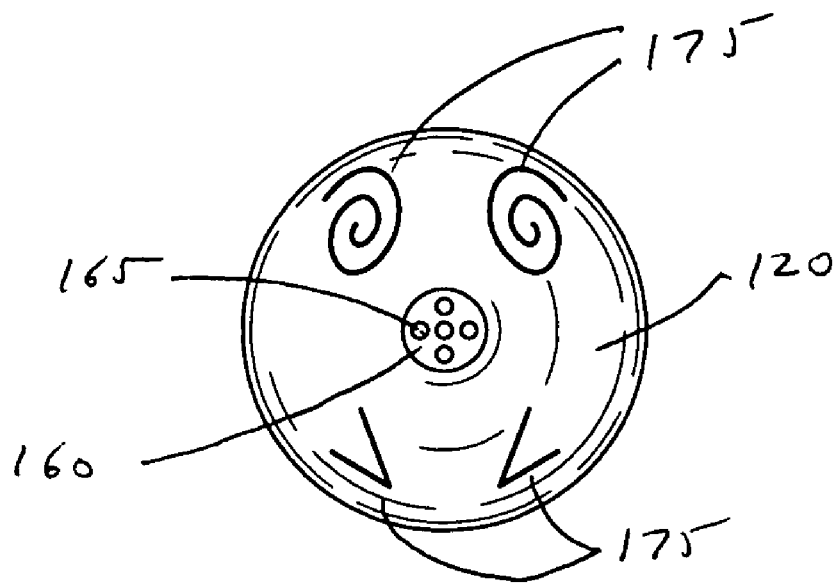
FIG. 1C depicts a front view of a ball used in the embodiment of FIG. 1A.
Figure 1D:
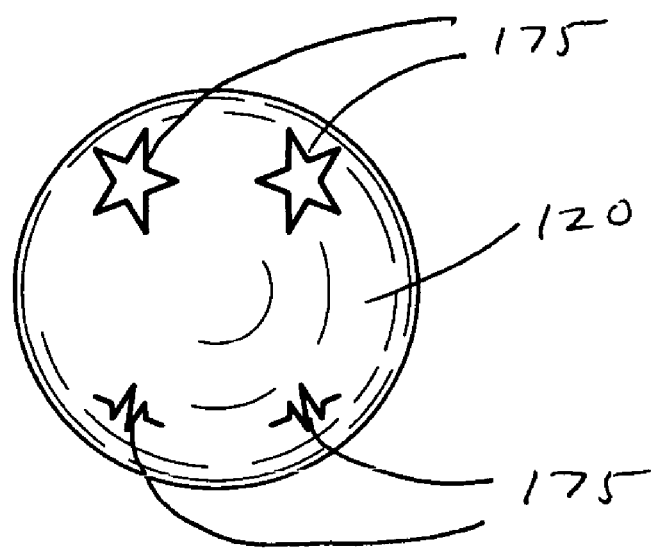
FIG. 1D depicts a back view of a ball used in the embodiment of FIG. 1A.

To increase the visual attractiveness of the toy 100, some implementations of the body 105 may include one or more see-through holes or ports 170 (shown in FIGS. 2A, 2B, 3A, 3B, 4A and 4B) through which the exterior of the ball 120 may be seen. In one implementation, the ports 170 are approximately one-half inch in diameter. In addition, the ball 120 may have graphical designs 175 printed or stamped thereupon so that they may be seen through the ports 170. For example, if the body 105 is shaped like a fish, mouse, or other animal, the body 105 may include two ports 170 representing eyes, as seen in FIGS. 2A, 2B and 3A-3C. Further, the ball 120 may include a series of designs 175 on its surface, aligned with the ports 170, that depict pupils, eyelashes or similar features associated with eyes (or even swirls or non-eye-related patterns). Thus, as the ball 120 rotates about the axle 145, a sequence of patterns on the ball exterior may be seen. In an alternative implementation, the designs on the ball 120 may just be a variety of geometric shapes, such as stars, triangles and the like. As an example, FIGS. 1C and 1D provide two opposing views of a ball 120 upon which several different designs 175 are printed.

In other embodiments, multiple ports 170 may be located in the body, through which multiple areas of varying color 177 on a ball 120 may be viewed, resulting in multicolored flashes being exhibited at the ports 170 when the toy 100 is pushed across a horizontal surface. For example, the toy may be fashioned to resemble a ladybug (seen in FIGS. 4A and 4B) having such multiple ports 170 along its back, through which varying colors 177 of a ball 120 may be seen as the toy is pushed along. Additionally, the implementation employing a ball 120 with colors 177 may be employed in an embodiment with a body 105 having ports 170 resembling eyes. Similarly, embodiments employing multiple ports 170 along the top of a body 105 may utilize a ball 120 employing geometric shapes and other graphical designs on its surface.

Returning to FIG. 1A, to enhance the movement capability of the cat toy 100, a torsion spring 180 (not shown) may couple the ball 120 with the body 105 in such a way that grasping and pulling the toy 100 backward a short distance along a horizontal surface will tighten the spring 180. Thereafter, when the toy 100 is released, the tightened spring 180 will force the ball 120 to rotate in the opposite direction, thus propelling the toy 100 forward, periodically releasing catnip as the ball 120 rotates. In one embodiment, the torsion spring resides within the ball 120 and is wound around the axle 145. One end of the torsion spring is then connected to the axle 145, while the other end is attached to the interior of the ball 120. In alternative embodiments, two torsion springs, one located near each end of the axle 145, may be used. In other implementations, other similar propulsion structures found in children's toys, such as rubber bands, may be employed.

Additionally, the compartment 210 may not reside in the ball 120, but instead be placed within the body 105. In that case, alternative means for allowing the toy 200 to roll across a horizontal surface may be employed. For example, the ball 120 may be replaced by one or more rotating elements, such as one or more wheels rotating about an axle held by the body 105.

2. Tethered Rolling Pet Toy

Figure 5A:
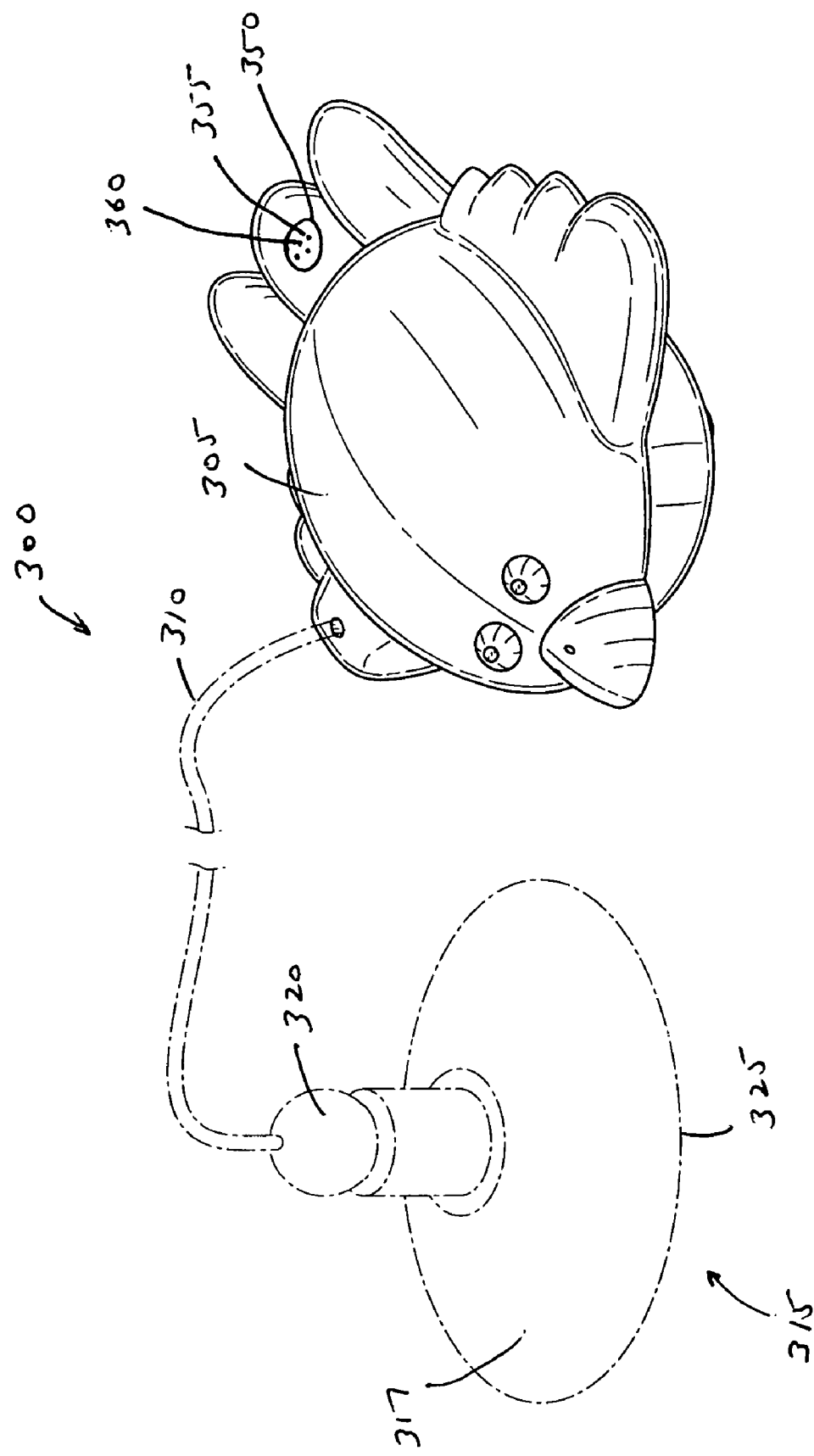
FIG. 5A depicts a perspective view of a fourth embodiment of the invention.
Figure 5D:
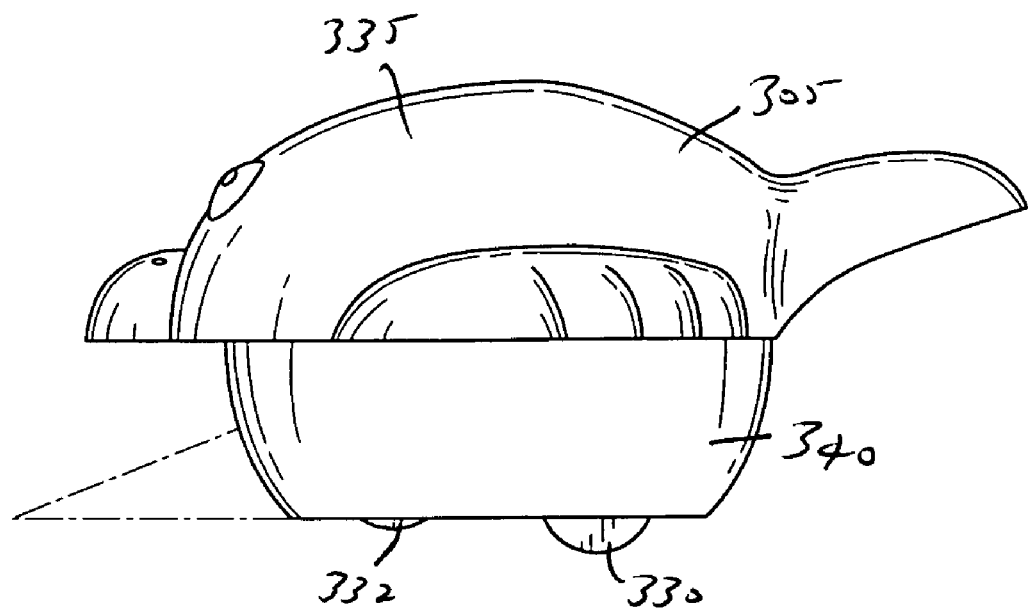
FIG. 5D depicts a left side view of the embodiment of FIG. 5A.
Figure 5E:
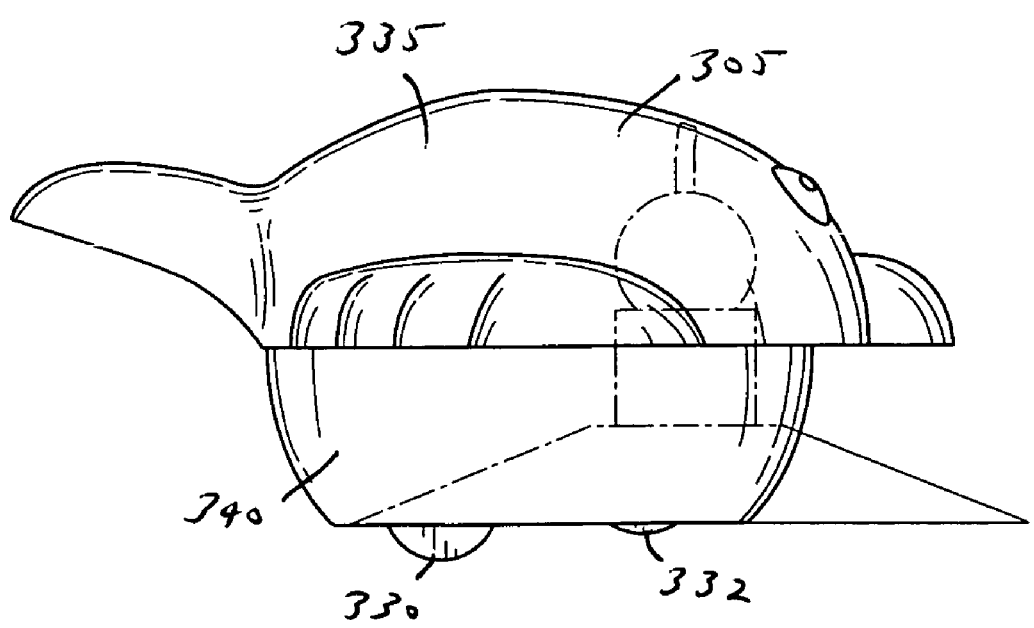
FIG. 5E depicts a right side view of the embodiment of FIG. 5A.
Figure 3F:
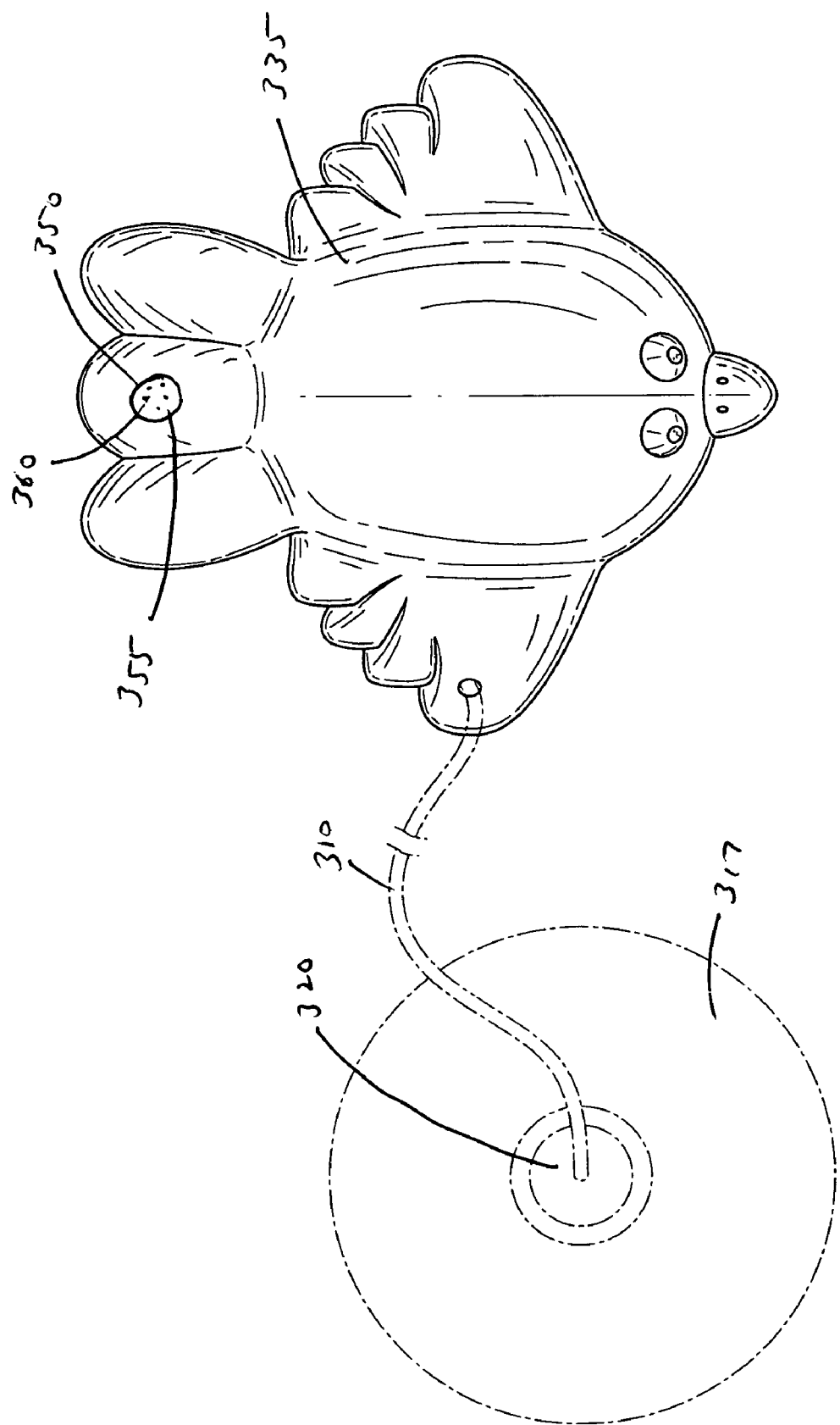
Figure 56:
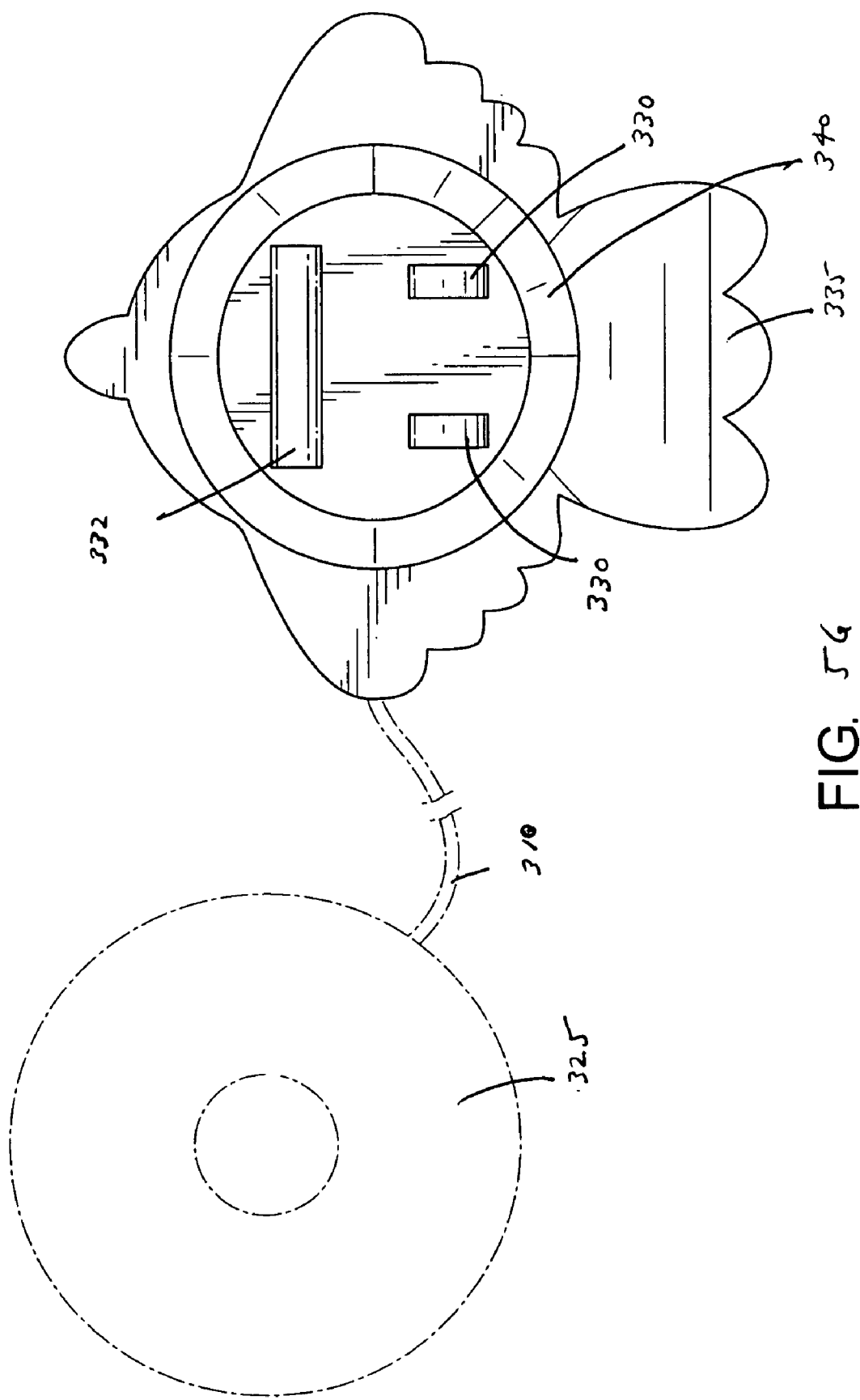

In another embodiment as shown in FIGS. 5A-5G, and with particular reference to FIG. 5A, a tether 310 may be fixably attached at one end to a body 305, similar to the toy body 105 described above. The tether 310 may be made of plastic, twine, cotton rope, or any other suitable material. An anchor 315 is rotatably coupled with the other end of the tether 310, thus providing a tethered toy 300 that revolves around the anchor 315 due to the centripetal force imparted by the tether 310.

To help prevent the tether 310 from becoming entangled with the anchor 315, the anchor 315 may comprise a pivot structure 320 rotatably connected to a base 317 of the anchor 315. The tether 310 attaches to the pivot structure 320 such that the pivot structure 320 rotates with respect to the base 317 as the body 305 revolves about the anchor 315.

To prevent excessive movement of the anchor 315 while the body 305 revolves about the anchor 315, the anchor 315 may further comprise a downward-facing suction cup 325 that may be pressed against a hard horizontal surface, thus creating a suction that helps the anchor 315 maintain a stationary position. In the alternative, the anchor 315 may be made of sufficient weight that renders the suction cup 320 unnecessary. Other structures, such as a high-friction bottom surface, may also be used to aid the anchor in maintaining a stable location during the operation of the toy 300.

The body 305 shown in FIG. 5A resembles a bird. This same embodiment is also illustrated in front view (FIG. 5B), rear view (FIG. 5C), left side view (FIG. 5D), right side view (FIG. 5E), top view (FIG. 5F), and bottom view (FIG. 5G). Other possible shapes include, for example, a mouse (FIGS. 11A-11G), fish (FIGS. 12A-12G), butterfly (FIGS. 13A-13G), ladybug (FIGS. 14A-14G) and bunny (FIGS. 15A-15G). As mentioned above, the use of such animal shapes tend to enhance the attractiveness of the toy 300 for both pets and their owners. In alternative embodiments, simpler geometric shapes, such as cubes and spheres, may also be employed for the body 305.

In the embodiment of FIGS. 5A-5G, and shown to best effect if FIGS. 5B and 5C, the body 305 comprises a top body portion 335 and a bottom body portion 340. One advantage of apportioning the body 305 in such a manner is that a single bottom body portion 340 design may be employed in conjunction with any number of embodiments employing different top body portions 335 representing different animals, such as those shown in FIGS. 11A-11G, 12A-12G, 13A-13G, 14A-14G and 15A-15G.

Instead of a catnip compartment residing in a ball, as described above, the cat toy 300 may employ a compartment (not visible), comprising an opening 350 configured to receive a lid 355 located on the top or near the rear of the body 305, as shown in FIG. 5A. As before, the lid 355 is removable so that catnip or a similar substance could be placed inside the compartment. Given the location and orientation of the stationary compartment, the catnip may not escape the compartment through exit holes under ordinary circumstances. However, a cat would still detect the aroma of the catnip, which would pass through one or more holes 360 in the lid 355. Alternatively, some of the catnip may indeed escape via the holes 360 merely as a result of the revolving motion of the toy 300, acting to jar and shake catnip in the compartment through the holes 360. Indeed, by properly sizing the exit holes 360, catnip flakes may generally block exit through the holes 360 until realigned by the motion of the toy 300.

Figure 5H:
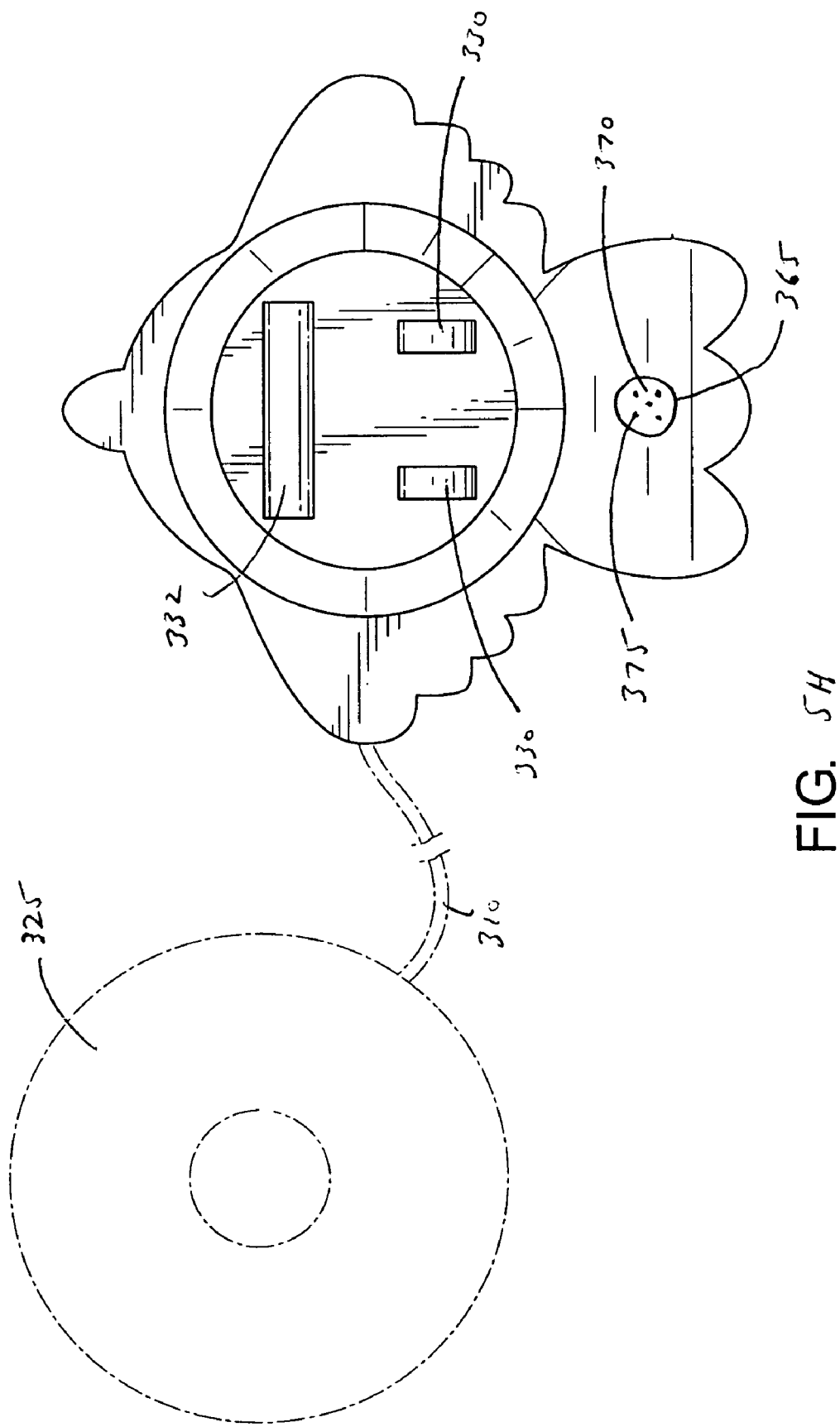
FIG. 5H depicts a bottom view of an embodiment based on the embodiment of FIG. 5A, showing an alternative location for a compartment lid.

In further embodiments, the compartment may reside within the body 305 such that the opening of the compartment faces in a substantially downward or sideways direction with respect to the body 305. For example, FIG. 5H depicts an alternative embodiment of the toy illustrated in FIGS. 5A-5G in which a compartment opening 365 is located underneath the top body portion of the toy. The opening 365 is covered with a lid 370 having one or more holes 375 through which either the catnip itself or its aroma may pass.

In reference to FIGS. 5B-5E, 5G and 5H, a set of two wheels 330 protrude through corresponding holes in the bottom body portion 340. In other embodiments, more or fewer wheels may be employed. (For example, FIG. 5I depicts an alternative embodiment employing four wheels 330.) A cylindrical protrusion 332 extending from the bottom of the bottom body portion 340 provides stability to the body 305. Each of the wheels 330 rotate about a horizontal axis such that the body 305 is allowed to translate across a horizontal surface in a stable manner.

In addition, a torsion spring (not visible) may be employed to provide more interesting movement of the toy 300. FIG. 5I provides an example of such an embodiment, wherein the torsion spring is housed within a spring enclosure 380 to which the wheels 330 are attached. Portions of each wheel 330 extend through associated holes 382 in a bottom body portion 385. The spring enclosure 380 is held securely within the bottom body portion 385 and a top body portion 387 by heat-sealing the enclosure 380 to the bottom or top body portion 385, 387, glue, screws, material extensions within the body portions 385, 387, or another suitable attachment method. In such an embodiment, the spring may be aligned coaxially with one or more of the wheels 330, attached at one end to the wheels 330, and connected at the other end to the interior of the spring enclosure 380. Thus, the torsion spring may be wound by pulling the body 305 along the horizontal surface about the anchor 315 in a direction opposite the intended direction of motion, thereby rotating the wheels 330 and tightening the spring. When released, the torsion spring unwinds, thus propelling the body 305 forward while distributing catnip from a compartment 305 about the horizontal surface.

Embodiments described above regarding the cat toy 100 may also be employed by the revolving cat toy 300 to similar advantage. For example, a ball may be employed in lieu of the wheels 330 to reduce the number of components required for the toy 300. In such a case, a compartment for holding the catnip may reside within such a ball, instead of within the body 305. Similarly, other aspects of the cat toy 100 may also be implemented in conjunction with the revolving pet toy 300 described herein.

3. Drawstring Pet Toy

Figure 6A:
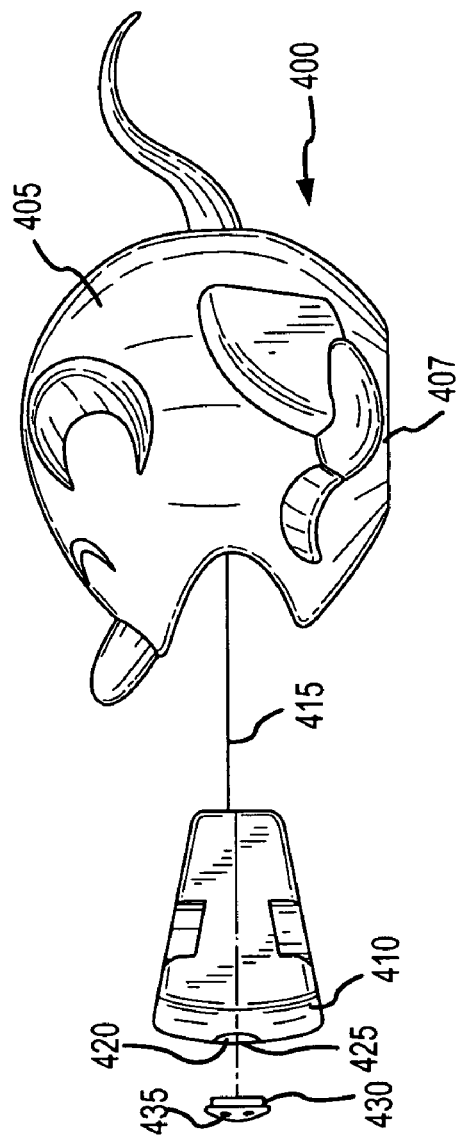
FIG. 6A depicts a left side view of a fifth embodiment of the invention having a movable element in a extended position.
Figure 6B:
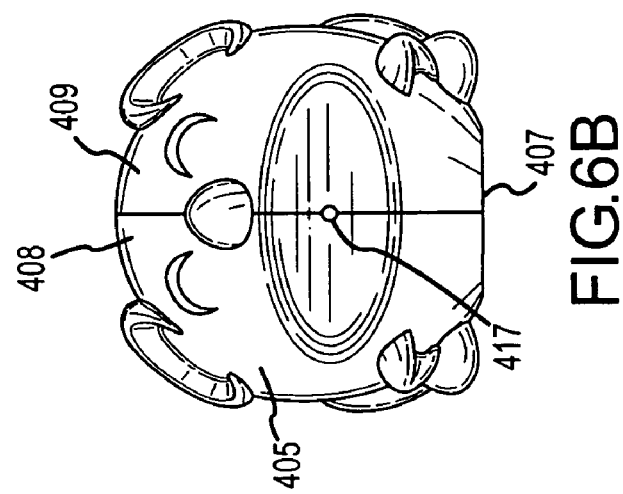
FIG. 6B depicts a front view of a portion of the embodiment of FIG. 6A without the movable element.
Figure 6C:
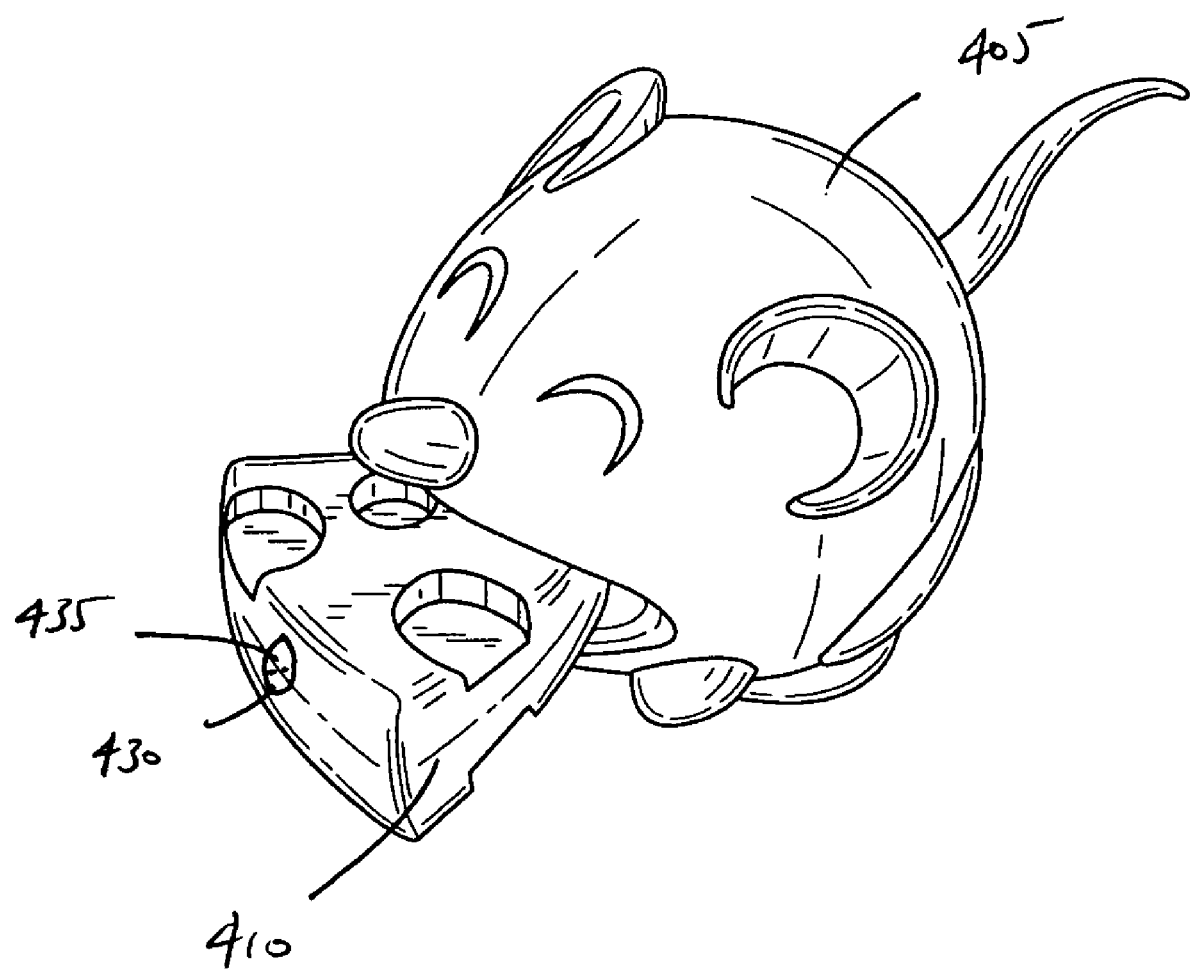
FIG. 6C depicts a perspective view of the embodiment of FIG. 6A.
Figure 6D:
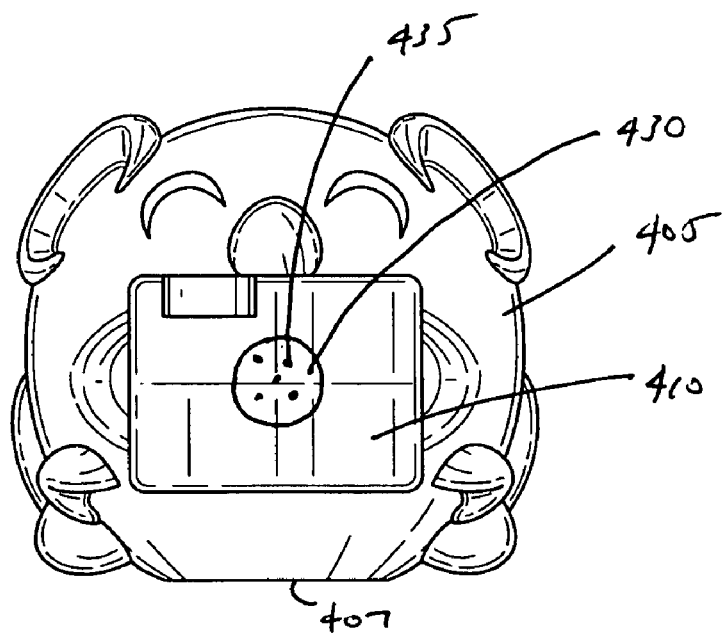
FIG. 6D depicts a front view of the embodiment of FIG. 6A.
Figure 6E:
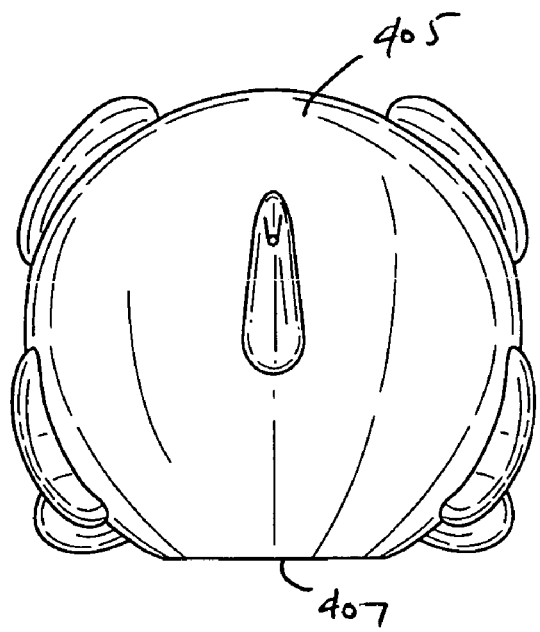
FIG. 6E depicts a rear view of the embodiment of FIG. 6A.
Figure 6F:
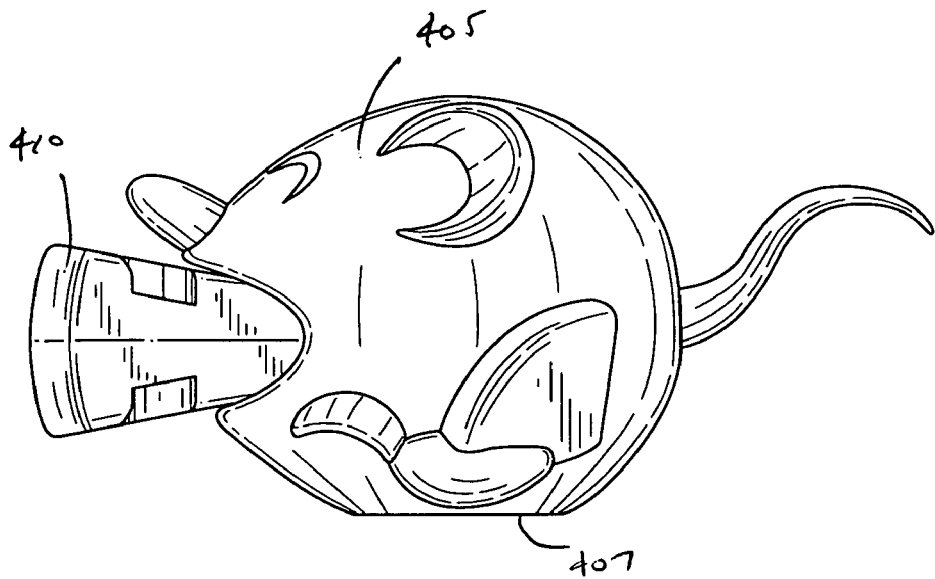
FIG. 6F depicts a left side view of the embodiment of FIG. 6A.
Figure 6G:
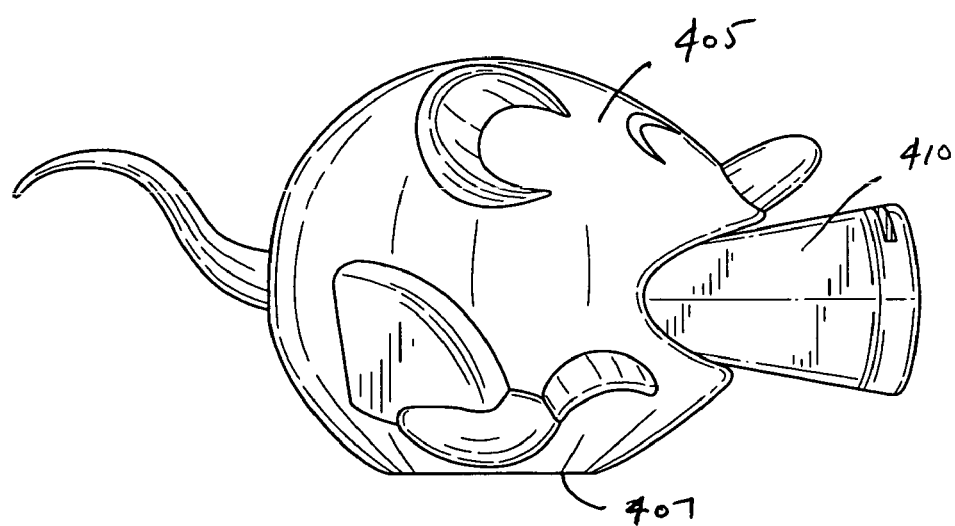
FIG. 6G depicts a right side view of the embodiment of FIG. 6A.
Figure 6H:
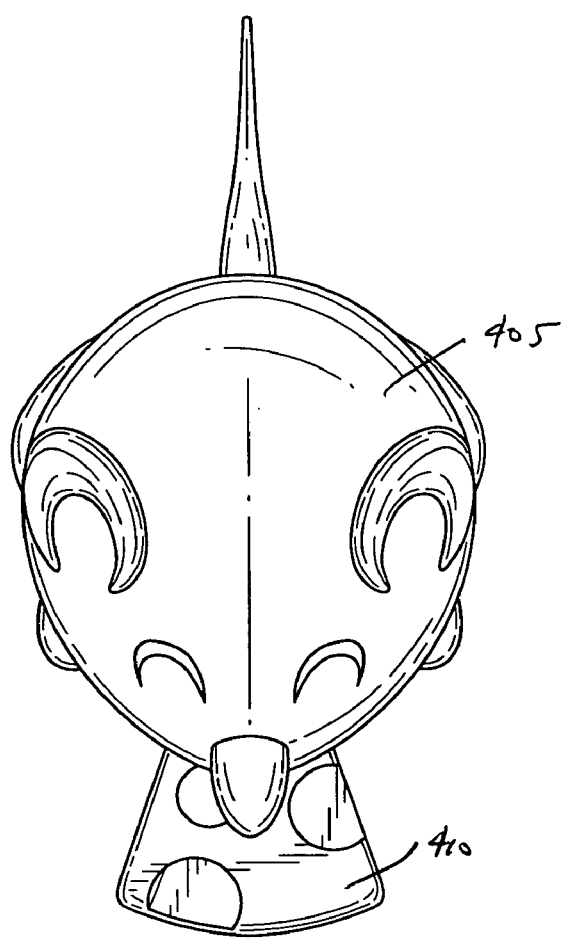
FIG. 6H depicts a top view of the embodiment of FIG. 6A.
Figure 6I:
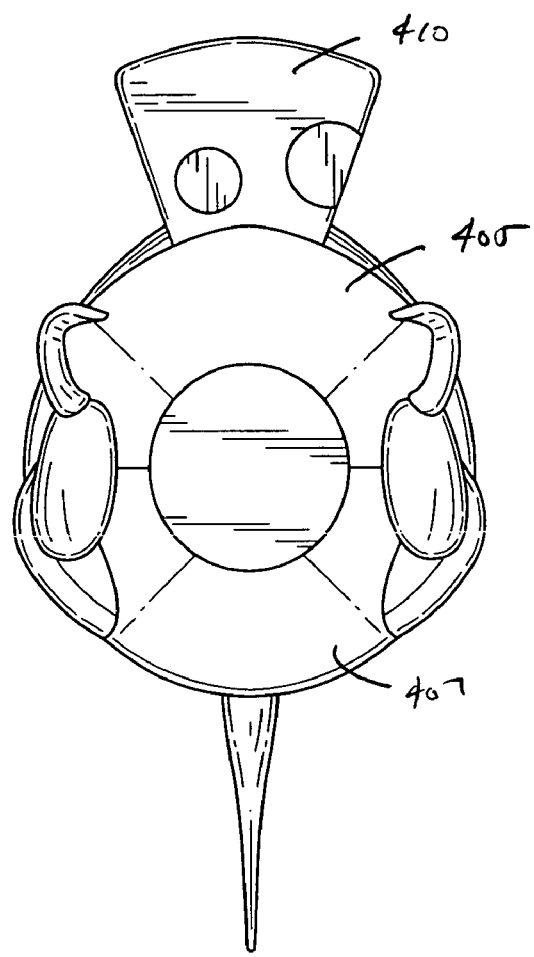
FIG. 6I depicts a bottom view of the embodiment of FIG. 6A.

Another embodiment of the invention, a cat toy 400 (shown in FIGS. 6A-6J), employs a body 405 similar in size and appearance to those already described. Instead of a ball or a set of wheels to allow movement of the body 405, however, the body 405 remains essentially stationary. To this end, the body 405 possesses a flat base 407 to resist movement across a horizontal surface. Movement of the toy 400 is provided by way of a movable element 410 coupled to the body 405 via a drawstring 415 through a hole 417 in the body 405, shown to best effect in FIGS. 6A and 6B. The movable element 410 includes a compartment 420 having a compartment opening 425. The movable element 410 further has a lid 430 having one or more sifting holes 435, with the lid 430 sized to cover the compartment opening 425 of the movable element 410, in a fashion similar to the lid 160, 355 discussed above. As before, the compartment 420 is intended to hold a small amount of catnip or similar substance attractive to a cat or other pet. The compartment opening 425 may be oriented sideways, downward, or any other orientation that facilitates distribution of the catnip during translation of the movable element 410, described as follows.

Figure 6J:
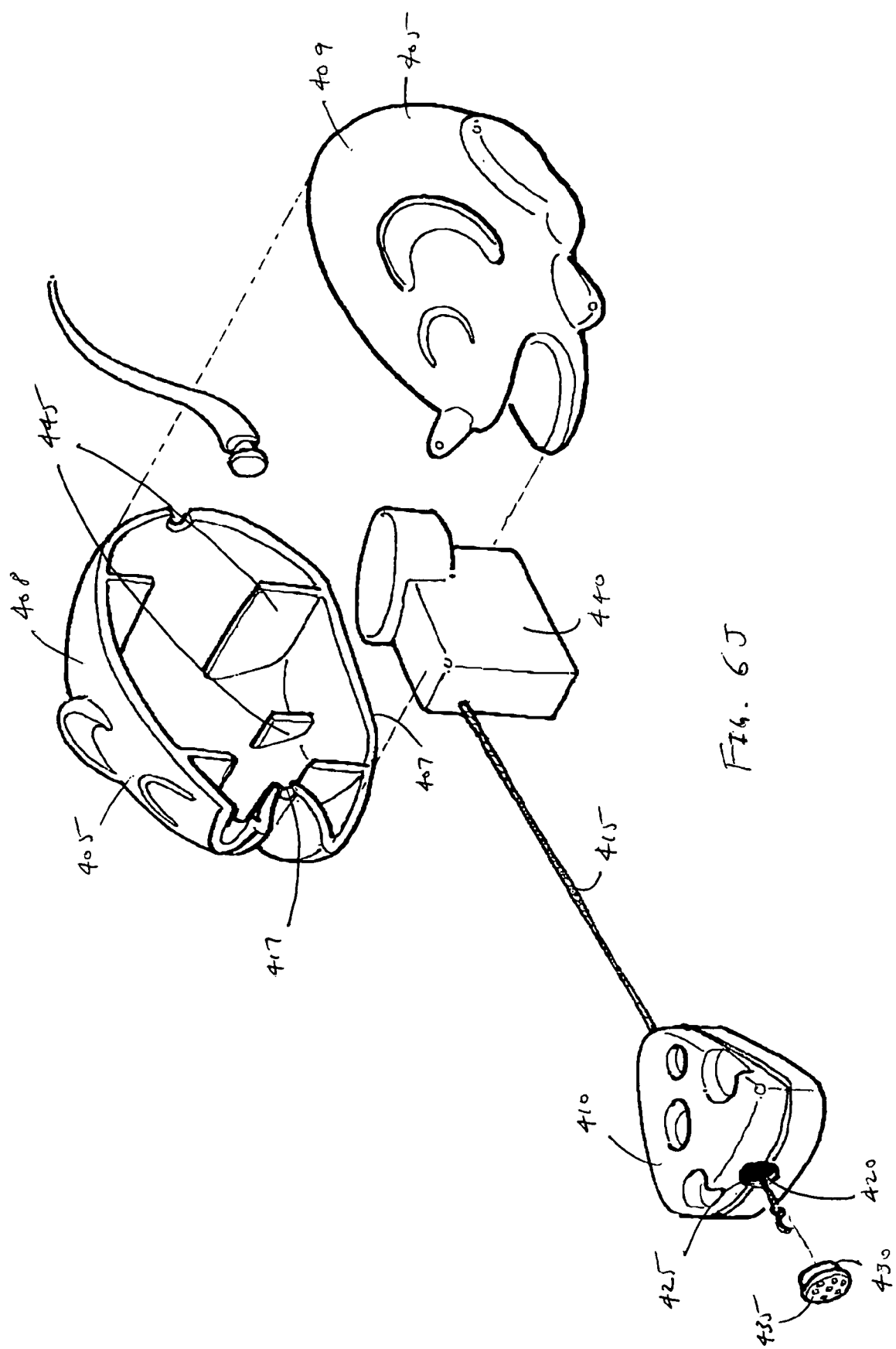
FIG. 6J depicts an exploded view of the embodiment of FIG. 6A.

To provide movement, the drawstring 415 is attached internally to the body 405 by way of a torsion spring, a gear box, and a take-up reel (not visible), all of which are located within an enclosure 440 residing within the interior of the body 405 (see FIG. 6J). In some embodiments, the gear box and the take-up reel may not be necessary, depending on design and cost objectives of the toy 400. To facilitate installation of the enclosure 440 within the body 405, the body 405 generally comprises two body portions 408, 409 attached together by gluing, snap-fitting, or other means. Further, the enclosure 440 is immovably maintained within the body 405 by way of material extensions 445 extending from the interior surface of the body portions 408, 409. Other means of holding the enclosure 440, such as adhesive or screws, may be employed in other implementations. In alternative embodiments, the spring, gear box and reel may be located inside the moveable element 410 instead of the body 405.

At rest, the movable element 410 is held in a contracted position in close proximity to, and possibly in contact with, the body 405 by way of a force applied by the torsion spring, which causes the drawstring 415 to remain wound about the take-up reel. To operate the toy 400 (which operates best while resting on a stable surface, such as a table or a floor), a person pulls the movable element 410 to an extended position a few inches from the body 405 while grasping the body 405. Once the movable element 410 is released, the torsion spring, via the gear box, rotates the take-up reel, thus pulling the movable element 410 back toward the body 405. The gear box causes the resulting motion of the movable element 410 to be vibratory or nonlinear, along the direction of the drawstring 415, thus creating an enhanced visual experience that may evoke a physical reaction from the pet while distributing catnip from the compartment 420 through the sifting holes 435 of the lid 430. In alternative embodiments, the gearbox may cause a relatively smooth motion of the moveable element 410 while still providing the desired catnip distribution. In addition, friction between the movable element 410 and the hard horizontal surface may facilitate any shaking motion of the movable element 410 as it is drawn toward the body 405.

In at least the particular implementation of the toy 400 depicted in FIGS. 6A-6I, the body 405 resembles a mouse, and the movable element 410 is fashioned to appear as a wedge of cheese, with the drawstring 415 being drawn to the hole 417 within an area of the body formed as the mouth of the mouse. Fashioning the toy 400 in such a manner may add to its appeal at the point of sale from a pet owner's perspective, or may enhance attractiveness to the pet for play. In an alternative embodiment, the body may resemble the cheese, while the mouse is employed as the movable element. Other similar physical appearances involving animals and their food, such as a dog and a bone, may be utilized to similar advantage.

4. Rolling Ball Pet Toy

Yet another embodiment of the present invention is a pet toy 500 (shown in FIGS. 7A-7G) having a body 505 shaped as a ball. This embodiment may be at least partially brightly colored or possess sharp visual contract, and/or exhibit graphical designs of various shapes and sizes on the outer surface of the body 505. In one particular implementation, the body 505 is approximately three inches in diameter. Alternative embodiments may employ differing sizes or dimensions.

The body 505 generally is made of first and second hemispherical portions 510, shown in FIGS. 8A-8C, with each hemispherical portion 510 having an axis (depicted in FIG. 8B) aligned perpendicularly through its center. In the normal orientation of the toy 500, the axes of the hemispherical portions 510 are co-aligned and oriented horizontally, with the open ends of the hemispherical portions 510 facing each other. In one embodiment, the first and second hemispherical portions 510 each have a hollow cylindrical extension 517 projecting from the center of the hemispherical portion 510, along its axis toward the center of the body 505.

Between the two hemispherical portions 510 of the body 505 resides a disc 525 (illustrated in FIGS. 9A-9C) rotatably coupled to the hemispherical portions 510 about the co-aligned axes of the portions 510 by way of an axle 527. The axle 527 extends though the disc 525 along a central axis extending through the center of, and oriented perpendicular to, the disc 525. Each end of the axle 527 extends into the cylindrical extension 517 of one of the hemispherical portions 510.

Extending from the rim of the disc 525 is a compartment 530 for holding catnip or a similar substance attractive to a cat or other pet. The compartment 530 has an opening 535 through which the catnip may be inserted into the compartment 530. Also, a cap or lid 540 (illustrated in FIG. 10) defining one or more sifting holes 545 through which the catnip may pass covers the opening 535 of the compartment 530. A ridge 547 on the underside of the lid 540 mates with the compartment opening 535 so that the lid 540 may be removably coupled to the compartment 530. As is the case with the other embodiments described above, the cap 540 may be removed to refill the compartment 530 with catnip, and then replaced over the opening 535. Further, in the particular implementation of FIGS. 7A-7G and FIG. 10, the lid 540 resembles a mouse, thus potentially piquing the interest of a cat. Other animals or geometric shapes may be employed to similar effect.

Figure 7A:
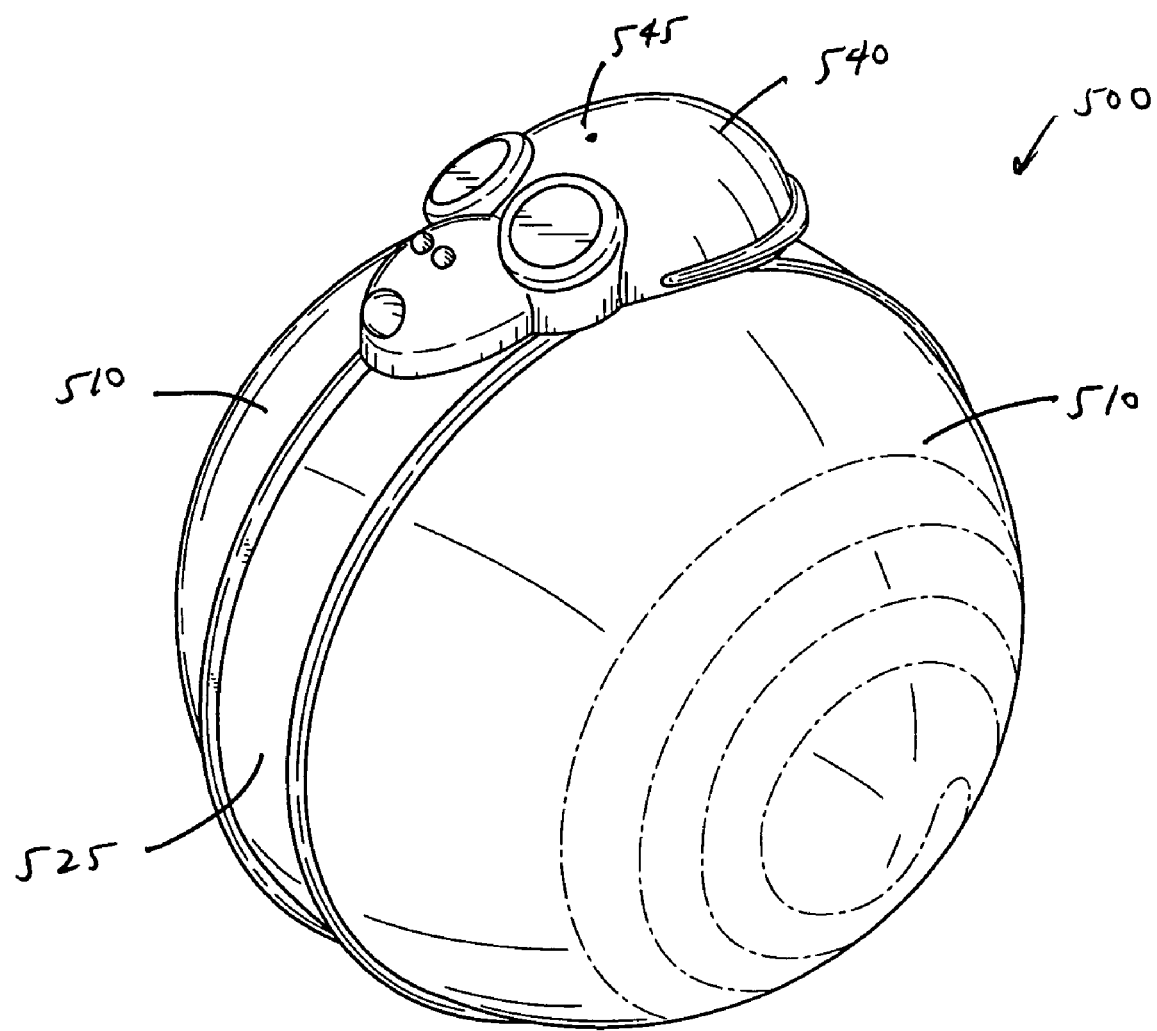
FIG. 7A depicts a perspective view of a sixth embodiment of the invention.
Figure 7B:
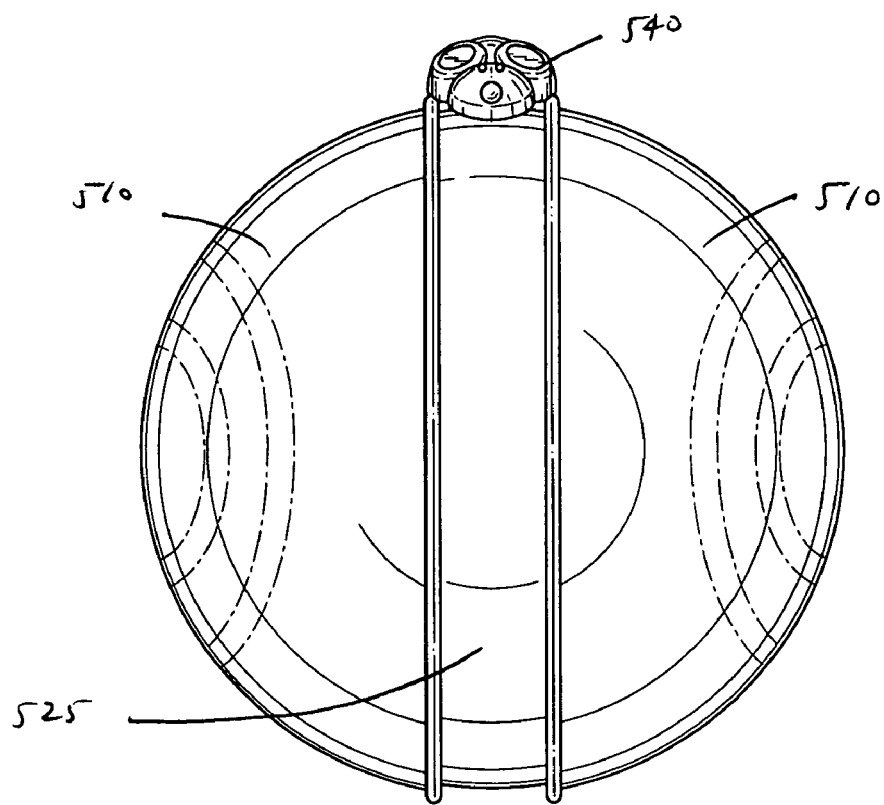
FIG. 7B depicts a front view of the embodiment of FIG. 7A.
Figure 7C:
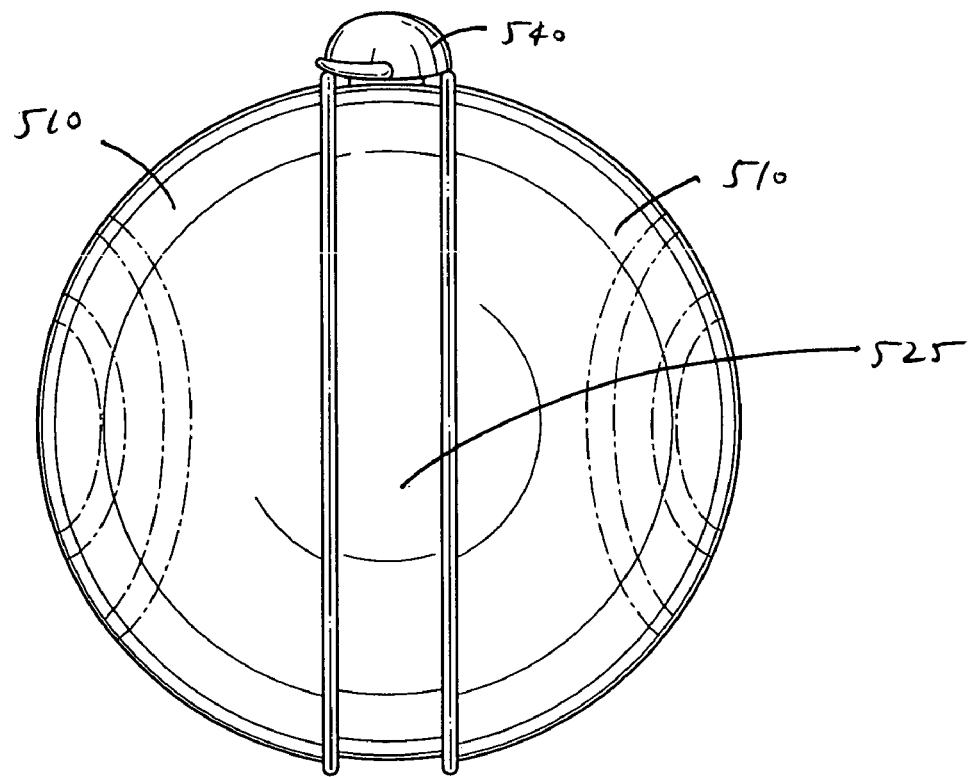
FIG. 7C depicts a rear view of the embodiment of FIG. 7A.
Figure 7D:
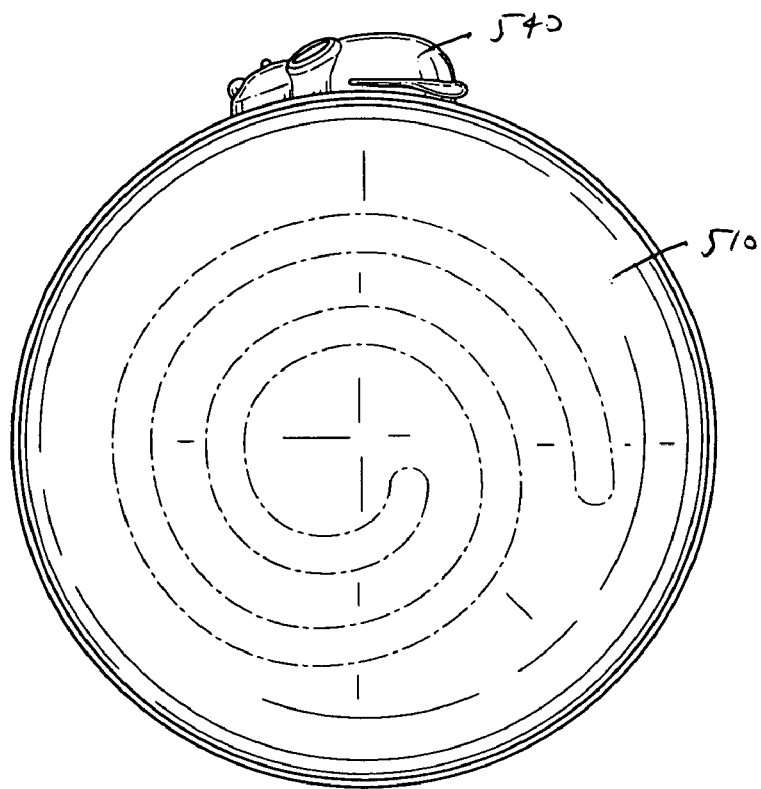
FIG. 7D depicts a left side view of the embodiment of FIG. 7A.
Figure 7E:
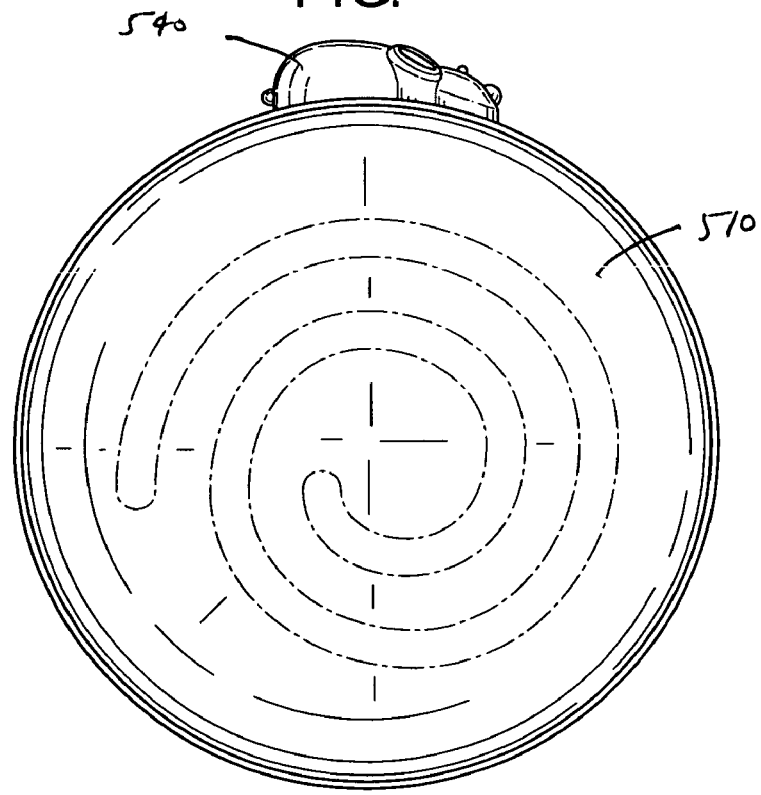
FIG. 7E depicts a right side view of the embodiment of FIG. 7A.
Figure 7F:
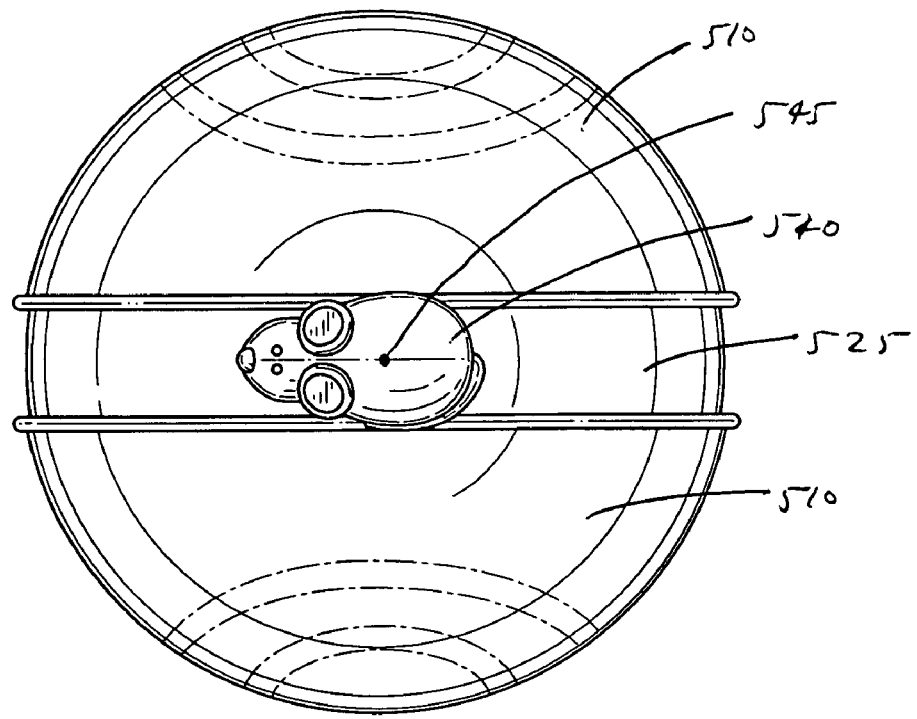
FIG. 7F depicts a top view of the embodiment of FIG. 7A.
Figure 7G:
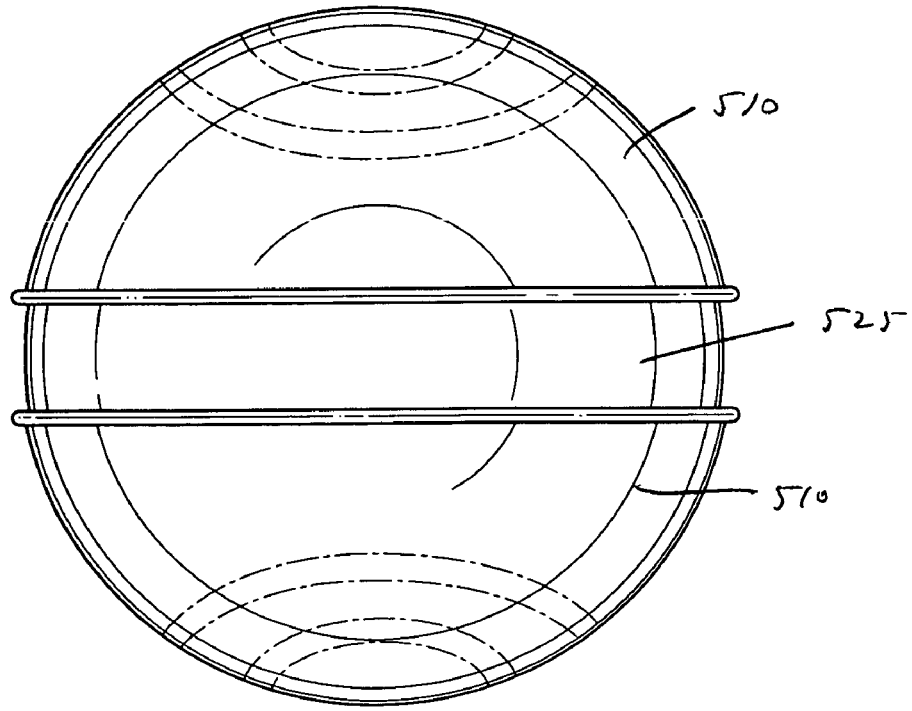
FIG. 7G depicts a bottom view of the embodiment of FIG. 7A.
Figure 7H:
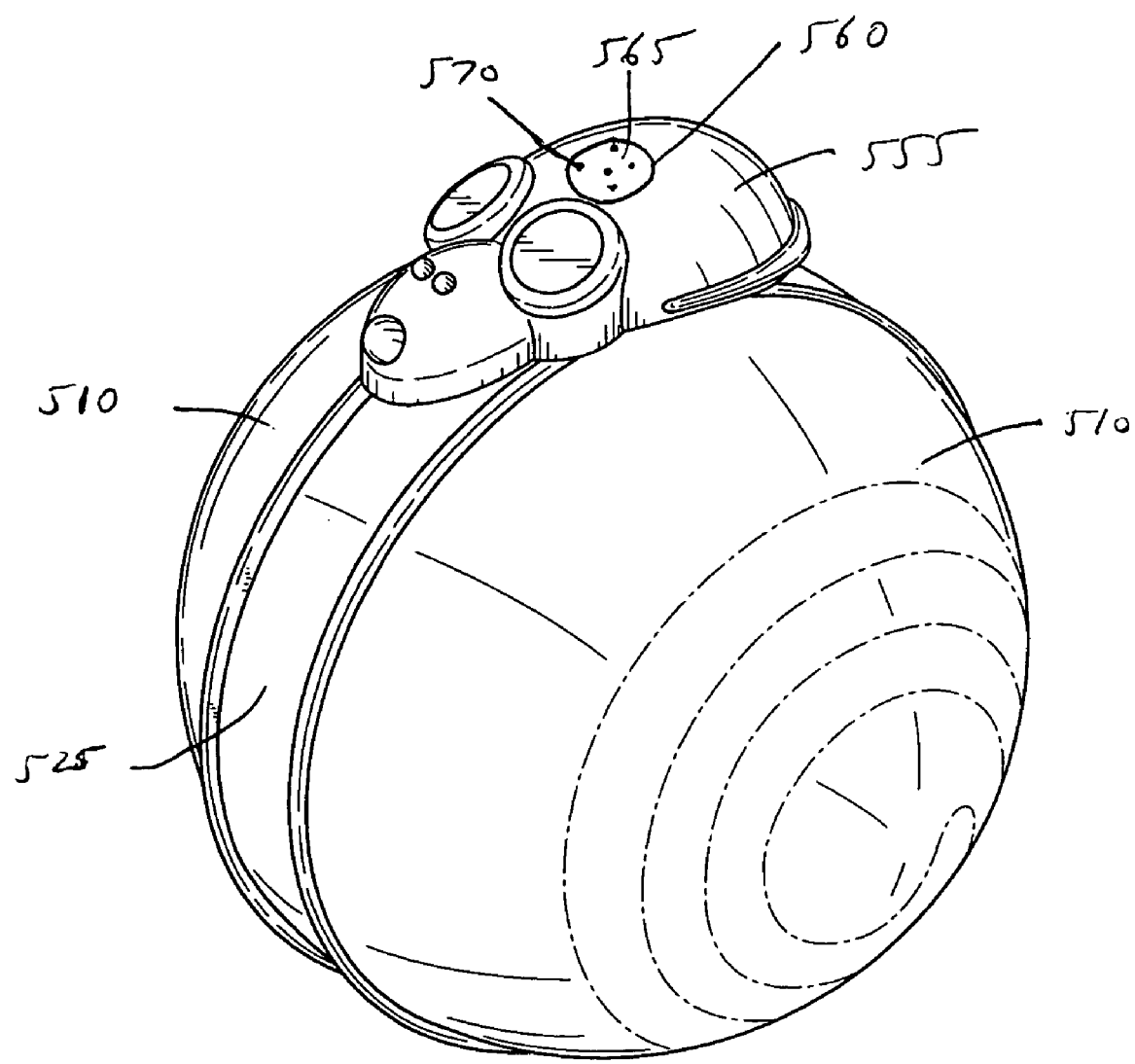
FIG. 7H depicts a perspective view of an embodiment based on the embodiment of FIG. 7A, utilizing an alternative compartment cap or lid.
Figure 11B:
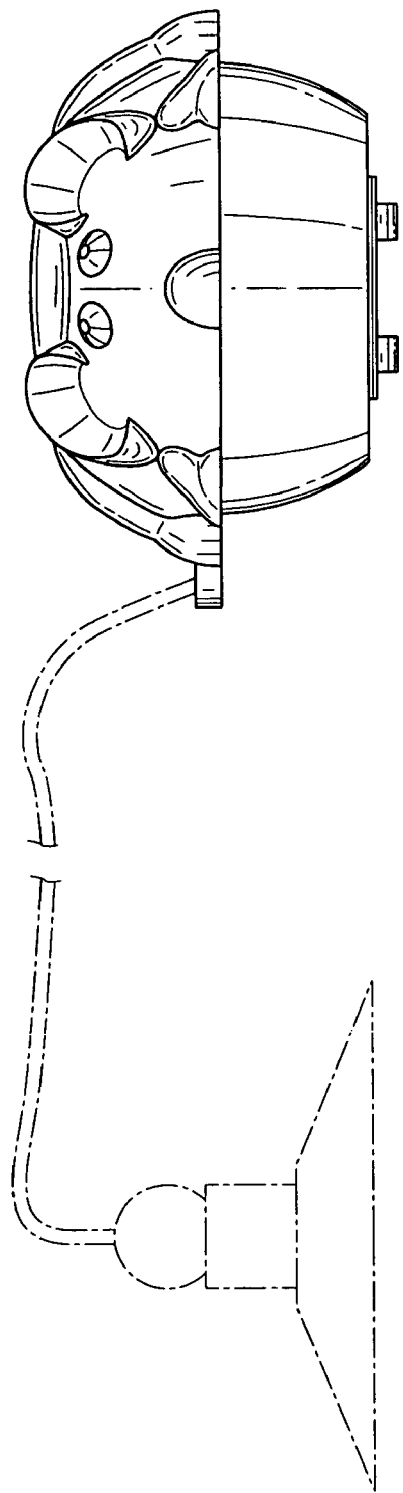
FIG. 11B depicts a front view of the embodiment of FIG. 11A.
Figure 11C:
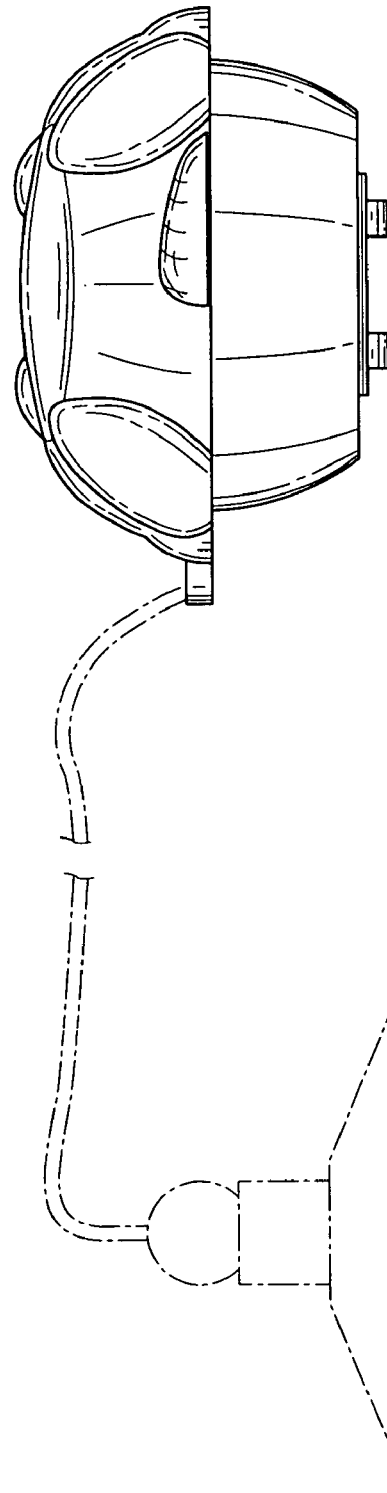
FIG. 11C depicts a rear view of the embodiment of FIG. 11A.
Figure 11D:
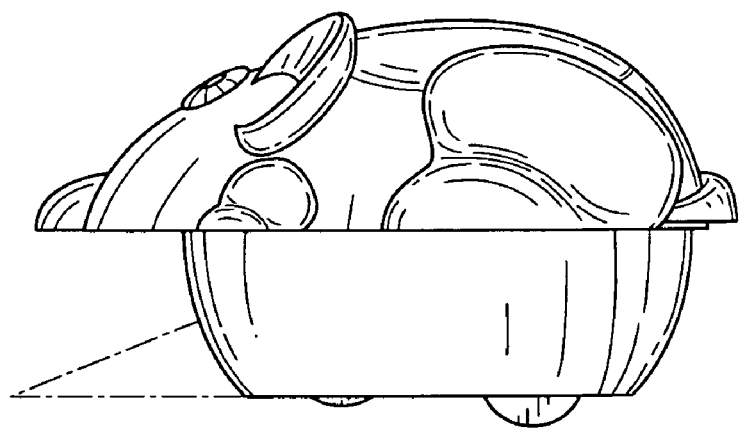
FIG. 11D depicts a left side view of the embodiment of FIG. 11A.
Figure 11E:
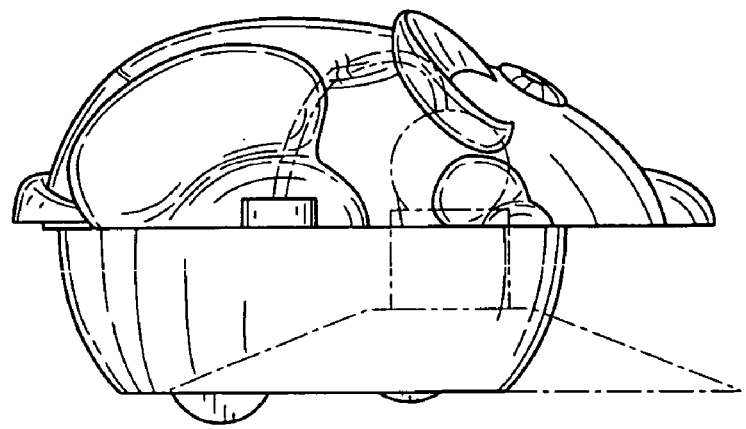
FIG. 11E depicts a right side view of the embodiment of FIG. 11A.
Figure 11F:
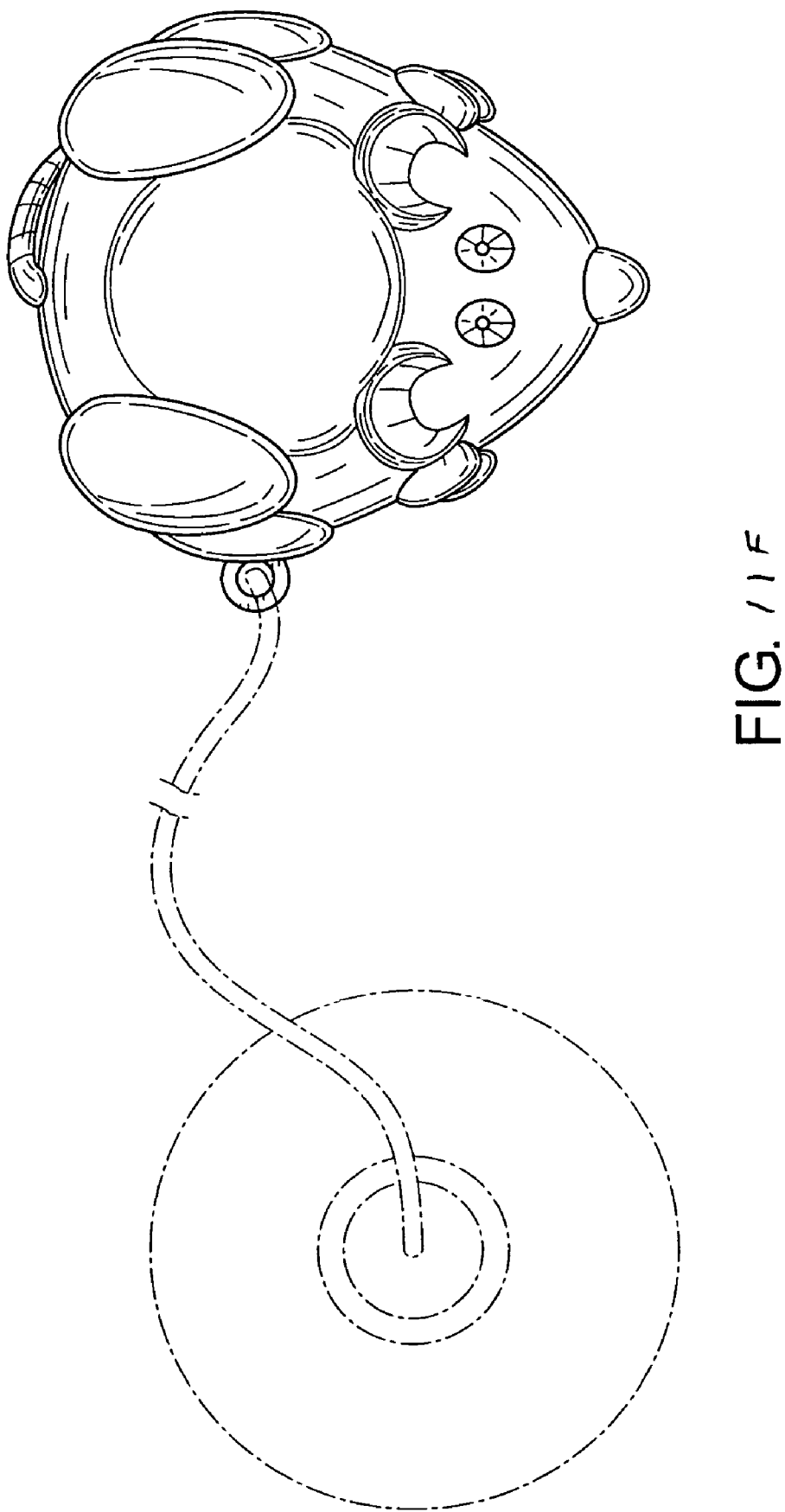
FIG. 11F depicts a top view of the embodiment of FIG. 11A.
Figure 116:
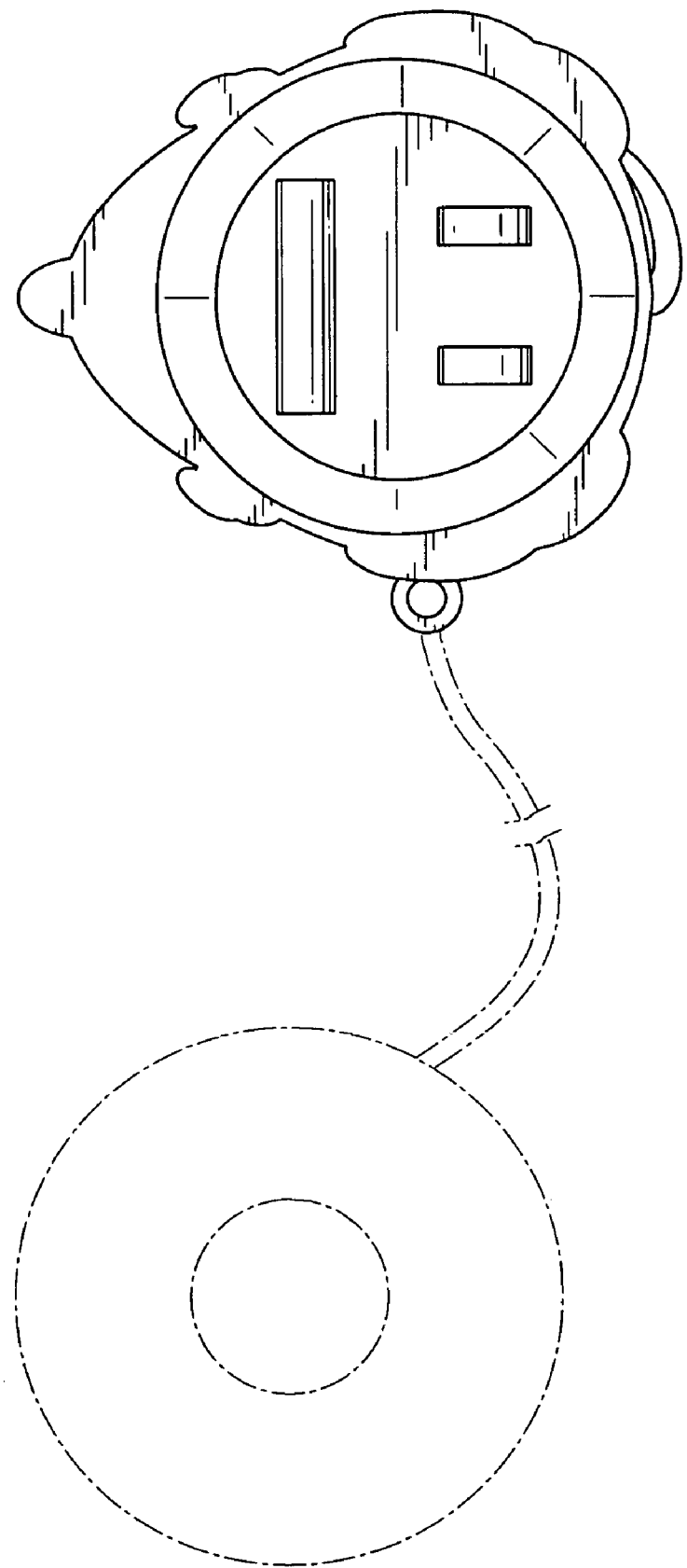
Figure 120:
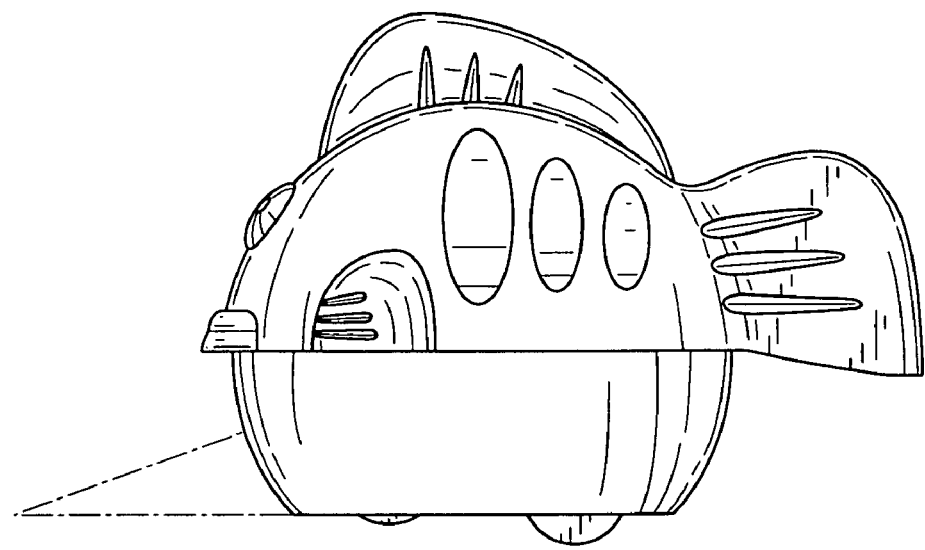
Figure 125:
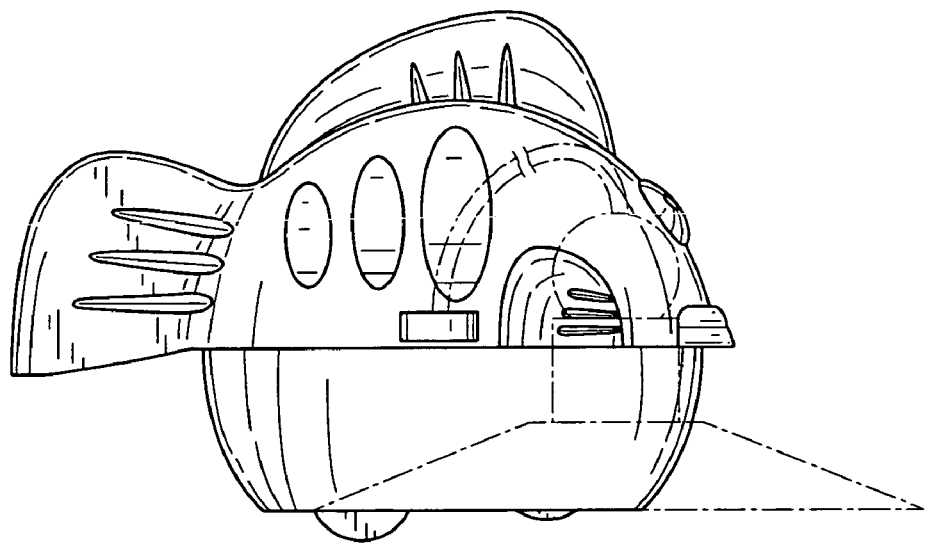
Figure 12F:
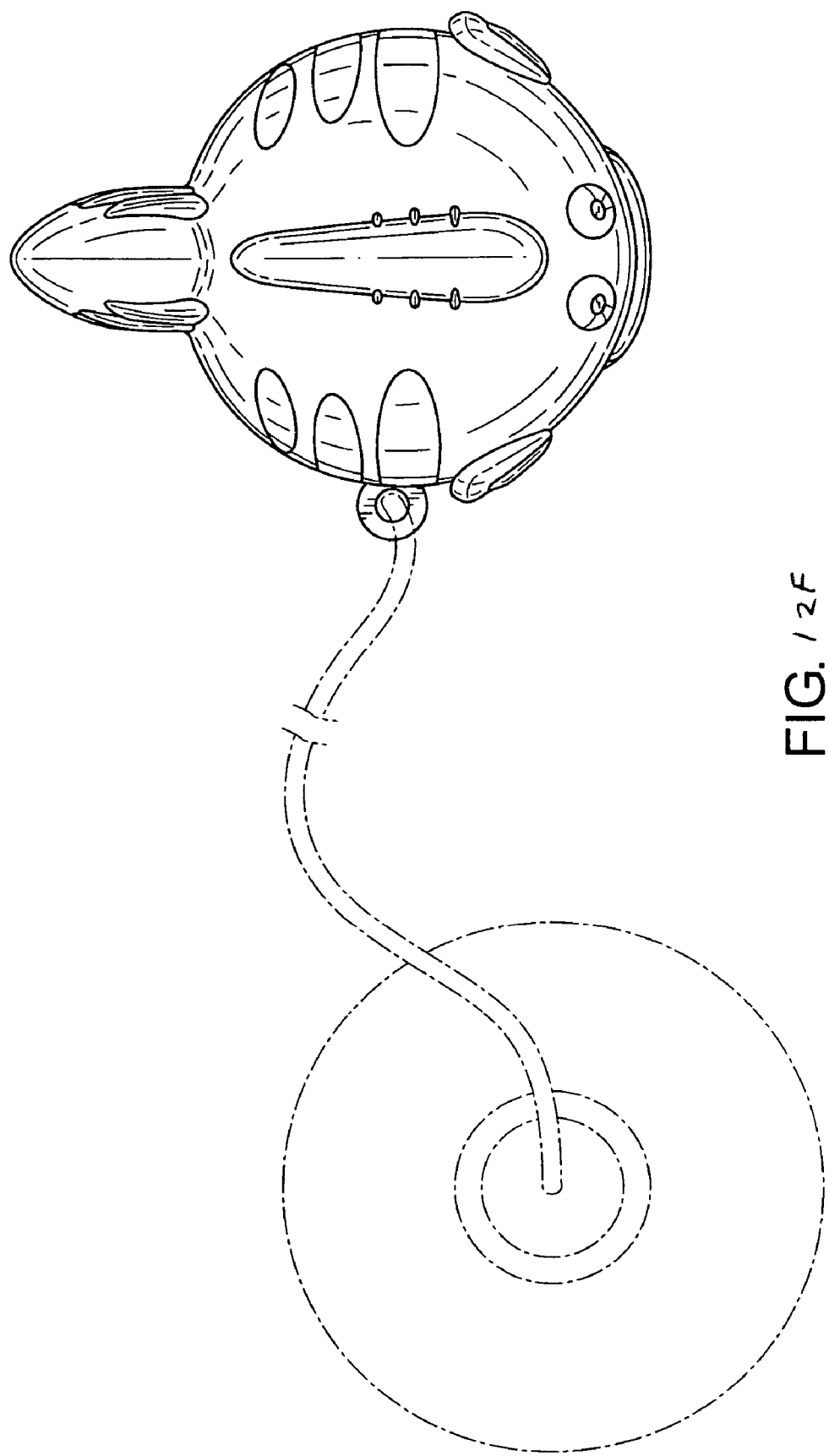
FIG. 12F depicts a top view of the embodiment of FIG. 12A.
Figure 126:
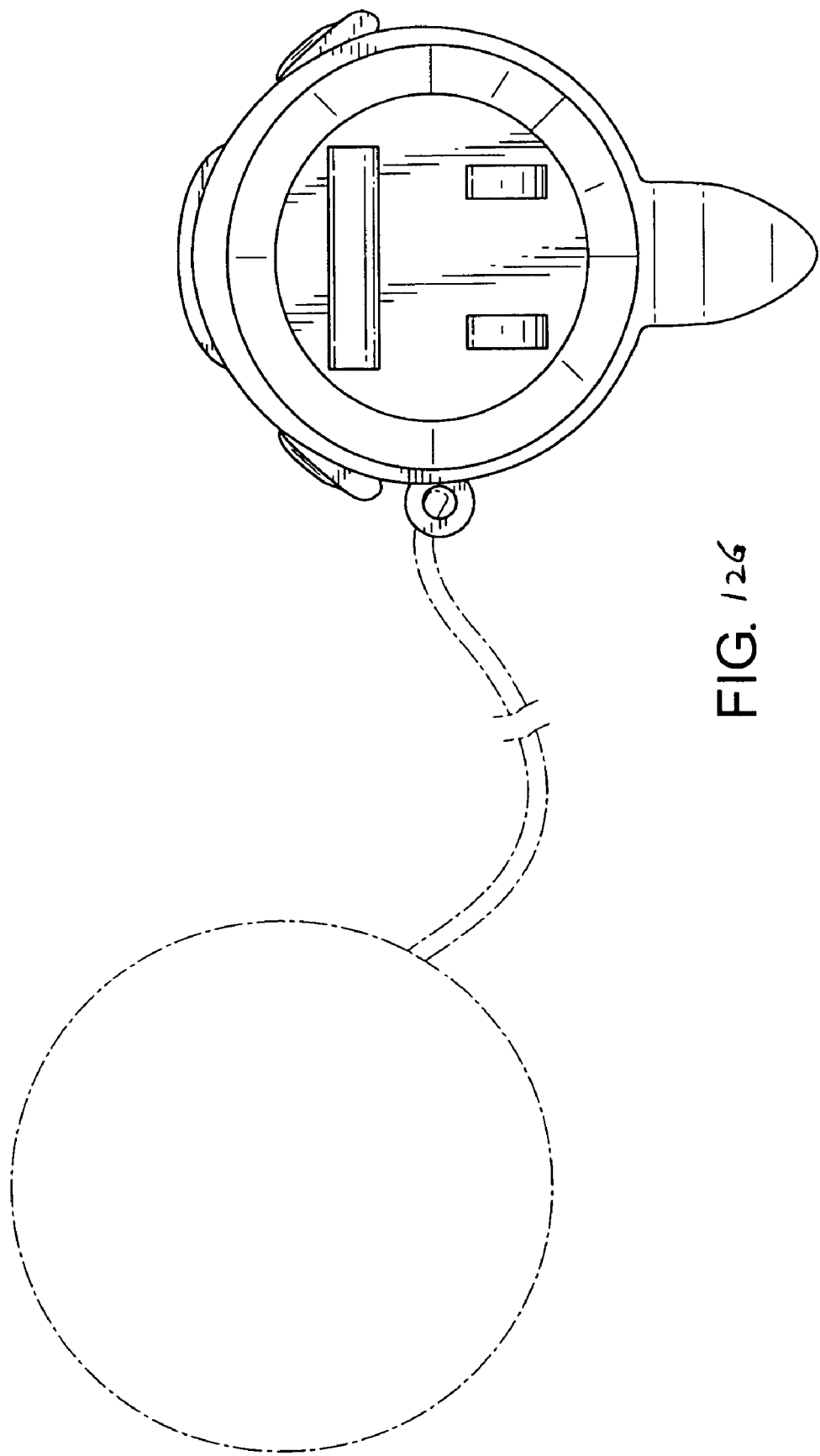
Figure 134:
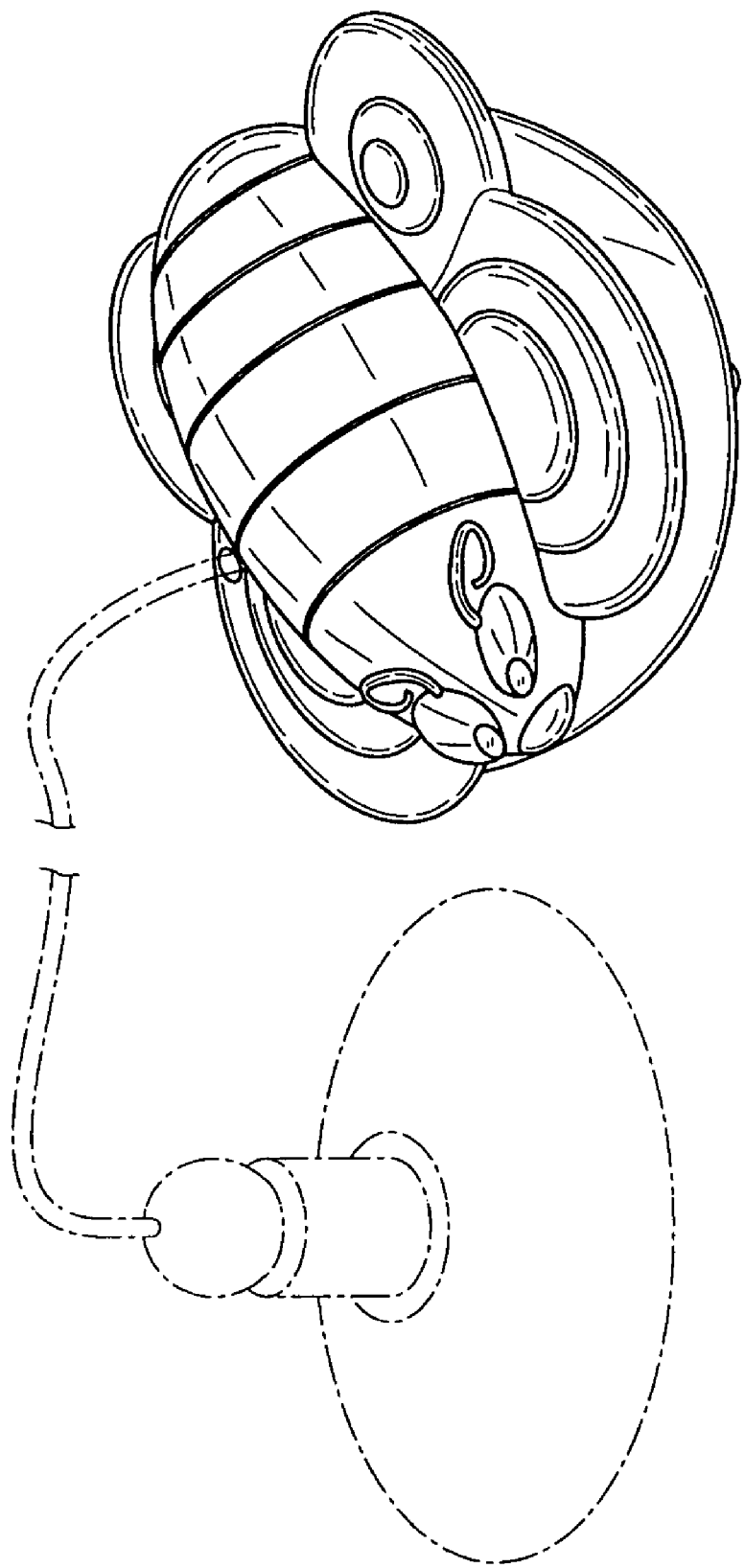
Figure 13D:
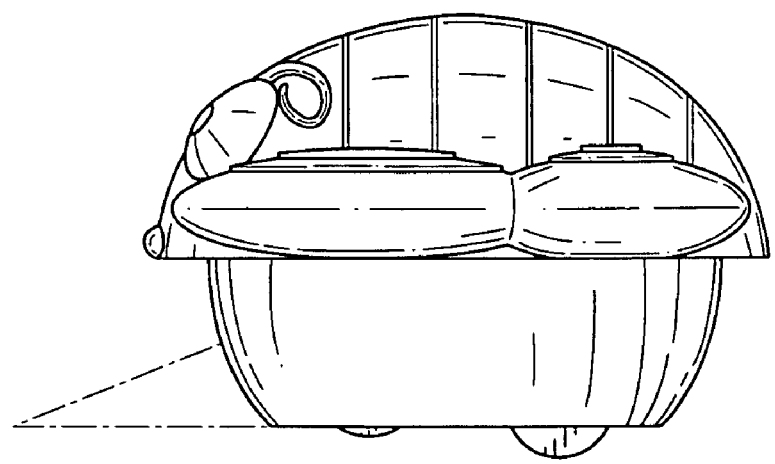
FIG. 13D depicts a left side view of the embodiment of FIG. 13A.
Figure 13E:
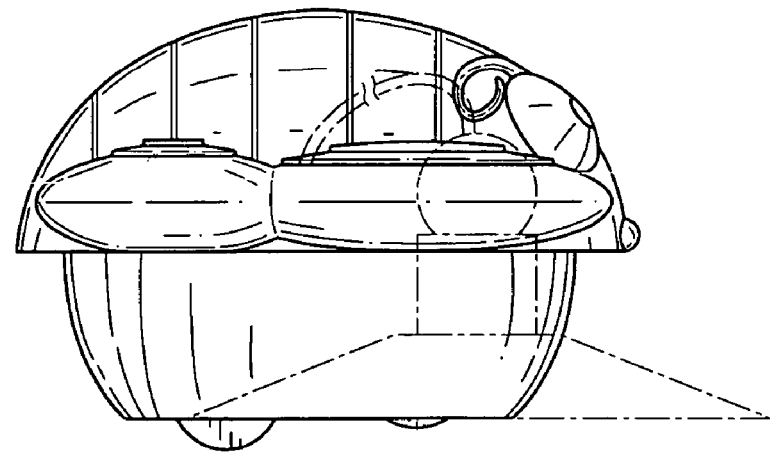
FIG. 13E depicts a right side view of the embodiment of FIG. 13A.
Figure 136:
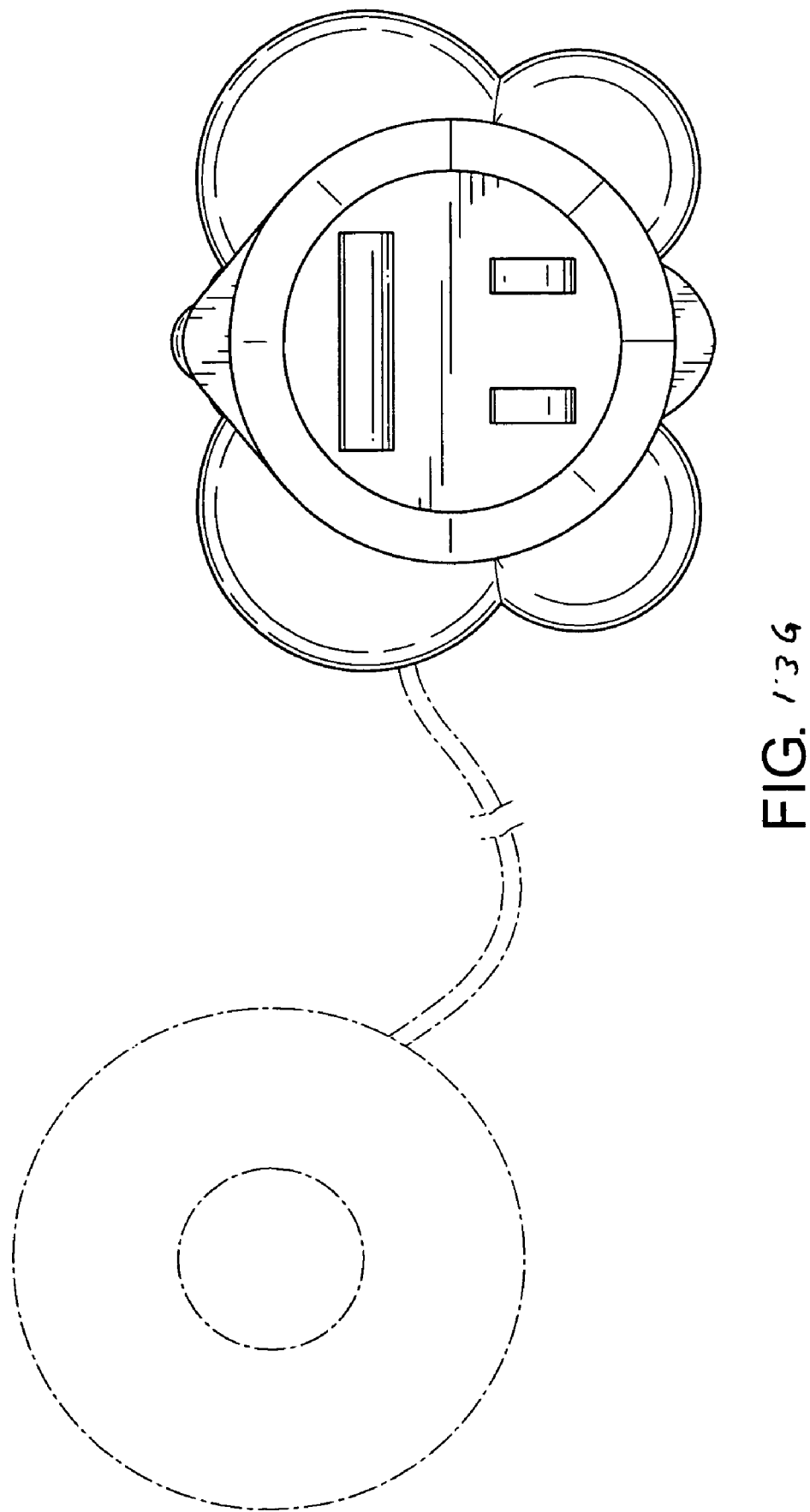
Figure 14A:
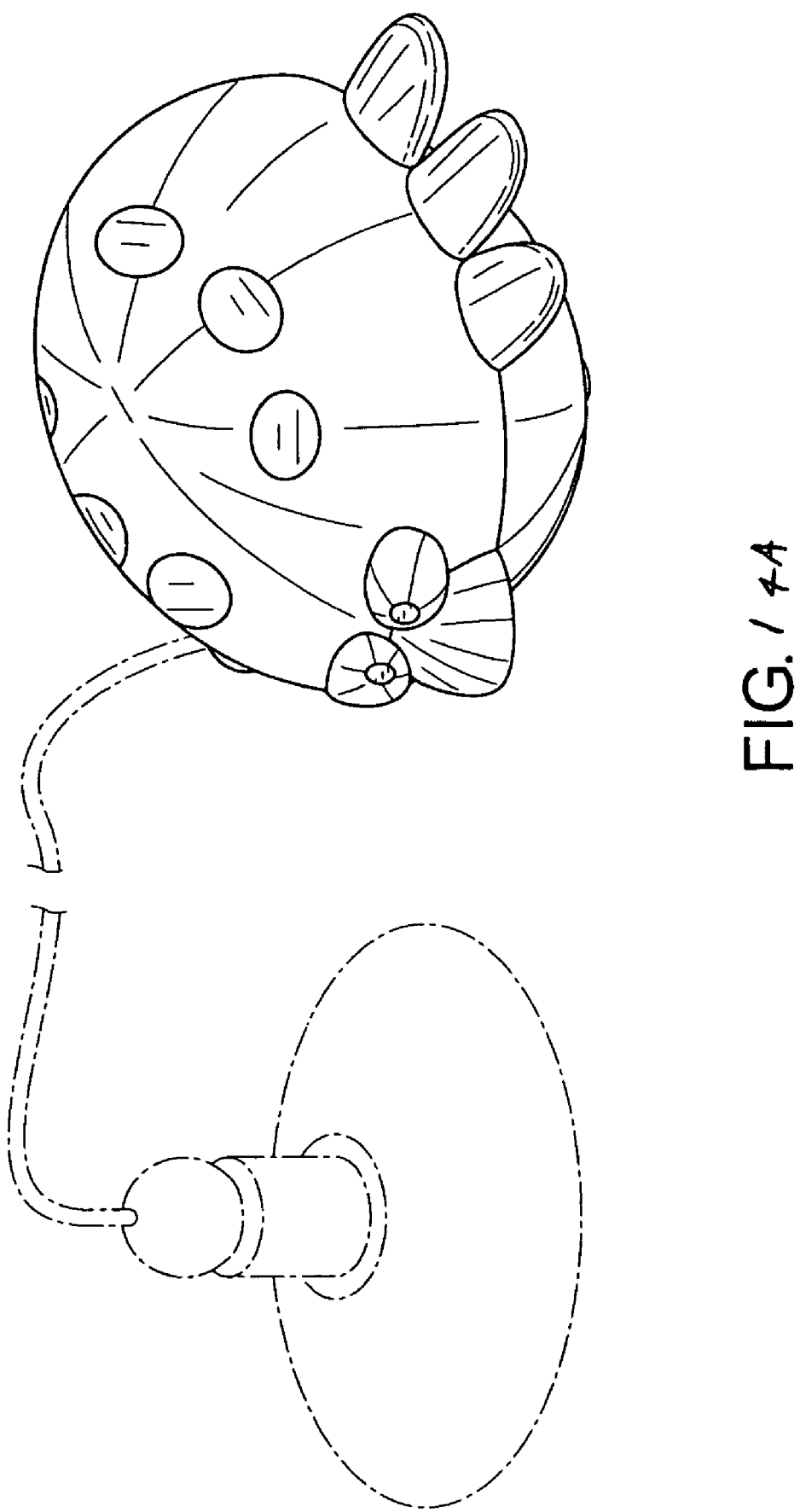
FIG. 14A depicts a perspective view of a tenth embodiment of the invention.
Figure 14D:
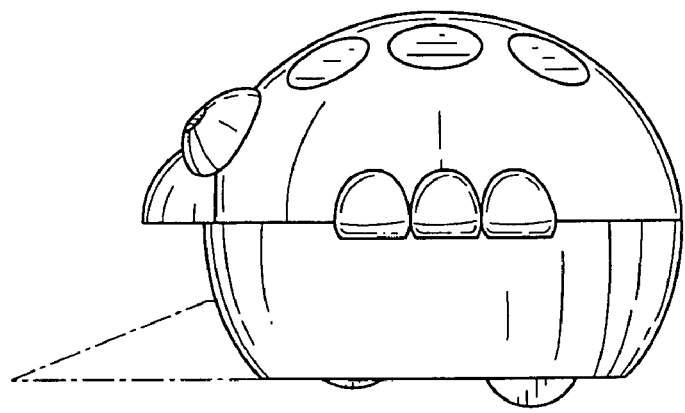
FIG. 14D depicts a left side view of the embodiment of FIG. 14A.
Figure 14E:
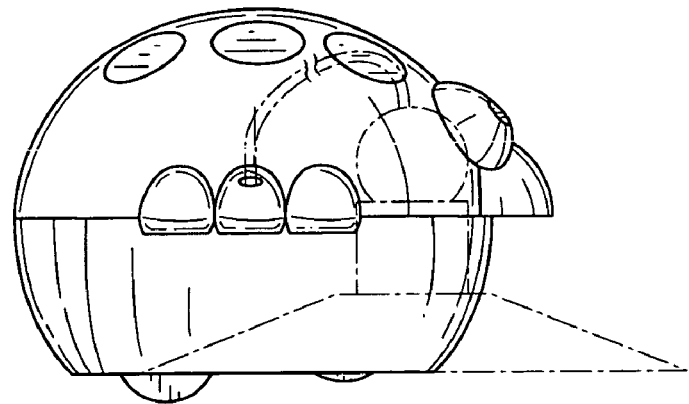
FIG. 14E depicts a right side view of the embodiment of FIG. 14A.
Figure 146:
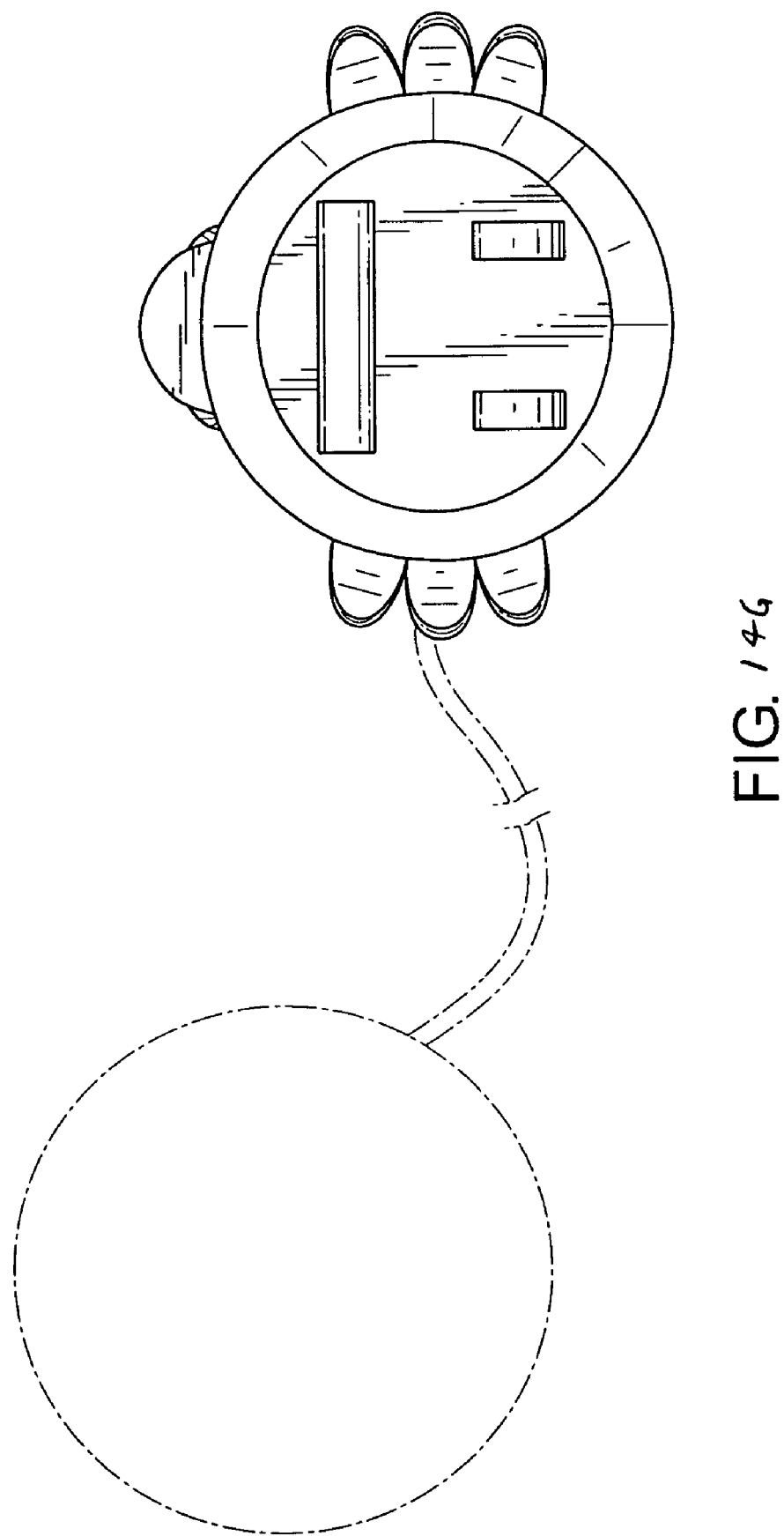
Figure 15A:
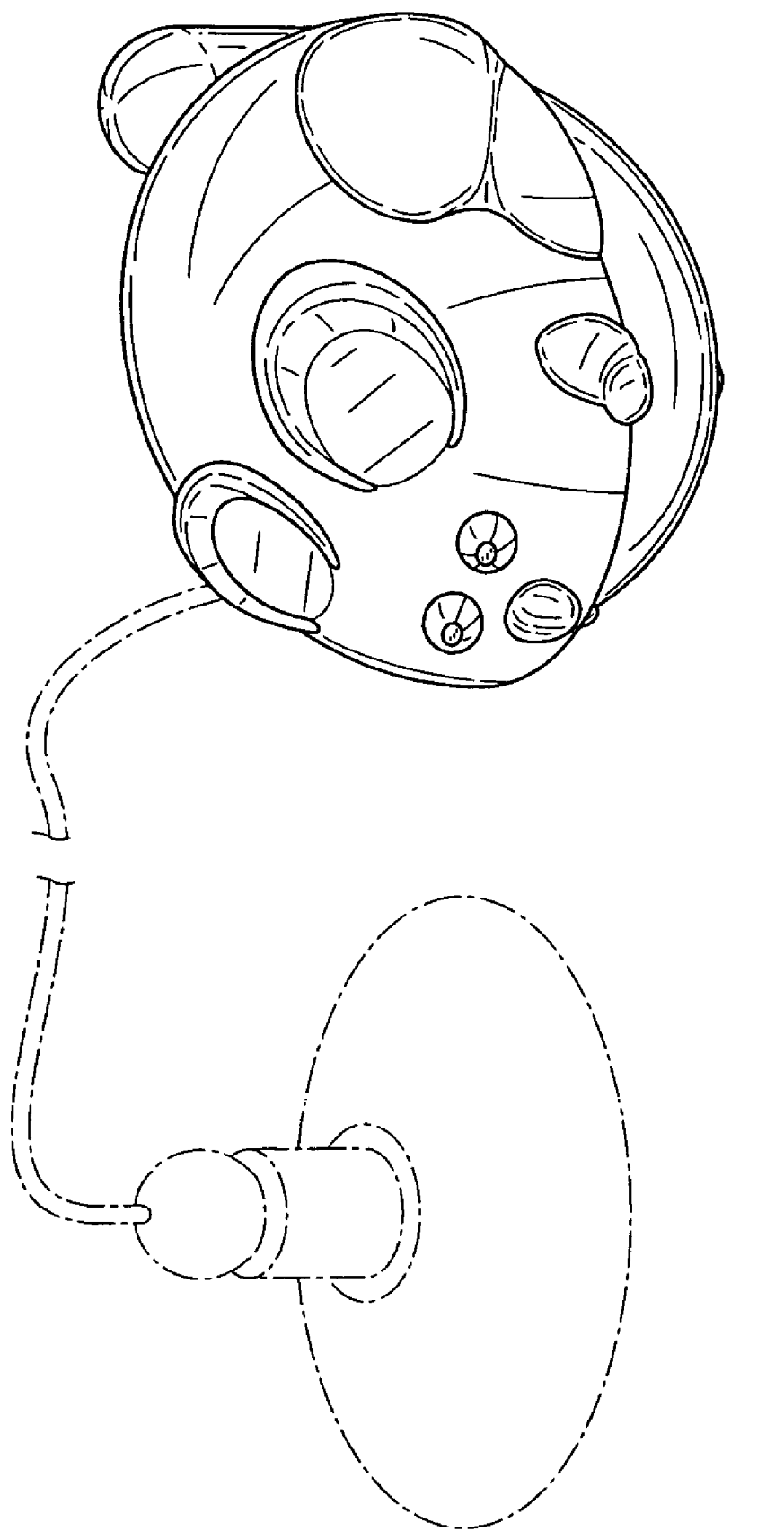
FIG. 15A depicts a perspective view of an eleventh embodiment of the invention.
Figure 15D:
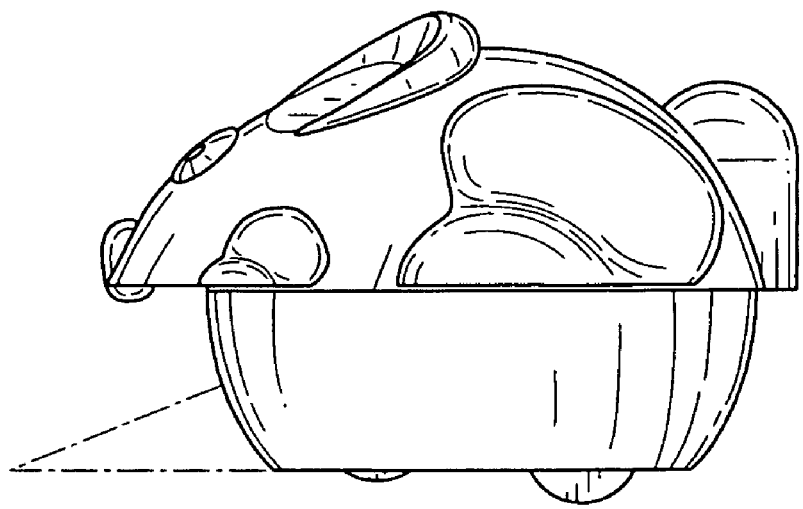
FIG. 15D depicts a left side view of the embodiment of FIG. 15A.
Figure 15E:
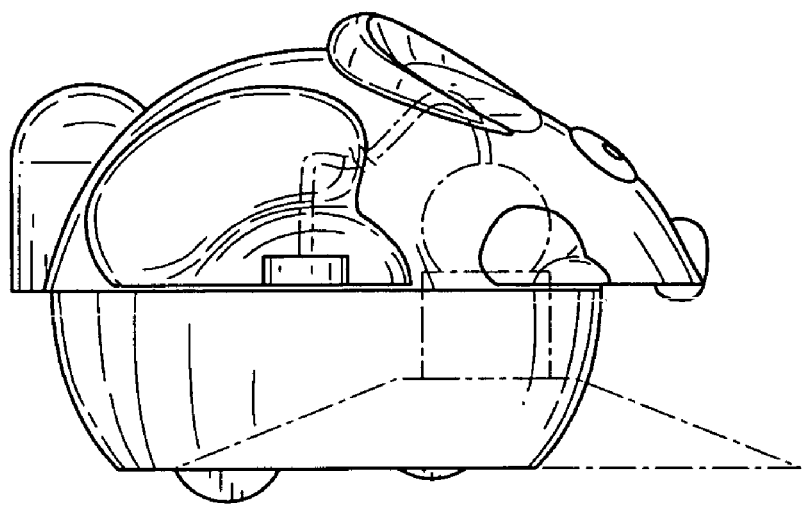
FIG. 15E depicts a right side view of the embodiment of FIG. 15A.
Figure 15F:
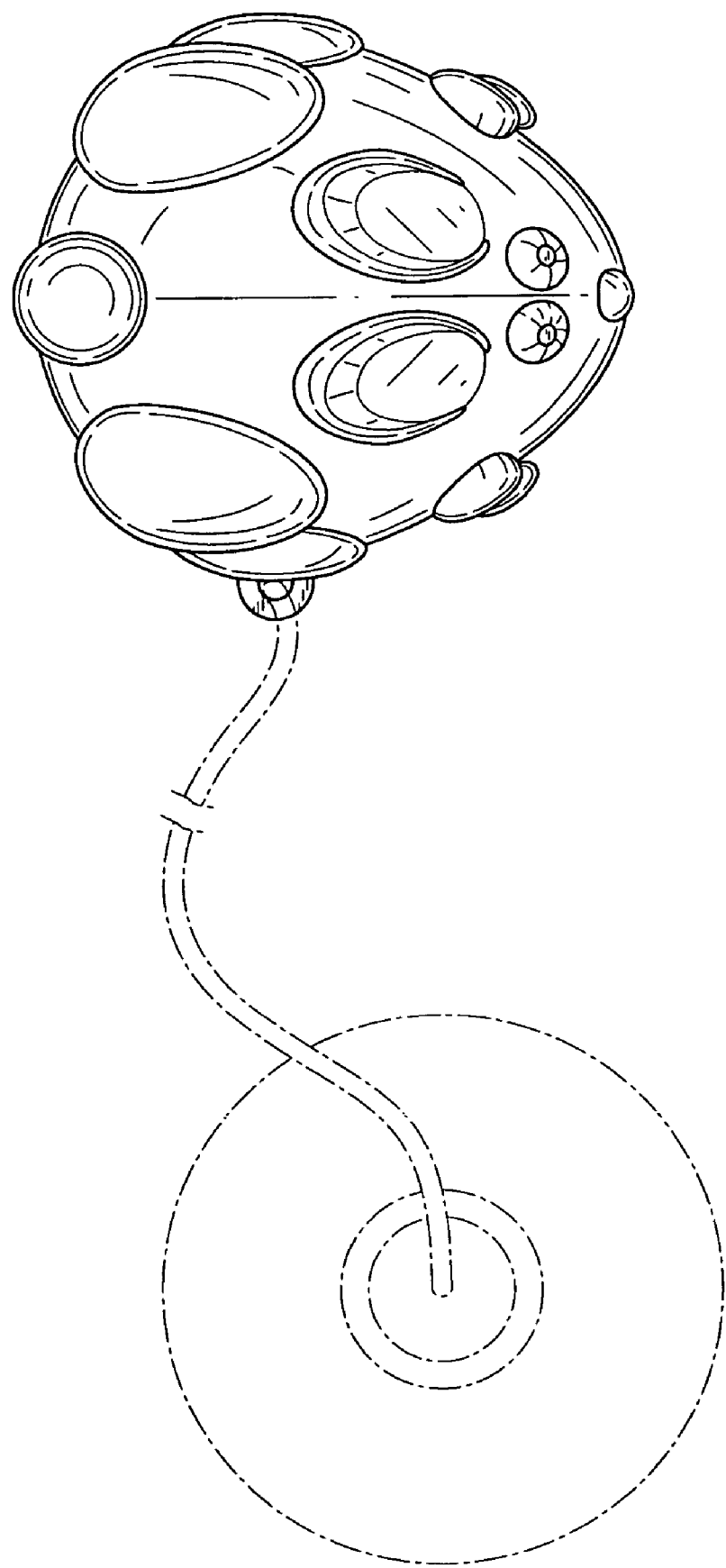
FIG. 15F depicts a top view of the embodiment of FIG. 15A.

In an alternative embodiment, shown in FIG. 7H, a cap 555 may instead have an opening 560 into which a small lid 565 having one or more holes 570 resides. As is the ease with other embodiments described above, the lid 565 may be removed from the cap 555 so that catnip or another substance may be placed inside the compartment. Accordingly, the cap 555 is not required to be removable from the disc 525, as indicated with respect to the lid 540 noted above, and may also be integrated with the disc 525.

Attached to, or integrated with, the disc 525 is a weight 550 positioned opposite the center of the disc 525 from the compartment 530. Thus, the weight 550 facilitates an upward orientation of the catnip compartment 530 by forcing the opposing edge of the disc 525 toward the bottom of the body 505. By way of example, when a cat attempts to strike the cap 540, the disc 525 may temporarily at least partially rotate about the axes of the first and second hemispherical portions 510, changing the orientation of the compartment opening 535 from upward to sideways, or to possibly slightly downward, in turn allowing some catnip to exit the compartment 530 through the opening 535 and the sifting holes 545 of the cap 540. The weight 550 typically causes the disc 525 to return to its original position since the disc 525 is rotatably coupled to the body 505 and the weighted portion 550 of the disc 525 occupies the lowest portion of the disc 525 due to gravitational force acting thereon. As a result, the compartment opening 535 resumes a substantially upward orientation. The body 505 may also roll along the surface upon which it rests as a result of the strike imparted by the cat. In other embodiments, the disc 525 may be fixably attached to the body 505 so that the body 505 rotates in conjunction with disc 525 when struck by the pet.

5. Conclusion

Disclosed herein are several embodiments of a pet toy for a cat or other animal incorporating a means for promoting movement of at least a portion of the toy while dispensing a substance, such as catnip, which is attractive to the pet.

While these embodiments are described in specific terms, other embodiments encompassing principles of the invention are also possible. For example, various components or elements of any embodiment described above may be combined with those of other embodiments discussed herein to yield a new embodiment. Thus, the scope of the invention is not to be limited to the disclosed embodiments, but is determined by the following claims.

What is claimed is:

1. A pet toy, comprising:
a compartment adapted to hold a substance attractive to a pet, the compartment comprising coupled first and second halves, a sifting hole, and a lid;
means for promoting movement of the compartment such that the substance, or an aroma of the substance, within the compartment may pass through the sifting hole;
a substantially rigid body surrounding the compartment except for a first aperture defined within the body that at least temporarily exposes the sifting hole during operation of the pet toy; and
a second aperture defined within the body through which the compartment may be viewed, the second aperture not exposing the sifting hole during operation of the pet toy; wherein the means for promoting movement comprises the compartment located within the body and extending partially through the first aperture in the body, a horizontal axle running through a center of the compartment rotatably coupling the compartment to the body about a horizontal axis, whereby the compartment rotates and functions as a rotating element when the pet toy is propelled along a horizontal surface.

2. The pet toy of claim 1, wherein the compartment further comprises:
an opening through which the compartment may be filled with the substance; and
the lid covering the opening of the compartment.

3. The pet toy of claim 2, wherein the lid comprises the sifting hole.

4. The pet toy of claim 1, wherein the rotatably coupling means comprises:
a horizontally-oriented axle comprising a first end and a second end each coupled to an interior of the body; and
a first and second axle holes of the compartment positioned at diametrically opposed locations along a horizontal axis through a center of the compartment, the axle extending therethrough.

5. The pet toy of claim 1, wherein the rotatably coupling means comprises:
a first and second cylindrical protrusions extending from opposite sides of an inner surface of the body and defining a horizontal axis of the body; and
a first and second receptor holes defined by the compartment, the first and second receptor holes aligned along a horizontal axis through a center of the compartment and receiving the cylindrical protrusions of the body such that the compartment rotates about the horizontal axis defined by the cylindrical protrusions.

6. The pet toy of claim 1, wherein the body and the compartment are manufactured from plastic.

7. The pet toy of claim 1, wherein the body resembles an animal.

8. The pet toy of claim 1, wherein the body comprises a geometric shape.

9. The pet toy of claim 1, wherein the body comprises a left body portion and a right body portion.

10. The pet toy of claim 1, wherein the compartment comprises a ball.

11. The pet toy of claim 10, wherein the ball is spherical.

12. The pet toy of claim 10, wherein the ball is cylindrical.

13. The pet toy of claim 10, wherein the ball is football-shaped.

14. The pet toy of claim 1, wherein the compartment comprises a wheel.

15. The pet toy of claim 1, further comprising a torsion spring coupling the compartment to the body, wherein rotation of the compartment causes a tightening of the torsion spring, thereby causing the compartment to rotate in an opposing direction upon releasing the compartment.

16. The pet toy of claim 1, further comprising:
a tether comprising a first and second end, the first end fixably attached to the body; and
an anchor coupled with the second end of the tether, the anchor adapted to remain stationary on a horizontal surface;
wherein the body revolves around the anchor when the body is propelled across the horizontal surface.

17. The pet toy of claim 16, wherein the anchor comprises:
a base; and
a pivot structure rotatably coupled with the base and fixably attached to the tether.

18. The pet toy of claim 17, wherein the anchor further comprises:
a suction cup coupled to the base, the suction cup configured to create a suction between the base and the horizontal surface.

* * * * *